United States Patent [19]
Bertelsen et al.

[11] Patent Number: 5,449,897
[45] Date of Patent: Sep. 12, 1995

[54] AUTOMATIC GAIN CALIBRATION FOR GAMMA CAMERA SYSTEM

[75] Inventors: Hugo Bertelsen, Pleasanton; Horace H. Hines, San Jose, both of Calif.

[73] Assignee: ADAC Laboratories, Milpitas, Calif.

[21] Appl. No.: 318,048

[22] Filed: Oct. 3, 1994

[51] Int. Cl.$^6$ ............................................. G01T 1/208
[52] U.S. Cl. ................. 250/207; 250/363.09; 250/252.1; 378/207; 364/527
[58] Field of Search .......... 250/207, 214 VT, 214 AG, 250/252.1 R, 363.02, 363.07, 363.09; 378/207; 364/527, 571.01, 571.02, 571.04

[56] References Cited

U.S. PATENT DOCUMENTS

| | | | |
|---|---|---|---|
| 4,256,960 | 3/1981 | Snider | 250/252.1 R |
| 4,517,460 | 5/1985 | Meulenbrugge et al. | 378/207 |
| 4,583,187 | 4/1986 | Stoub | 364/571.02 |
| 4,590,368 | 5/1986 | Govaert | 250/207 |
| 5,004,904 | 4/1991 | Yamakawa et al. | 250/207 |
| 5,237,173 | 8/1993 | Stark et al. | 250/207 |
| 5,373,161 | 12/1994 | Tararine et al. | 250/363.09 |

*Primary Examiner*—Edward P. Westin
*Assistant Examiner*—John R. Lee

[57] ABSTRACT

An automatic gain calibration system for photomultipliers of a scintillation detector operable during periods when a collimator is installed to the scintillation detector. The system provides for calibration of the photomultipliers (PMTs) that are located along the periphery of the detector whose surfaces that are partially or totally obscured by the solid lead edge regions of the installed collimator (e.g., obscured PMTs). In such a manner, the entire scintillation detector may be calibrated effectively without removal of the heavy and awkwardly handled collimator. The automatic calibration system adjusts the preamplification gain associated with each channel of the PMT array to maintain the effective gain of each PMT in response to long term variations in the characteristic gain of each PMT. For calibration, the system measures the response of an obscured PMT to gamma events occurring within a thin strip area that extends into the central portion of the collimator. There is a separate strip area for each obscured tube. The preamplification gain of an obscured tube is then calibrated, when the collimator is installed, based on a recorded value of an originally calibrated response of the obscured PMT for gamma events within this strip area.

34 Claims, 29 Drawing Sheets

| PEAK PMT ADDRESS | ANALOG GLOBAL ENERGY DATA BUFFER ADDRESS → COUNT | | | | | | | | | | | | | |
|---|---|---|---|---|---|---|---|---|---|---|---|---|---|---|
| | 0 TYPE | 1 | 2 | 3 | 4 | 5 | 6 | 7 | 8 | 9 | 10 | 11 | 12 | 13 | ... | n |
| 0 | | | | | | | | | | | | | | | |
| ... | | | | | | | | | | | | | | | |
| 7 | NORMAL | 55 | 1 | 18 | 20 | 19 | 36 | 18 | STOP | | | | | | |
| ... | | | | | | | | | | | | | | | |
| 38 | EDGE | 55 | 22 | 23 | 39 | 37 | STOP | | | | | | | | |
| ... | | | | | | | | | | | | | | | |
| 46 | CORNER | 55 | 41 | 42 | 43 | STOP | | | | | | | | | |
| ... | | | | | | | | | | | | | | | |
| 54 | | | | | | | | | | | | | | | |

CENTROID TYPE

| PMT ADDRESS | NORMAL | SHORT EDGE | LONG EDGE | CORNER | AUX TYPE 1 | AUX TYPE 2 | AUX |
|---|---|---|---|---|---|---|---|
| 0 | Wx/Wy | Wx/Wy | Wx/Wy | Wx/Wy | Wx/Wy | Wx/Wy | Wx/Wy |
| 1 | Wx/Wy | Wx/Wy | Wx/Wy | Wx/Wy | Wx/Wy | Wx/Wy | Wx/Wy |
| 2 | Wx/Wy | Wx/Wy | Wx/Wy | Wx/Wy | Wx/Wy | Wx/Wy | Wx/Wy |
| 3 | Wx/Wy | Wx/Wy | Wx/Wy | Wx/Wy | Wx/Wy | Wx/Wy | Wx/Wy |
| 4 | Wx/Wy | Wx/Wy | Wx/Wy | Wx/Wy | Wx/Wy | Wx/Wy | Wx/Wy |
| 5 | Wx/Wy | Wx/Wy | Wx/Wy | Wx/Wy | Wx/Wy | Wx/Wy | Wx/Wy |
| ••• | | | | | | | |
| 54 | Wx/Wy | Wx/Wy | Wx/Wy | Wx/Wy | Wx/Wy | Wx/Wy | Wx/Wy |

| PMT # | NEAR PMTS | | | | | | FAR PMTS | | | | | |
|---|---|---|---|---|---|---|---|---|---|---|---|---|
| | (6%→0.17%) | | | | | | (=0%) | | | | | |
| 0 | | | | | | | | | | | | |
| 1 | | | | | | | | | | | | |
| 2 | | | | | | | | | | | | |
| ... | | | | | | | | | | | | |
| 54 | | | | | | | | | | | | |

FIGURE 18

AUTOMATIC GAIN CALIBRATION FOR GAMMA CAMERA SYSTEM

BACKGROUND OF THE INVENTION (1) Field of the Invention

The present invention relates to the field of nuclear medicine systems. Specifically, the present invention relates to signal processing systems for gamma camera detectors.

(2) Prior Art

Scintillation detectors of gamma cameras are composed of an array of photomultipliers (PMTs) each generating a channel signal in response to gamma events detected within a crystal layer that is optically coupled to the PMT array. Gamma rays that radiate the crystal layer create scintillations releasing light energy that is detected by the PMT array. A collimator made of lead is typically placed in front of the crystal layer in order to collimate gamma rays entering the scintillation detector. The collimator is composed of a ring or peripheral region of solid lead with an interior region of small lead tubes arranged in a honeycomb matrix. When installed within the scintillation detector, the collimator's solid lead edge region (e.g., first region) typically cover portions of the photomultipliers located along the periphery of the PMT array. These photomultipliers are partially or totally obscured from receiving light energy from scintillations occurring directly above their surfaces. Therefore, in the past, it was necessary to remove the collimator when performing calibration of the PMT array in order to effectively calibrate the peripheral PMTs.

When the scintillation detector is assembled, the photomultipliers are originally (initially) calibrated so that each have the same effective gain. The effective gain of a photomultiplier is composed of two values. The first value is the gain associated with the PMT itself, Gt, which is a result of the physical characteristics of the tube. The second component of the effective gain is the gain applied to the output channel signal for each PMT, Gp. This gain, Gp, is applied via preamplification circuits coupled to receive channel signal outputs originating from the PMTs of the PMT array. Together the effective gain of a photomultiplier is Gt * Gp and should remain fixed for proper operation of the gamma camera systems.

The characteristic gain, Gt, of a particular PMT may deviate over time due to several conditions, some of which are discussed herein. This causes the effective gains of the individual PMTs of the PMT array to vary independently over time. The characteristic gain, Gt, of a PMT may vary due to release of internal gases of the tube or due to erosion the photocathode of the PMT. Also, cracks within the PMT may cause leakage or a decrease in the vacuum of the tube which also will cause deviations in the characteristic gain due to ion interference within the multiplication process of the tube. Therefore, what is needed is a system for providing compensation or calibration to correct for the deviations in the characteristic gain of a particular PMT. The present invention offers such advantageous capability.

As is well known, uniformity correction tables or factors are provided within the signal processing and image generation circuitry of gamma cameras to correct for non-uniformities inherent in the scintillation detectors. These uniformity correction tables are generated within the gamma camera system typically at the manufacturing site (after initial calibration of the scintillation detector is complete) and can be generated empirically based on the characteristics of a particular scintillation detector. The correction factors are typically generated or created based on calibrated PMTs of the PMT array when the array is initially calibrated such that the effective gains of each PMT are uniform. Therefore, over time as the characteristic gains of the PMTs change, the responses of the scintillation detector will change with reference to the uniformity correction factors which stay constant over time. What is needed is a system that can compensate for this deviation so that the scintillation detector provides the same response (over time) as it did when it was initially calibrated and when the uniformity correction factors were generated. The present invention provides such advantageous capabilities.

In the prior art, the collimators are removed to perform gain calibration on the scintillation detector. Since the collimators used in gamma camera technology are relatively heavy (e.g., 500 lbs) and very awkward to handle, it is not advantageous to remove the collimators on a routine basis from the scintillation detectors. Therefore, what is needed is an automatic gain calibration system that can automatically adjust the preamplification gains of a PMT array while the collimator is allowed to remain installed on the scintillation detector. What is further needed is a system as above that allows calibration of the peripheral PMT whose center surfaces may be partially covered or totally covered by the solid lead edge regions of the collimator. The present invention allows such advantageous results.

Accordingly, it is an object of the present invention to improve signal processing within a gamma camera system. It is an object of the present invention to improve the gain stability of photomultipliers within a scintillation camera system. It is another object of the present invention to provide an automatic gain calibration system applicable for all PMTs of a scintillation detector while the collimator remains installed on the detector. It is further an object of the present invention to maintain the original calibration of the PMT arrays so that the effective gains of the PMTs substantially match the original detector response used in creation of uniformity correction factors. These and other objects of the present invention not specifically mentioned above will become clear within discussions of the present invention herein.

SUMMARY OF THE INVENTION

An automatic gain calibration system for photomultipliers of a scintillation detector operable during periods when a collimator is installed to the scintillation detector. The system provides for calibration of the photomultipliers (PMTs) that are located along the periphery of the detector whose surfaces are partially or totally obscured by the solid lead edge regions of the installed collimator (e.g., obscured PMTs). In such a manner, the entire scintillation detector may be calibrated effectively without removal of the heavy and awkwardly handled collimator. The automatic calibration system adjusts the preamplification gain associated with each channel of the PMT array to maintain the effective gain of each PMT in response to long term variations in the characteristic gain of each PMT. For calibration, the system measures the response of an obscured PMT to gamma events occurring within a thin strip area that extends into the central portion of the collimator. There is a separate strip area for each obscured tube. The preamplification gain of an obscured tube is then calibrated while the collimator is installed based on a recorded value of an originally calibrated response of the obscured PMT for gamma events within this strip area.

Specifically, embodiments of the present invention include in a gamma camera system having a scintillation detector with a photomultiplier array and a collimator, wherein each photomultiplier generates a channel signal, an apparatus for automatically calibrating gains associated with individual channel signals while said collimator is installed, said apparatus comprising: a processor for defining a strip area associated with an obscured photomultiplier of said photomultiplier array wherein said installed collimator covers a section of said obscured photomultiplier; said processor for recording a set of responses of said obscured photomultiplier for a sample of gamma events detected within said strip area; said processor for determining an average response of said set of responses; and said processor for automatically adjusting a preamplification gain associated with said obscured photomultiplier based on (1) a predetermined and stored reference response of said obscured photomultiplier and (2) said average response of said obscured photomultiplier. Embodiments include the above and wherein said stored reference response of said obscured photomultiplier is responsive to gamma events detected within said strip area and wherein said installed collimator comprises a first region obscuring gamma ray passage and a second region allowing passage of collimated gamma rays and wherein said obscured photomultiplier is aligned with said first region and wherein said strip region is aligned with said second region of said collimator.

Embodiments of the present invention also include the above and wherein: said processor determines a first response of the obscured photomultiplier at initial calibration of the scintillation detector based on gamma events occurring within the strip area when the collimator is removed, wherein the first response is the stored reference response and wherein the processor defines a central area associated with a central photomultiplier of the photomultiplier array wherein the central area is located above the surface of the central photomultiplier; the processor for recording a set of responses of the central photomultiplier for a sample of gamma events detected within the central area; the processor for determining a representative response of the set of responses of the central photomultiplier; and the processor for automatically adjusting a preamplification gain associated with the central photomultiplier based on (1) a predetermined and stored reference response of the central photomultiplier and (2) the representative response of the central photomultiplier, and wherein the central photomultiplier is aligned with the second region of the collimator.

Embodiments of the present invention also include a system similar to the above however the calibration system is based on measurements of the total energy (as reported by the PMT array) of gamma events occurring within the strip region instead of the response of a particular PMT. The present invention includes methods implemented in accordance with the above embodiments.

BRIEF DESCRIPTION OF THE DRAWINGS

FIG. 8 is an illustration of the PMT address table circuit of the present invention Digital Event Processor.

FIG. 9 is an illustration of the x and y weight table circuit of the present invention Digital Event Processor.

FIG. 18 illustrates the memory circuit of the present invention for providing far PMT addresses based on an input peak PMT address.

DETAILED DESCRIPTION OF THE INVENTION

The present invention includes an apparatus and method for performing automatic gain calibration for PMTs of a scintillation detector without requiring removal of the detector's collimator. Information is stored based on initial calibration of the scintillation detector typically at the manufacturing site. In operation at the operational site, an obscured PMT's response (e.g., aligned with the collimator's edge or "first" region) is recorded for gamma events occurring within a strip area that lies within the tubed or "second" area (e.g., the nonobscured area) of the collimator. This information is compared against information recorded at the initial calibration over that same area when the collimator was removed. The gain for the obscured PMT is then adjusted up or down accordingly.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
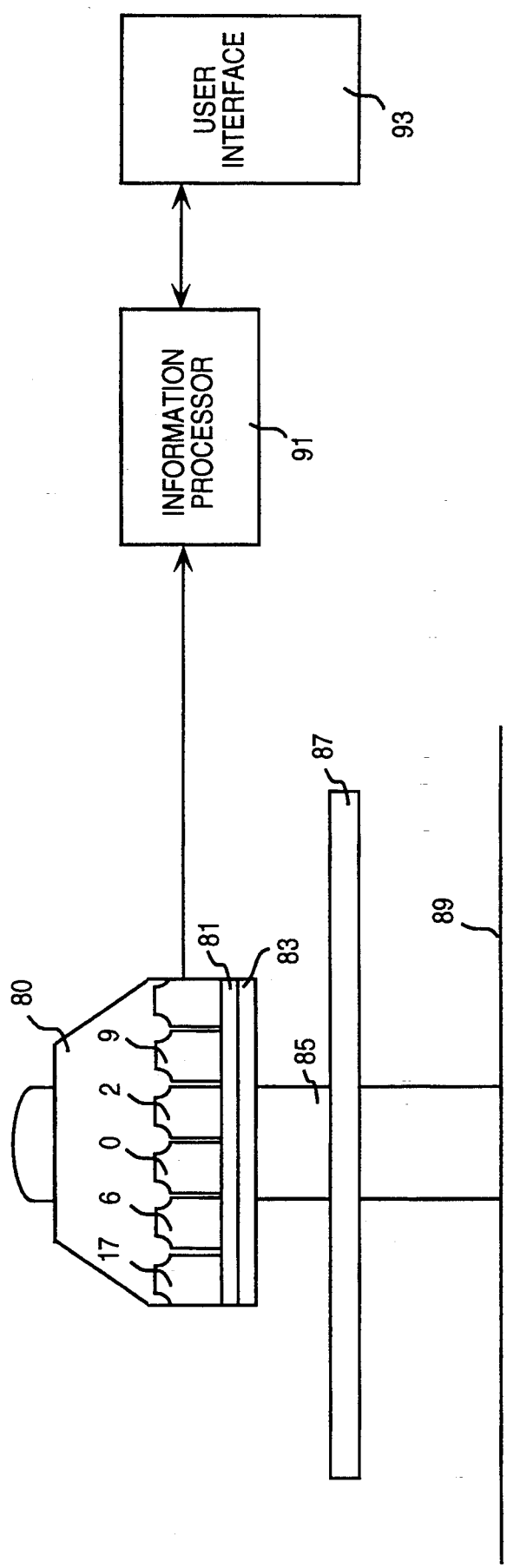
FIG. 1 illustrates a high level block diagram of the gamma camera detector, information processor and user interface device of the system of the present invention.

The various embodiments of the present invention described herein are used in conjunction with a scintillation detector of a gamma camera. With reference to FIG. 1, a high level diagram of a gamma camera system is shown. Generally, the system of the present invention includes gamma camera detector 80 composed of a plurality of photomultiplier tubes (e.g., 17, 6, 0, 2, 9), PMTs, arranged in a two dimensional matrix convention and optically coupled to a glass plate to receive light (e.g., visible photons) from a crystal layer 81. The PMT array creates a photodetector. The crystal layer can be composed of sodium iodine, NaI, and is typically located between a collimator 83 and the PMT array. The collimator 83, as is known, is typically manufactured from a number of holes with lead septas arranged in a honeycomb convention to collimate gamma rays that strike the crystal 81.

Gamma rays that strike the NaI(Tl) crystal 81 cause well known scintillation events that release a number of visible light photons that are detected by the PMTs with different light intensities. Each PMT reports in the form of an analog signal indicative of the amount of light energy detected as a result of the scintillation event. The gamma camera detector 80 utilized within the scope of the present invention is of the Anger type and can be of a number of well known and commercially available designs and therefore the details of such a gamma detector will not be discussed in depth herein. An exemplary gamma camera detector used by one embodiment of the present invention can contain as many as 55 or 108 PMTs. The detector 80 can also utilize smaller diameter PMTs along the edges to increase the detector's field of view. An embodiment of the present invention utilizes forty-nine 76 mm round PMTs and six 51 mm round PMTs for edge filling, however, the number of PMTs, their sizes and their configurations can be varied within the scope of the present invention.

The detector 80 of FIG. 1 is mounted on a gantry 85 which can rotate the detector 80 in various orbits around an object (patient) resting on table 87 (e.g., for ECT scanning operations). The gantry and table rest on base 89. The detector 80 may also be directed transversely across the table 87 (e.g., for total body scanning operations) or placed over the patient for static imaging.

The analog output signals from each of the 55 PMTs are output to an information processor 91 that includes a general purpose digital computer system as described to follow. The processor 91 contains circuitry for adjusting and compensating the signals received from each PMT and also for digitizing these signals. Utilizing techniques as will be further discussed to follow, processor 91 computes, among other values, the spatial coordinates (X, Y) and energy coordinate, Z, for each gamma event. Imaging information detected by the gamma detector over sampling periods is then stored in digital storage memory (e.g., counts per coordinate) and is visualized on a monitor (or a hardcopy device) of a user interface device 93 in response to commands from the user interface device 93.

Information Processor

The circuitry and logic of information processing unit 91 of the present invention is further illustrated within the following figures: FIG. 2A, FIG. 2B, FIG. 2C, and FIG. 2D. It is appreciated circuitry of the above can alternatively be located within the detector head 80 itself or spread among both the detector head 80 and the processor 91. It is further appreciated that the processor 91 also comprises a general purpose computer system 1112 (see FIG. 5) as will be discussed in more detail. An embodiment of the present invention can also be implemented utilizing discrete electronic components in lieu of a general purpose computer system or, alternatively, a general purpose computer system can be used.

Trigger Detection

Figure 2A:
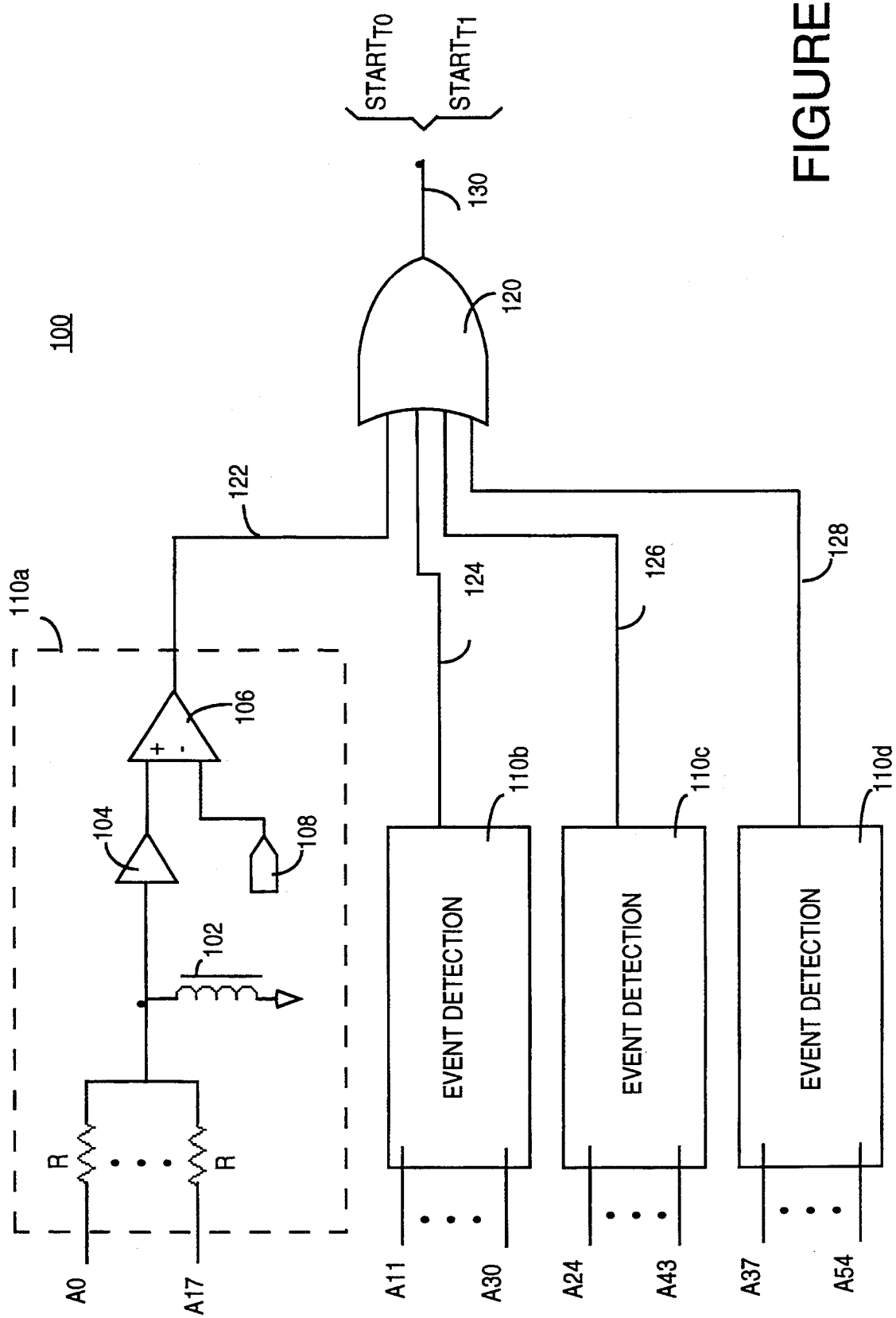
FIG. 2A is a circuit block diagram illustrating elements of the trigger generation logic of the present invention.

Regarding FIG. 2A, the trigger signal generation circuit 100 of the present invention is illustrated. According to the arrangement of the PMTs in the detector, the output of each PMT (compensated as shown herein) associated with a particular spatial quadrant (or "zone") of the detector matrix is sent to one of four trigger detection circuits 110a, 110b, 110c or 110d. Although the precise alignment of each PMT in each zone is not critical to the present invention, the zones are overlapping. The PMT signals A0–A54 are voltage signals. The signals of the first zone, A0 . . . A17 are sent to trigger circuit 110a where each is coupled to an inductor 102 and an amplifier 104 which together create a 200 ns clip circuit.

The clipped signal from circuit 104 is coupled to the positive end of a discriminator circuit 106 and a computer controlled reference input is coupled to a threshold input circuit 108. The reference signal at 108 is coupled to receive the output of a computer controlled DAC (not shown). Therefore, only trigger signals over the threshold voltage are allowed to pass through circuit 106 and they are clipped to 200 ns. The output of the comparator 106 is then coupled to the input of OR gate 120 via line 122. Line 130 will assert a triggering pulse when ever a PMT of the designated zone detects an event. This circuitry is replicated for each of the other four zones of the detector PMT matrix (e.g., signals A11 . . . A30 feed circuit 110b which generates a trigger over line 124, signals A24 . . . A43 feed circuit 110c which generates a trigger over line 126, and signals A37 . . . A54 feed circuit 110d which generates a trigger over 128). It is appreciated that additional or fewer event detection circuits (e.g., for more zones) can be used within the scope of the present invention. Multiple trigger channels are used to maintain a high signal to noise ratio in the presence of correlated noise. The trigger channels are overlapped, as discussed above, to prevent sensitivity loss at the zone boundaries.

Trigger input lines 122, 124, 126, and 128 of FIG. 2A are coupled to the input of OR gate 120. Therefore, when an event is detected by the camera detector 80, OR gate 120 of trigger circuit 110 of the present invention will generate a trigger pulse over line 130. These triggering pulses are called Start(t0) and Start(t1) and are used by the integration circuits 280(0)–280(54) (FIG. 2C) of the present invention to start integration of the PMT signals for the detected gamma event.

Analog Sum of Global Energy

Figure 2B:
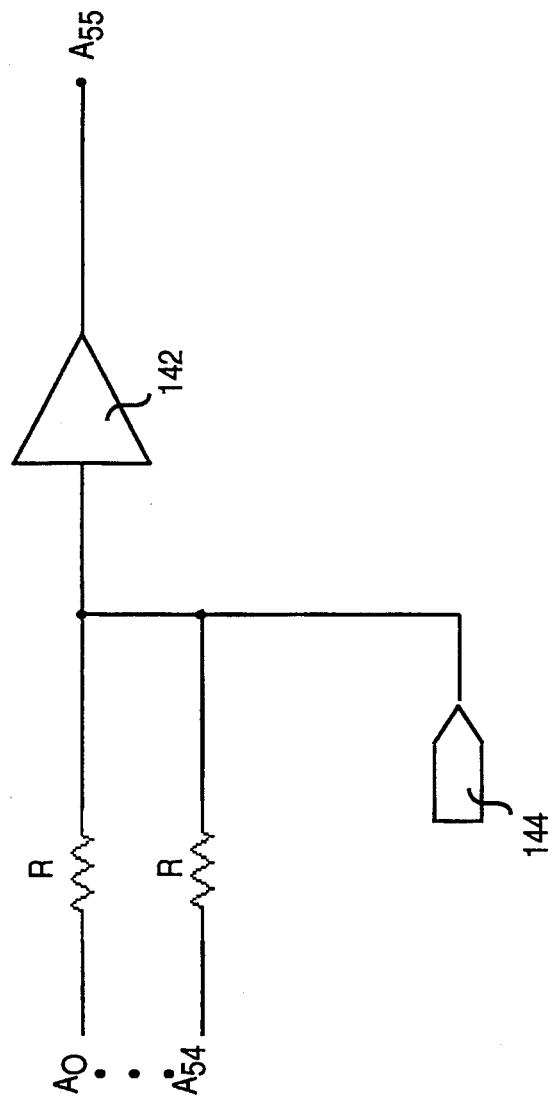
FIG. 2B is a circuit diagram of the circuitry utilized by the present invention for generating an analog total ("global") energy signal.
Figure 2C:
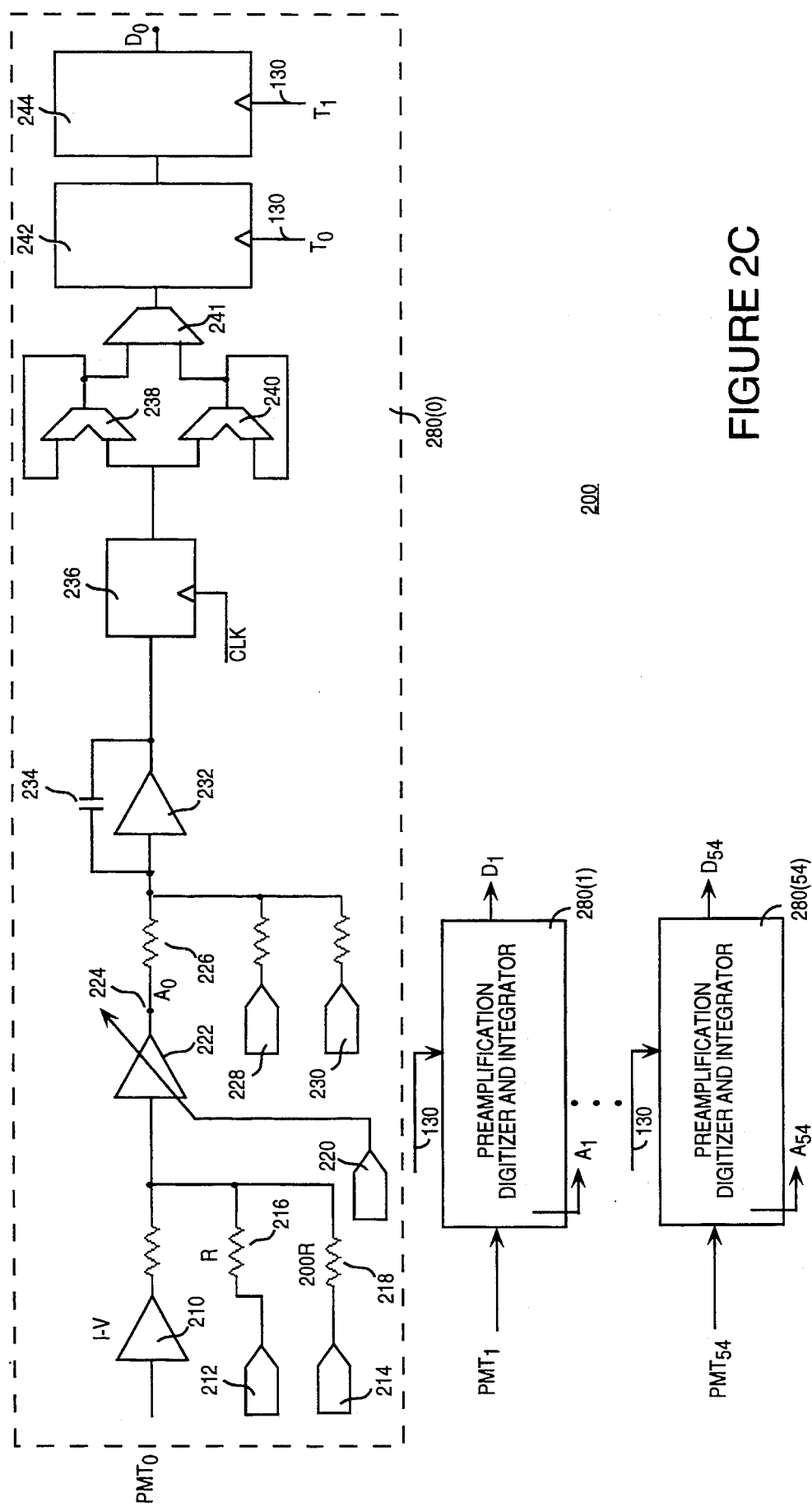
FIG. 2C illustrates the logic of the present invention (utilizing dual integrators per channel) for providing a compensated digital response signal that is digitally integrated for each PMT of the gamma detector.

Refer to FIG. 2B which illustrates an analog summing circuit utilized by one embodiment of the present invention. The voltage signals A0 . . . A54 from each PMT channel (e.g., signal from each PMT) are summed together and output by amplifier 142. An offset voltage is fed into the summing circuit via input 144. The offset voltage is controlled by a computer controlled DAC. The output, or total energy of the gamma event, is generated over line A55. This output represents the analog sum of all of the voltage signals from each PMT channel plus an adjustable offset from circuit 144. The analog signal over A55 is called the analog global energy signal. This global energy signal may be supplied to an available channel (e.g., channel 55) for preamplification, digitization and integration by circuit 200 (FIG. 2C). The Digital Event Processor of the present invention receives signal A55. As will be discussed to follow, the global energy value may also be computed digitally by summing the digitized integrated channel signals of the PMTs. Either of these methods may be utilized within the scope of the present invention.

Preamplification Digitizer

Refer to FIG. 2C which illustrates the preamplification digitizer circuits 200 of the present invention for each of the 55 channels (plus one for A55). These circuits perform the preamplification, digitization, and integration for each analog voltage signal for a PMT channel. As will be discussed, each preamplification digitizer circuit for each channel contains two separate integrator circuits. Circuit 280(0) corresponds to the current output signal received directly from PMT #0 (e.g., channel 0) and this circuit 280(0) is separately replicated for each of the 55 PMT channels of the present invention and, as shown, circuits 280(0) to 280(54) operate to simultaneously process the current output signals for PMT0 to PMT54. Regarding circuit 280(0), the current signal output of PMT0 is fed into a current to voltage converter 210 and the output of this signal is fed through a resistor to a voltage gain amplifier 222.

A computer controlled digital to analog converter (DAC) outputs two adjustment signals over line 212 and 214 for baseline voltage correction. The signal over line 212 is fed through a resistor 216 for coarse adjustment and line 214 is fed through resistor 218, which has much larger resistance (e.g., on the order of 200×) than resistor 216, for fine adjustment. The signals received via lines 212 and 214 provide a baseline offset voltage adjustment to the output signal received from the PMT0. A computer controlled digital to analog converter (DAC) outputs a voltage adjustment signal to circuit 220 to control the gain of amplifier 222 having an exemplary gain adjustment of 10:1. The analog gain adjustments are coarse adjustment with fine gain adjustments performed by the calibration table, see FIG. 2D as discussed to follow. The baseline offset adjusted signal and the gain adjusted signal is then output at point 224 as signal A0 for each channel. Similarly, for each PMT channel, the above circuitry is replicated for generating signals A1 to A54. The trigger signal 130 is uniformly supplied to each of the circuits 280(0) to 280(54) so that each channel is triggered coincidentally.

The output of gain amplifier 222 is then fed into resistor 226. The voltage input 228 and voltage input 230 are coupled through respective resistors to the output of resistor 226. The output of resistor 226 is then fed into amplifier 232 and capacitor 234 in series. The outputs of the amplifier 232 and capacitor 234 are then coupled to the input of the analog to digital converter (ADC) 236. The above circuit (e.g., from point 224 to the input of ADC 236) is utilized for pulse insertion used for diagnostic purposes that are not particularly pertinent to the present invention. Pulses may be artificially inserted via inputs 228 and 230.

Referring to FIG. 2C, the ADC 236 converts the analog signal A0 to digital samples based on the frequency of clock input as shown. One embodiment of the present invention utilizes a sample frequency of 25 MHz as a sample clock. The output of ADC 236 is then fed to the input of two adders 238 and 240 coupled in an integration configuration. The present invention utilizes dual digital integrators for each PMT channel in order to more effectively process conditions wherein two gamma events are detected in close temporal proximity. Each integrator 238 and 240 contains a separate register (accumulator) for containing the current sum value and performs piecewise linear integration with a clip binary value at 1023 (e.g., no rollover is allowed). The output of both integrators is coupled to multiplexer 241. The multiplexer 241 selects between one of the two integrator registers (accumulators) for output to the latch circuits 242 and 244. Latch circuits 242 and 244 comprise a two stage FIFO arrangement. The trigger pulses Start(t0) and Start(t1) received over 130 are used to reset the integrators. At the end of an integration period, the value of the integration process for either integrator is then stored within a two stage latch circuit of 242 or 244. The output of the latch circuit 242 or 244 is the digitized value of the signal generated by PMT0 for a given event and this value is designated as D0. The digitized signal D0 is supplied to the Digital Event Processor 300. The above is explained in more detail with reference to FIG. 6B.

Using the dual integrators of FIG. 2C of the present invention, either one or both of the accumulators of 238 or 240 can be enabled to integrate an incoming signal from the output of ADC 236. The two integration resulting are multiplexed onto a common data path and either result can be selected and stored in the two stage latch circuit. Each integrator may be separately triggered by start(t0) and start(t1). In operation, when a trigger signal occurs, if either integrator is available (e.g., not integrating and not holding an integrated result) then that accumulator is reset and enabled to begin integrating the event. When either of the accumulators completes, the integrated value is transferred to the first FIFO stage (e.g., latch 242) assuming this stage is available. If it is not available, the accumulator holds the value. Integration continues for a predetermined period of time (the camera's dead time) after the trigger signal until a sufficient amount of the gamma event's energy is integrated. Values are transferred from FIFO stage 1 (latch 242) to FIFO stage 2 (e.g., latch 244) as FIFO stage 2 becomes available (e.g., transfer its value). When data is written to FIFO stage 2, the present invention signals that data is ready to be transferred to the Digital Event Processor (DEP) 300, see FIG. 2D.

Referring to FIG. 2C, the dual accumulator design of the present invention provides an implicit mechanism for handling event pile-up where two events interact during the same time period. Since the present invention computes positions based on local PMT clusters, pile-up events which occur in different regions of the detector can be properly positioned and such are called temporal pile-ups. If the two events that are involved in a temporal pile-up happen to be separated by more than the trigger channel deadtime, then both accumulators will be enabled and both events will be fully integrated. Accuracy of positions will be impacted by the spatial distance separating the events. The greater the separation, the lower the impact. This is discussed in more depth below.

The circuit 280(0) is replicated for each channel as shown in FIG. 2C. The output current signals from PMT#1 through PMT#54 are fed into circuits 280(1) through 280(54). The digital data signals D0 to D54 are output from circuits 280(0) through 280(54), respectively. Each of the 55 preamplification digitizer circuits 280(0)–280(54) are coupled to receive two trigger signals start(t0) and start(t1) from line 130. It is appreciated that an extra channel (e.g., a preamplification digitizer circuit 280(55)) may be added in order to process the analog global energy signal from A55 (see FIG. 2B). In this embodiment, the output D55 would correspond to the amplified, digitized and integrated value for all channels (e.g., the digitized value of the analog global energy of the event). In such an embodiment, the value D55 would be output to the DEP 300 (as will be discussed to follow) with an appropriate PMT address value indicating the data as analog global energy data.

The preamplification circuits of FIG. 2C can be directly adjusted using gain (e.g., line 220) and baseline offset (e.g., lines 212 and 214) adjustments. The above adjustment lines are referred to as control link signals which are coupled to computer controlled addressable DACs. The amount of nominal baseline and the amount of variation associated with levels of adjustment can be used to determine the accuracy of a given channel.

At the completion of an integration period, when latch 244 data is present, then all of the digital data stored in each second stage latch for each channel is transferred to the DEP 300 (FIG. 2D) over bus 307. This is called a data "transfer" to the DEP 300.

Digital Event Processor

Figure 2D:
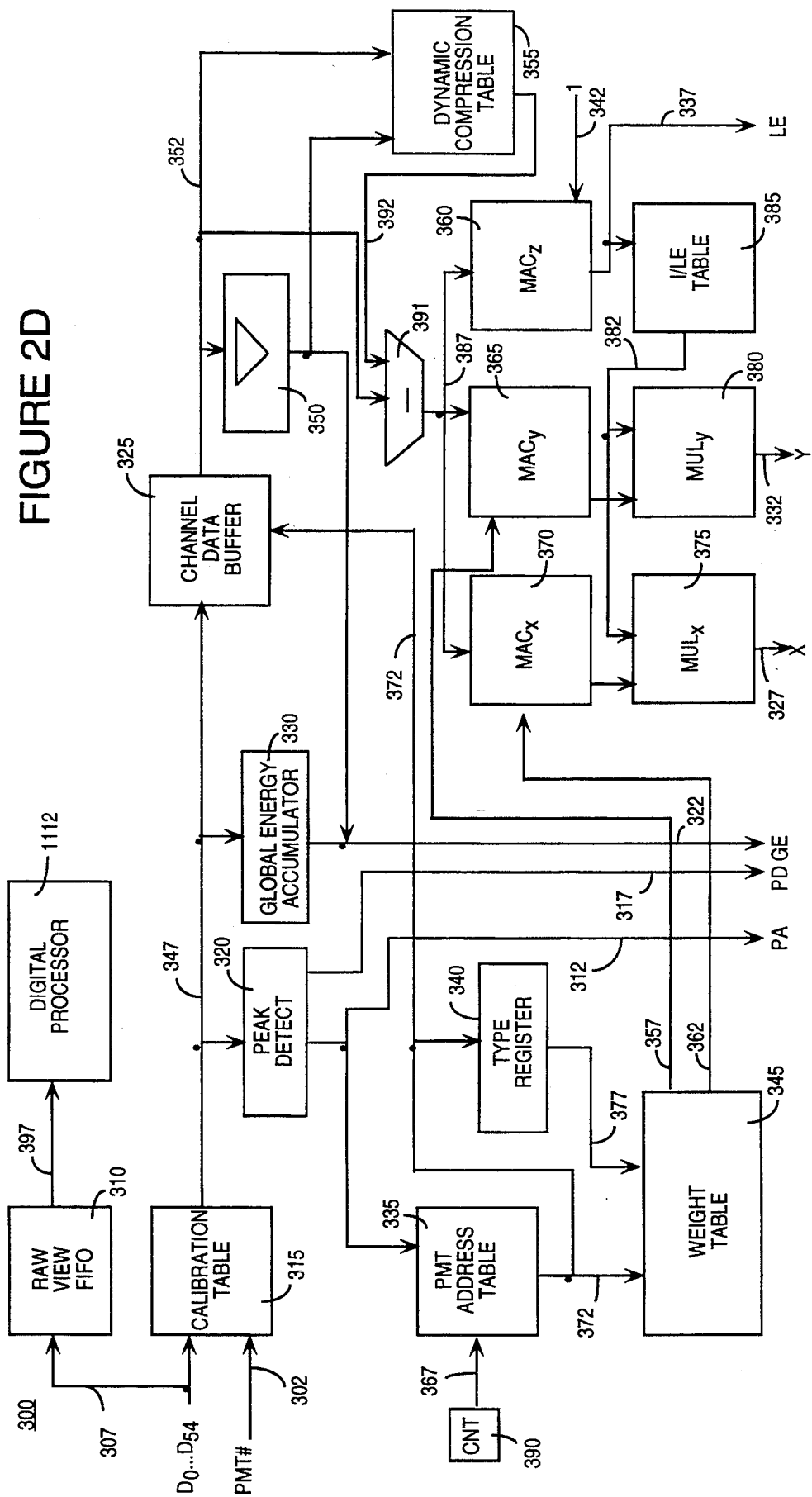
FIG. 2D illustrates the processing blocks of the present invention Digital Event Processor for generation of the spatial coordinates of an event, local and global energy, peak PMT address and the associated signal output.

Refer to FIG. 2D which illustrates circuitry 300 of the Digital Event Processor (DEP) of the present invention. The digitized and integrated signal values for the PMT channels over lines D0 through D54 are fed over bus 307 to FIFO 310 and to calibration table 315. The data over bus 307 represents the digitized integrated signals supplied from each PMT channel circuit, 280(i), in response to a triggering event such as a scintillation event. The digitized data over bus 307 is stored into a raw view FIFO 310 that can be accessed over bus 397 by a digital processor computer 1112. The raw view FIFO allows data to be pulled from the input data stream without interrupting the normal data flow from the PMTs. This is utilized for on-the-fly baseline adjustment. A calibration table 315 receives as inputs (1) the digitized integrated channel data from bus 307 and also receives (2) PMT address (e.g., indicator) number over bus 302 of the reporting PMTs in order to correlate the digital data over bus 307 with the proper PMT channel output from circuits 280(i).

The calibration table 315 contains a lookup table (LUT) for providing a gain output which can vary with the PMT number input (represented in one embodiment as an address); this spatially variant gain is applied to the integrated signal value received over bus 307 and the result is output over bus 347 which is a corrected or finely compensated integrated signal value for each PMT channel. The gain value stored in the calibration table 315 is a fine gain adjustment dependent on the PMT number whereas the gain amplifier 222 is a coarse gain adjustment. The calibration table 315 also provides a baseline adjustment computation by digitally subtracting the reference voltage inserted by the baseline offset circuitry (e.g., inputs 212 and 214) of the preamplification circuits for each PMT channel independently. The output over bus 347 is the digitized values supplied from 307 with this baseline adjustment.

The output of the calibration table 315 is transferred over bus 347 to a peak detect circuit 320 which analyzes all the calibrated results of all 55 channels (for a given data transfer) and selects the PMT number having the largest integrated channel signal (e.g., "energy") output for a given measured event; this is the "peak PMT." The maximum integrated signal value and the associated channel address are retained for later use in the DEP process of the present invention. The integrated signal associated with the peak PMT is output from peak detect circuit 320 over bus 317 as value PD. The PMT address number associated with the peak PMT is output by circuit 320 over bus 312 as value PA. To support analog global energy data being transferred over a digitizer channel of 280(i), the peak detect 320 can be disabled for a given PMT address. Bus 347 is also coupled to a global energy accumulation (GE accumulation) circuit 330. Circuit 330 sums the corrected integrated channel signals output over bus 347 for each of the PMT channels for a given event. The output of circuit 330 is the digitized global energy GE (which is a digital sum of all of the PMT's digital integrated signals) and is transferred over bus 322 which forms output GE and also is coupled to the dynamic compression table 355.

Buffer 325 stores the digital integrated signal value of each PMT channel correlated with the appropriate PMT address received over bus 347. Buffer 325 can be implemented in RAM or other memory storage device. The PMT integrated signal values for all channels are stored in buffer circuit 325. The address of the peak PMT is output over bus 312 to circuit 335 which is the PMT address table. Circuit 335 contains a lookup table that outputs a PMT cluster based on a peak PMT address input from bus 312. The PMT cluster is a collection of PMTs whose integrated channel responses (as well as a total energy for the event) are used to perform the DEP computation to determine the spatial location of the event (e.g., the centroid of the cluster). By using a lookup table at circuit 335, the present invention is able to provide spatially variable cluster shape and to vary spatially the number of PMTs that form a given PMT cluster. Within the scope of the present invention, for an input peak PMT address, the shape of the resultant PMT cluster and the number of PMTs that make up the selected PMT cluster vary based on the spatial location of the peak PMT address within the overall PMT matrix. It is appreciated that the PMT address table 335 may vary the PMT cluster associated with the peak PMT address based on a selection for high or low resolution wherein a low resolution mode may require 7 PMTs per PMT cluster where a higher resolution mode may require 9 to 19 PMTs per PMT cluster. Therefore, a resolution indication signal (not shown) is also input to the table 335. It is appreciated that in lieu of a resolution indicator signal, the entire table 335 may be reloaded with data for different desired resolutions. In such case the resolution signal is not used as an addressing signal but only initiates the downloading of the new information.

A sequence counter 390 is coupled to the PMT address table 335 via bus 367. The PMT address table 335 controls (1) the number of PMTs in the selected PMT cluster for the given event and (2) the type value of the PMT cluster (which is then stored in circuit 340 and held throughout the spatial computation for a given event). The PMT address table 335 also contains the address of the analog global energy channel. The sequence counter 390 then counts, sequentially, from one to the number of PMTs that are associated with the selected PMT cluster and sequentially presents each count value over bus 367. In one embodiment, the PMT address table 335 is itself addressed by two values, (1) the MSB of the address that originates from the peak PMT address value over bus 312 and (2) the LSB of the address value that originates from the count value of the sequence counter 390 over bus 367. The last entry within the PMT address table for a given peak PMT includes a stop code that indicates the end of the PMT cluster constitution for that peak PMT address. The centroid computation circuitry therefore stops (e.g., is terminated) when the stop code is reached (or equivalently when the maximum count value is reached as reported by the table 335).

The PMT address table 335 outputs over bus 372, in sequence based on the sequence counter 390, the PMT addresses of each PMT of the PMT cluster used in the spatial computation for a given event. The order in which these PMTs are presented over bus 372 is governed by the lookup table stored in the PMT address table 335 based on the peak PMT address value from bus 312 and the count value over bus 367. The PMT address values output from circuit 335 are also coupled to data buffer 325 to address this memory circuit which will output the appropriate integrated channel signal value over bus 352 for that PMT. This output is used in the DEP's spatial computation.

Referring still to FIG. 2D, the PMT cluster type value is output from the PMT address table 335 to the memory circuit 340 which holds the PMT cluster type value throughout a centroid (e.g., coordinate) computation. The PMT address values over bus 372 are also fed to a weight table circuit 345 that contains a lookup table correlating PMT address value with a given x and y weight value used for the spatial computation circuitry of the present invention. By providing the lookup table within circuit 345, the weight associated with a given PMT depends on its address value and is correlated with the spatial location of the PMT and it is also dependent on the PMT cluster type value from bus 377.

The weight value associated with a given PMT address can also vary based on the type value stored in 340 which is based on the peak PMT for the PMT cluster of the given event; this is accomplished by the type registration circuit 340 of the present invention. Therefore, if the peak PMT address corresponds to be an edge or corner PMT, then the PMT cluster will be of a special type and the weights associated with the PMT addresses of the resultant PMT cluster can be adjusted to account for the missing PMTs of the centroid computation (e.g., the PMTs that are not available due to the edge or corner location of the peak PMT). Therefore, the PMT weight value output from circuit 345 depends on (1) the PMT address value and (2) the type value from circuit 340 that is based on the address value of the peak PMT for the PMT cluster. The PMT address table 335 defines the PMT addresses that constitute the selected PMT cluster.

In one embodiment, the type registration circuit 340 may contain a lookup table based on the peak PMT address value output from circuit 335. As discussed, the PMT cluster type value is an offset into the weight table 345 for a given PMT cluster and is used to provide variations in the weights output of the weight table 345 for a given PMT address value of a given PMT cluster. Circuit 340 is coupled to supply the offset value to circuit 345 via bus 377. According to the operation of the present invention, for a given PMT cluster, the PMT addresses that make up the PMT cluster are sequentially output over bus 372 to the weight table and a constant type value is generated and output over bus 377 (based on the address of the peak PMT). The weight table 345 then outputs an x weight over bus 362 and a y weight over bus 357, for each PMT of the given PMT cluster.

The x weight value over bus 362 of FIG. 2D supplies a multiplier accumulator circuit (MACx) 370 for the x coordinate computation and the y weight value over bus 357 supplies a multiplier accumulator circuit (MACy) 365. These circuits 370 and 365 are reset and initialized at the start of the spatial computation for each gamma event. The x and y weight values are utilized in the spatial computations for a given event (e.g., gamma interaction) and specify the amount of contribution a given PMT's integrated channel signal value should carry (for a given PMT of the PMT cluster) in the coordinate computation process.

As discussed above, the PMT addresses of the PMTs of a given PMT cluster are placed over bus 372 in sequence. Bus 372 of FIG. 2D is coupled to address the buffer 325 with the PMT address value for each PMT involved in the PMT cluster. In response to the address value of a given PMT of the PMT cluster, buffer 325 outputs the stored and corrected digital signal value associated with the PMT (for a given event) as received over bus 347. This corrected signal value is transferred over bus 352 to block 350, to block 355 and to subtractor 391. A circuit 360 is coupled to receive the digital signal values of the PMT's involved in the given PMT cluster and accumulates these values to provide a local energy (LE) value which is generated over bus 337.

Block 350 is a buffer for containing either a digital or analog global energy value when operating in a mode wherein the global energy data is transferred over a digitizer channel and stored in the storage buffer 325. In this mode the global energy stored in block 350 is a digitized version of the analog global energy signal. Output from the analog signal A55 (of FIG. 2B) is fed to a preamplification digitizer channel of 280(i) and then over bus 307 to the calibration table 315 and stored in buffer 325. The global energy may also be computed by accumulator 330 by adding the values of the integrated signals from each PMT channel. The global energy value is then stored in buffer 350. Therefore, the global energy value GE over line 322 can be (1) a digitized value of the analog global energy value or (2) a digital summed value of the digital signals of each PMT channel.

The dynamic compression table 355 of FIG. 2D receives the global energy value of the detected gamma event over bus 322 and also receives the digitized integrated channel signal value for a given PMT of the PMT cluster over bus 352. The dynamic compression table 355 contains a lookup table of compensation values for the digitized integrated channel signals. The output of the lookup table is driven on bus 392 to a subtractor 391 which also receives the signal value over bus 352. The table 355 receives as an address the MSBs of the global energy (from bus 322) and predetermined bits of the signal value for each PMT over bus 352. Via the connection with the subtractor 391, the signal data over line 352 is shifted left by four bits (e.g., multiplied by 16). The output from table 355, in one embodiment, is subtracted from this left shifted signal value. The output of the subtractor circuit 391 is the dynamic compressed integrated signal value for a given PMT channel and is then fed to the MACx 370 circuit, the MACy circuit 365 and also to an energy multiplier accumulator (MACz) circuit 360.

The dynamic compression table 355 of FIG. 2D is utilized by the present invention to alter the integrated channel signal output from a PMT channel so that when summed with altered signals from other channels, the summation signal will be more linear in nature. The information stored in the dynamic compression table 355 that is used to perform the signal conversion is readily programmable within the present invention and different conversion data sets may be stored (down loaded) in the table 355 at one time. Since the conversion data may be altered readily (e.g., a new set can readily be downloaded, if needed) the dynamic compression table 355 of the present invention is modifiable. The subtraction logic 391 is a part of the compression procedure used by the present invention and is used in order to reduce the memory size requirement of the compression table 355. Therefore, it is appreciated that, given a larger memory size, the subtractor 391 may be eliminated from the present invention and integrated into the memory 355 by altering the data stored therein. The output of the dynamic compression table 355 is called the "dynamic compressed" or "compressed" integrated signal data for a particular channel and is supplied to the centroid computation logic via bus 387.

Therefore, as the sequence counter 390 counts through the PMTs of the PMT cluster, the buffer 325 supplies the integrated signal associated with each PMT. Also, the weight table 345 supplies the x and y weight values associated with each sequenced PMT. The MACx circuit 370 multiplies the x weight value and the dynamic compressed signal for each PMT and accumulates these values for each PMT of the PMT cluster as the sequencer counts. The MACy circuit 365 multiplies the y weight value and the dynamic compressed signal for each PMT and accumulates these values for each PMT of the PMT cluster as the sequencer counts. The MACz circuit has two inputs, one is coupled to bus 342 which is programmed to a value of "1," and the other input is coupled to bus 387 and therefore will accumulate the integrated signal of each of the PMTs of the PMT cluster to generate a value of the local energy (LE) over bus 337.

After the sequencer 390 reaches the last PMT of the PMT cluster, the MACz circuit will output the complete LE value over bus 337 which is coupled to a 1/LE circuit 385. This is a lookup table that provides the inverse (e.g., $(LE)^{-1}$) of the LE value. Circuit 385 can also be realized using a divider circuit. The value of (1/LE) is then output over bus 382 to x multiplier circuit (MULx) 375 and also y multiplier circuit (MULy) 380. Circuit 375 multiplies the accumulated result of the MACx circuit 370 with the (1/LE) value to generate the normalized x coordinate of the gamma event over bus 327. Circuit 380 multiplies the accumulated result of the MACy circuit 365 with the (1/LE) value to generate the normalized y coordinate of the gamma event over bus 332. Therefore, the DEP 300 of the present invention computes the spatial coordinates (x, y) and the total energy (GE) of each gamma event. Also produced for each event is the peak PMT energy (PD) which is the peak signal of the integrated channel signals received by the DEP, peak PMT address (PA) and the local energy (LE).

The spatial coordinates (x, y) of a gamma event (interaction) are computed by the DEP 300 circuit using the below centroid computation:

$$x = \frac{Wx_1 * E_1 + Wx_2 * E_2 + Wx_3 * E_3 + \ldots + Wx_n * E_n}{E_1 + E_2 + E_3 + \ldots + E_n}$$

$$y = \frac{Wy_1 * E_1 + Wy_2 * E_2 + Wy_3 * E_3 + \ldots + Wy_n * E_n}{E_1 + E_2 + E_3 + \ldots + E_n}$$

Where:
- $Wx_i$ = the x weight from circuit 345 for the $i^{th}$ PMT of the Cluster
- $Wy_i$ = the y weight from circuit 345 for the $i^{th}$ PMT of the Cluster
- $Wx_n$ = the x weight from circuit 345 for the last PMT of the Cluster
- $Wy_n$ = the y weight from circuit 345 for the last PMT of the Cluster
- $E_i$ = the integrated signal for the $i^{th}$ PMT of the PMT Cluster
- $E_n$ = the integrated signal for the last PMT of the PMT Cluster The DEP 300 operates as discussed above for each detected gamma event of an imaging session and stores the above information to a computer memory storage unit. This information is then transferred to correction electronics (or CPU system) where the data is corrected for energy, linearity, and uniformity. It is appreciated that a number of well known methods and circuitry components may be used for collecting the count data output from the DEP 300 circuit and for forming an image based thereon by correcting the data supplied from DEP 300 (e.g., for nonunifomities, etc.) and spatially recording the counts. Any of these well known methods may be used in conjunction within the present invention.

Figure 3:
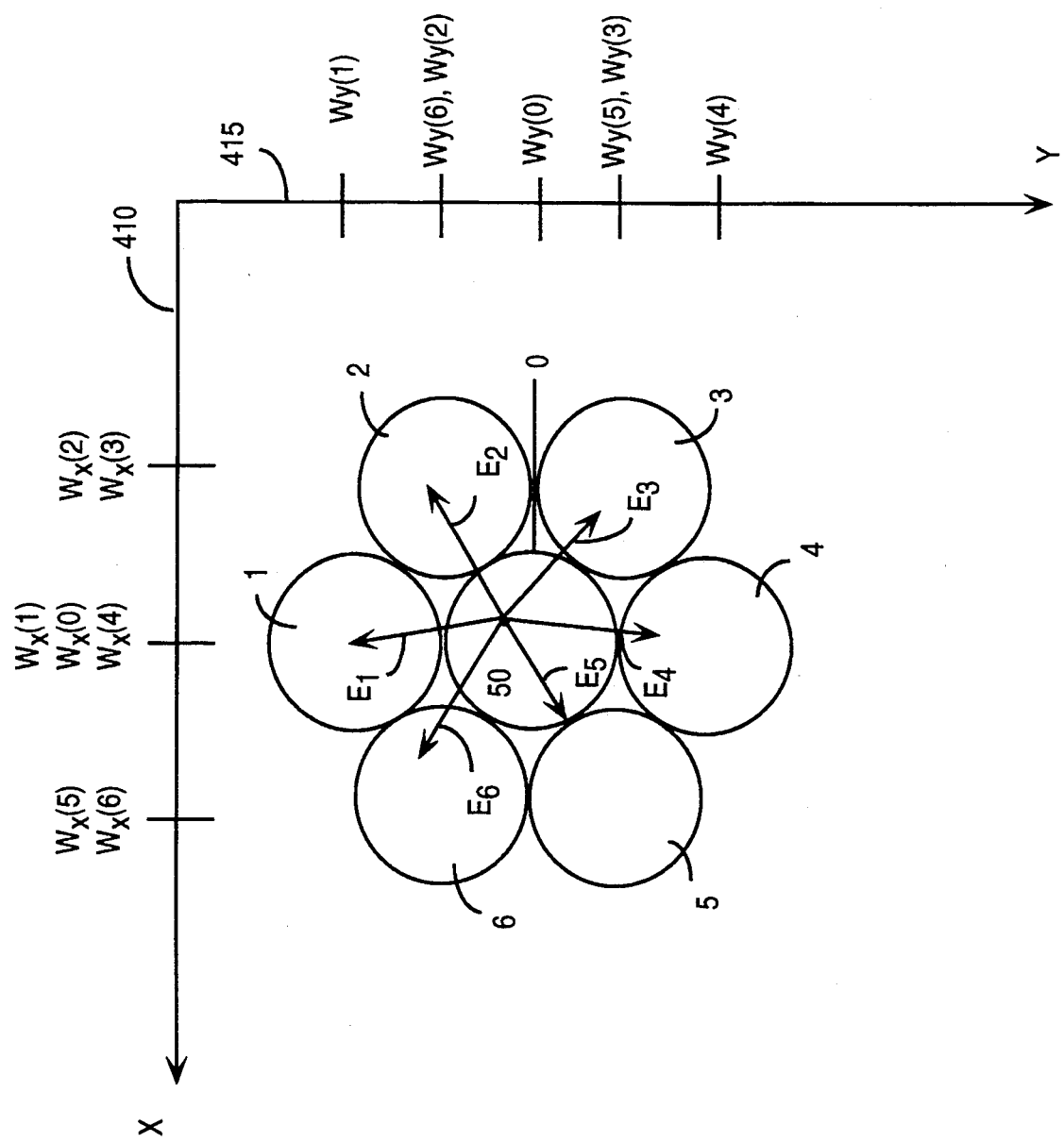
FIG. 3 is an illustration of a weighted centroid computation for determining the spatial coordinates of an event used by the present invention.

FIG. 3 illustrates the applicability of the above spatial computations and gives an exemplary situation. FIG. 3 illustrates a selected PMT cluster configuration as is generated based on the peak PMT address (here it is PMT0) and based on the PMT address table circuit 335. Low resolution computation is selected in this example so the PMT cluster is composed of seven PMTs (six surrounding and one center PMT). The address table circuit 335 would also output a type registration to circuit 340 to indicate that the PMT cluster is of a symmetrical or normal type because the peak PMT is not located on the edge nor in a corner of the PMT array of the detector head 80. An exemplary x axis 410 and y axis 415 are shown and the weight values for each of the PMTs for the x and y axis are plotted along the axis for each PMT.

The exemplary event occurs at point 50 within FIG. 3 and the arrows extending outward represent the amount of light received by each PMT toward which the associated arrow points. The weight values for each of the PMTs in the x and y directions are also dependent on the spatial location of the peak PMT because the location of the peak PMT will alter the PMT type value which is used (in conjunction with the PMT address) to address the weight table circuit 345.

Figure 4A:
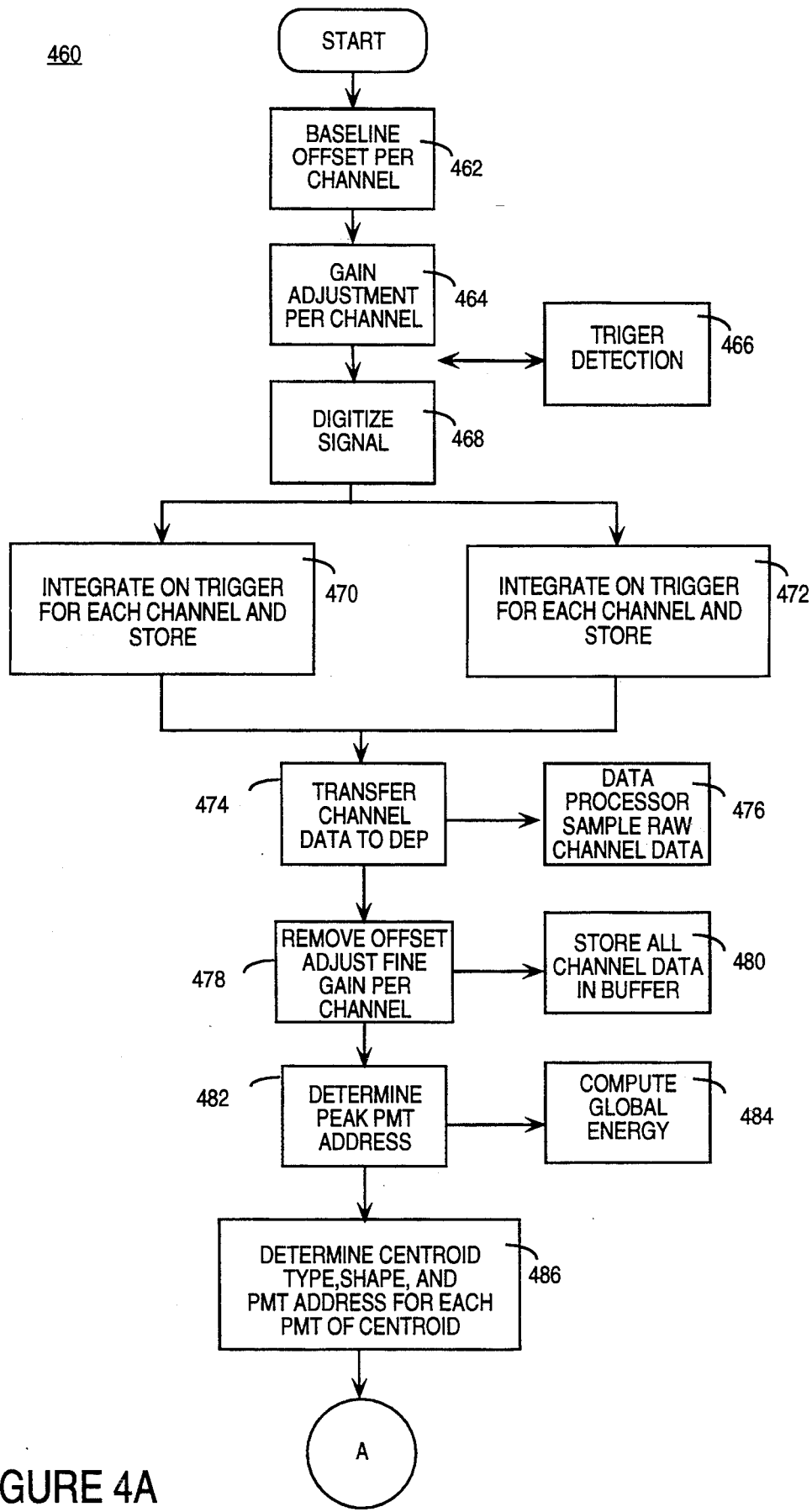
FIG. 4A and FIG. 4B illustrate an overall flow diagram of aspects of the Digital Event Processor of the present invention.
Figure 4B:
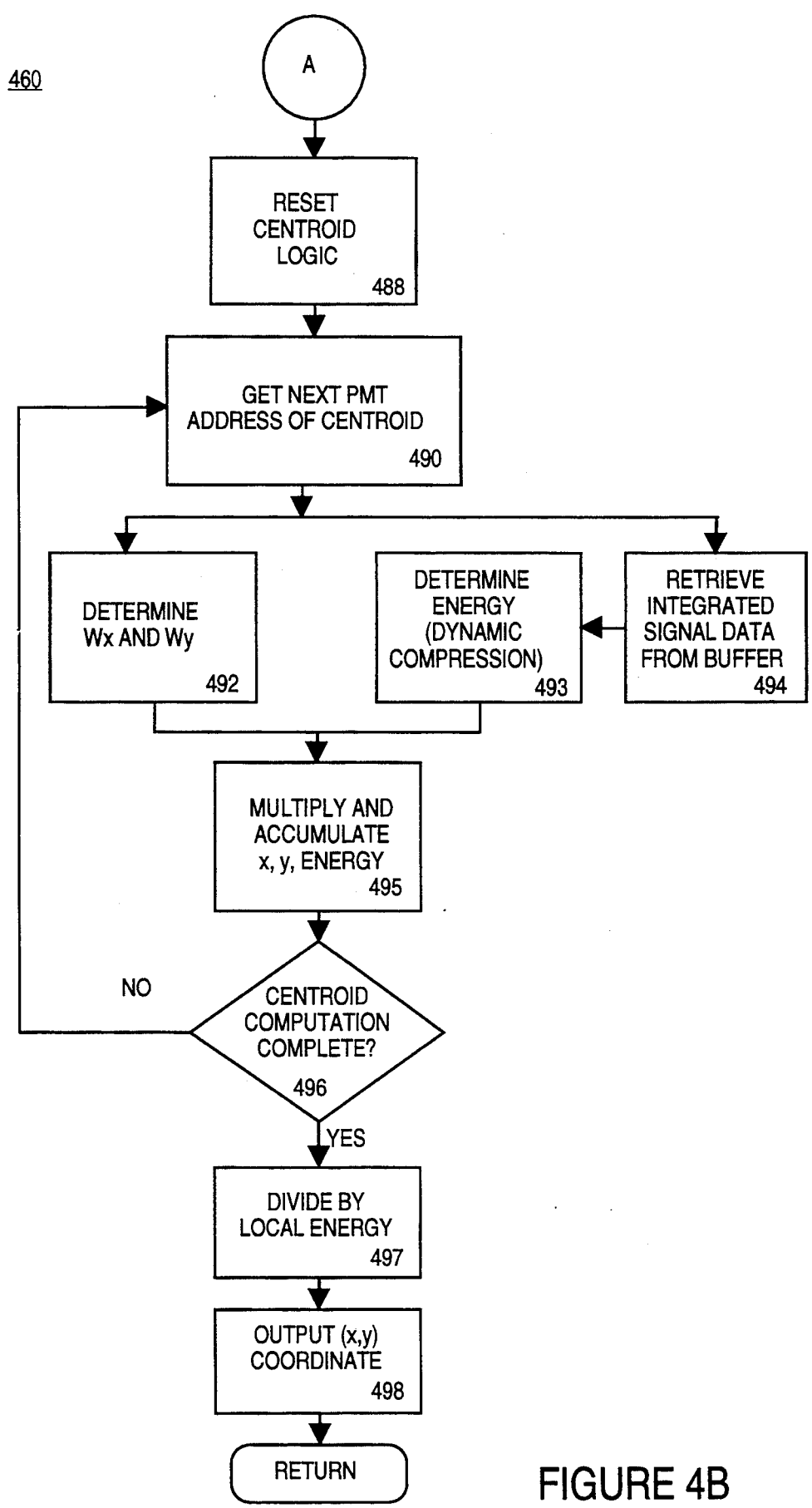

FIG. 4A and FIG. 4B are flow diagrams illustrating the general processing flow 460 of the present invention. Refer to FIG. 4A where the procedure enters and receives a signal, over each PMT channel, and after converting the signal from current to voltage, performs a computer controlled baseline voltage offset for each channel at 462 and also performs a computer controlled coarse gain adjustment for each channel at 464. At block 468, each channel is digitized and also trigger detection is performed at 466 by summing the analog signals just prior to digitization. Dual integration takes place at blocks 470 and 472 wherein a first and second trigger may be used to integrate separate events occurring close in time. Both integration steps output integrated signals to the two stage FIFO circuit and at 474 these data values, per channel, are transferred to the DEP sequentially at the completion of an integration period. The raw data is sampled and made accessible to a data processor at 476 and this data is supplied to the calibration table at 478 which removes the baseline offset and also performs fine gain adjustment of the digital channel signal.

At 480, the data from the calibration table is stored for each channel in a buffer. At 482, the present invention determines the peak PMT by examining the channel data from the calibration table and also at 484 the global energy is determined by summing the digital data of each channel for the event. The peak PMT address is used as a measure of the coarse spatial location of the gamma event. At 486, the present invention PMT address table outputs a PMT cluster type and also determines the constitution of the PMT cluster based on the peak PMT address (and the selected resolution, e.g., fine or coarse, in one embodiment).

Referring to FIG. 4B, the flow 460 of the present invention continues at 488 where the circuitry used to perform the centroid computation is reset to initialize for the new computation. At 490, the sequence counter addresses the PMT address table so that the first PMT address of the selected PMT cluster is output. From this value, and also based on the PMT cluster type, the present invention generates an x weight (Wx) and a y weight (Wy) for the selected PMT address. Also, the buffer 325 contains and supplies the stored integrated signal data for this channel at 494 and at 493 the dynamic compression circuit outputs the dynamically compressed signal value for this channel. At 495, the x and y multiplication accumulation circuits are used to multiply the weight value times the dynamic compressed signal value and accumulate the result for the PMT cluster. At 495, a local energy accumulator also accumulates the local energy of the PMT cluster. At 496, the sequence counter increments and addresses the PMT address table for a next PMT address until the PMT cluster is complete (e.g., the stop indicator of table 335 is reached); flow returns to 490 if the PMT cluster is not complete. The above processing then continues with the next PMT address of the selected PMT cluster.

If the PMT cluster is complete, then flow continues to 497 where the x and y multiplication accumulation circuits are effectively divided by the local energy to produce a normalized (x, y) spatial coordinate for the gamma event. At 498, the pertinent information output from the DEP 300 (including the (x, y) coordinate and the total energy) is output to a computer system data processor or a correction board that performs energy, linearity and uniformity correction in known manners.

Data Processor

Figure 5:
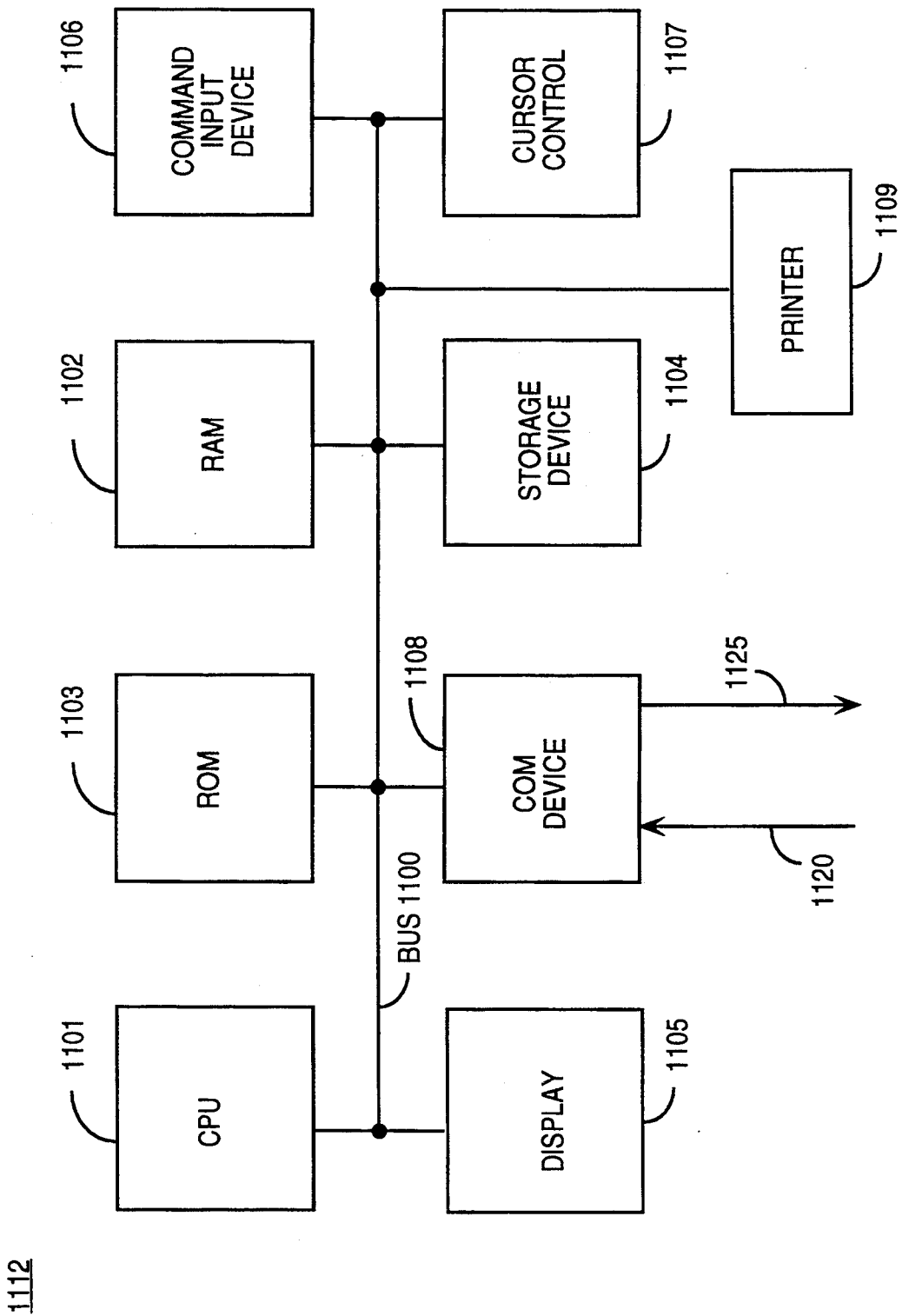
FIG. 5 is a diagram of a digital processor (computer system) and user interface of the present invention.

Refer to FIG. 5 which illustrates components of a general purpose computer system 1112 that is capable of executing procedures of the present invention for controlling the DEP 300 circuit (e.g., control of baseline offset, gain, and trigger threshold) and for performing other recited functions. The computer system 1112 comprises an address/data bus 1100 for communicating information within the system, a central processor 1101 coupled with the bus 1100 for executing instructions and processing information, a random access memory 1102 coupled with the bus 1100 for storing information and instructions for the central processor 1101, a read only memory 1103 coupled with the bus 1100 for storing static information and instructions for the processor 1101, a data storage device 1104 such as a magnetic or optical disk and disk drive coupled with the bus 1100 for storing image information and instructions, a display device 1105 coupled to the bus 1100 for displaying information to the computer user, an alphanumeric input device 1106 including alphanumeric and function keys coupled to the bus 1100 for communicating information and command selections to the central processor 1101, a cursor control device 1107 coupled to the bus 1100 for communicating user input information and command selections to the central processor 1101, and a signal generating device ("communication device") 1108 coupled to the bus 1100 for communicating command selections to the processor 1101. A hardcopy device 1109 (e.g., printer) may also be coupled to bus 1100.

The signal generation device 1108 includes a high speed communication port for communicating with the DEP 300. Input bus 1120 receives the data output from the DEP 300 such as signals PA 312, PD 317, GE 322, X 327, Y 332 and LE 337. Bus 1120 also supplies the raw data output from circuit 310 over bus 397 to the processor 1112. Output from the processor 1112 are the control signals for controlling the fine and coarse baseline offset voltages (e.g., signals 212 and 214) and the PMT gain signal adjustment 220) for each channel. Processor 1112 also controls the trigger threshold 108. The raw data sampled over bus 397 and the control signals generated by processor 1112 may be determined and adjusted in real-time by the present invention.

The display device 1105 of FIG. 5 utilized with the computer system 1112 of the present invention may be a liquid crystal device, cathode ray tube, or other display device suitable for creating graphic images and alphanumeric characters recognizable to the user. The cursor control device 1107 allows the computer user to dynamically signal the two dimensional movement of a visible symbol (pointer) on a display screen of the display device 1105. Many implementations of the cursor control device are known in the art including a trackball, finger pad, mouse, joystick or special keys on the alphanumeric input device 1105 capable of signaling movement of a given direction or manner of displacement. The keyboard 1106, the cursor control device 1107, the display 1105 and hardcopy device 1109 comprise the user interface block 93.

Dual Integration Per Channel

The present invention provides multiple independent integrators per channel (e.g., two per PMT) in order to accurately process high count rates and to effectively reduce problems associated with pulse pile-up. Although described in a specific embodiment utilizing two integrators per channel, it is appreciated that the present invention system may be expanded to encompass a multiple number of integrators per channel (e.g., three, four, five, etc.). As will be discussed in further detail to follow, for each integrator added an additional stage within the serial latch circuit is required.

Figure 6A:
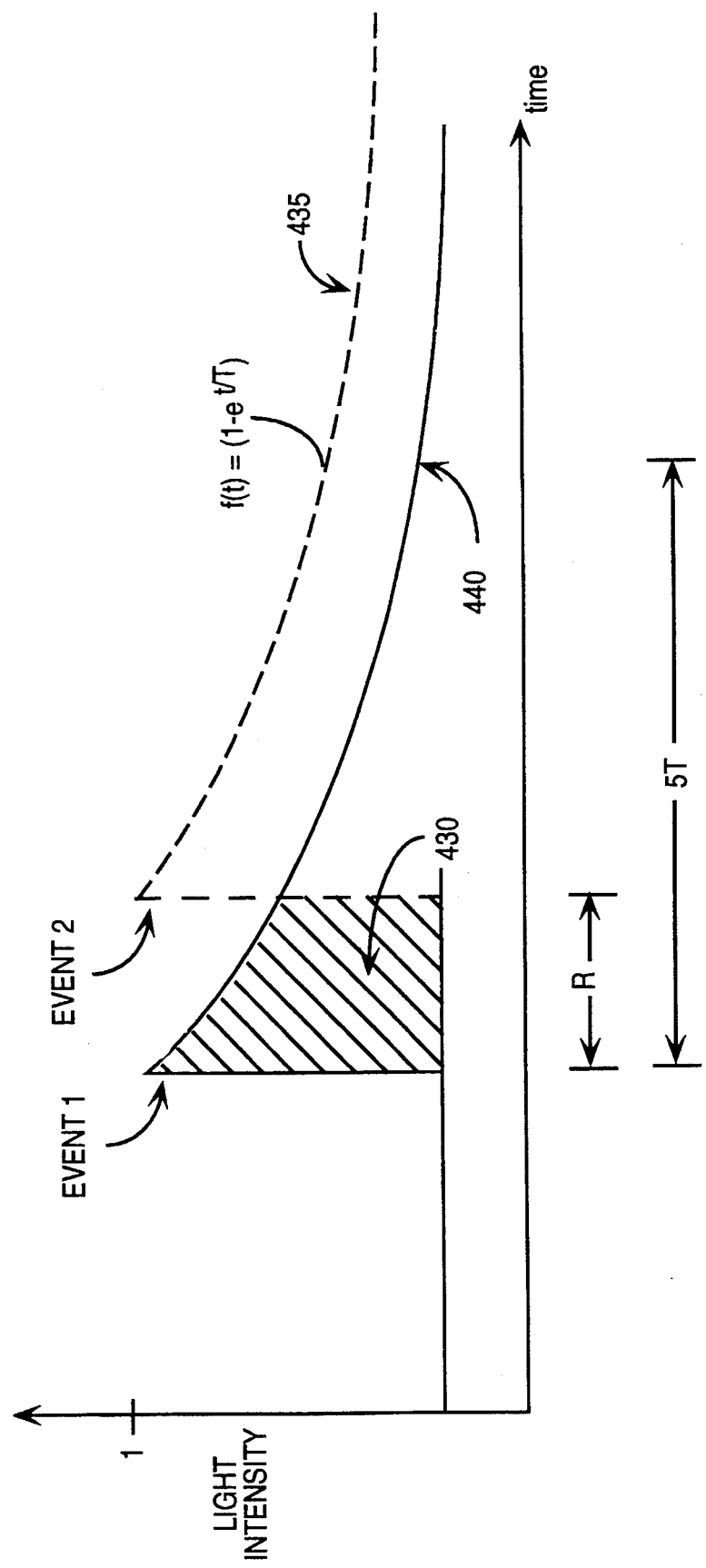
FIG. 6A represents the light intensity response for multiple events occurring close in time within the present invention.

FIG. 6A illustrates light intensity response (curve 440) over time for two events. The light intensity response is a well known decaying exponential with a time constant, T. Event1 occurs and decays over time as shown by curve 440. Due to the characteristics of the crystal 81 used in the detector 80, at the end of 5 T time intervals, most of the usable light intensity is radiated. However, there is some time value R, less than 5 T, that can be used and gives a sufficient amount of energy to register event1 (e.g., energy associated with region 430). Prior art systems will attempt to utilize this decreased amount of energy (region 430) for registering events during periods of high count rate (e.g., if a second event occurs before 5 T as shown as curve 435). However, this is not advantageous because as the separation between events decreases below 5 T, less and less event energy is captured and spatial computations become less accurate. Further, at some point, (e.g., less then R) the temporal separation between two events will become too small and neither event can be registered. At higher count rates the spatial accuracy of the prior art systems decreases significantly.

The present invention, on the other hand, provides a mechanism for integrating the energy over 5 T for both event1 and event2 because dual integrators are supplied per channel for all the PMTs of the array. Therefore, one integrator may sample and integrate the light intensity for event1 over response 440 for 5 T duration and the other can sample and integrate the light intensity for events over response 435. During periods of high count rate, the present invention does not sacrifice energy intensity when sampling each event when integrating over two events that closely occur in time. Furthermore, since two separate integrators are used, the present invention can accurately register two events even though their temporal separation is less than R. The present invention therefore provides higher accuracy at higher count rates over the prior art.

The present invention dual integrator embodiment utilizing two independent integrators is now discussed. As discussed with reference to FIG. 2C, the integration circuitry of circuit 280(i) for a given channel includes two integrators 238 and 240 each having independent accumulators and each coupled (via a mux 241) to a two stage sample and hold circuit (latch 242 and latch 244). Each integrator is independently triggerable and separately and independently integrates its associated channel signal. Trigger signals are transmitted over bus 130 and when received, act to reset the accumulator of an idle integrator. At the end of sampling, for an event, the present invention transfers the data of the second stage (244) to the DEP 300, moves the data of the first stage 242 to the second stage and moves the data of the accumulator of the completed integrator into the first stage of the hold circuit. This way, both integrators may be sampling, simultaneously, different events. They can each be independently triggered and at the end of the sample period, the accumulator stores its result in the two stage hold circuit.

The above procedure operates most accurately when the two integrated events are sufficiently separate from one another such that their energy dissipation across the detector does not overlap or interfere in the integration computation. For instance, refer to FIG. 7 which illustrates an exemplary PMT array. A first event occurs over PMT 7, therefore the PMT cluster 75 is composed of PMTs 1, 8, 20, 19, 36, 18, and 7. The trigger pulse resets integrator 238 (per channel) which then integrates the energy for the first event for all 55 channels. Before the integration is complete for this first event, a second event occurs over PMT 38, so the PMT cluster 73 is composed of PMTs 38, 37, 22, 23, and 39. Integrator 240 (per channel) is reset and integrates the energy associated with the second event for all 55 channels. Since PMT cluster 75 and 73 are sufficiently separate, the contribution of energy associated with the second event over channels 1, 8, 20, 19, 36, 18 and 7 is relatively small and does not interfere with the integration computation for the first event. Likewise, the contribution of energy associated with the first event over channels 38, 37, 22, 23, and 39 is relatively small and does not interfere with the integration computation for the second event.

At the end of the computation for the first event, the integrated channel signal data of latch 244 is output to the DEP 300, the integrated channel signal of latch 242 is output to latch 244 and the value of the accumulator of integrator 238 is output to latch 242. At the end of the computation for the second event, the integrated channel signal of latch 244 is output to the DEP, the value of latch 242 is output to latch 244 and the value of the accumulator of integrator 240 is output to latch 242. The first and second events will be processed by the DEP 300.

Figure 6B:
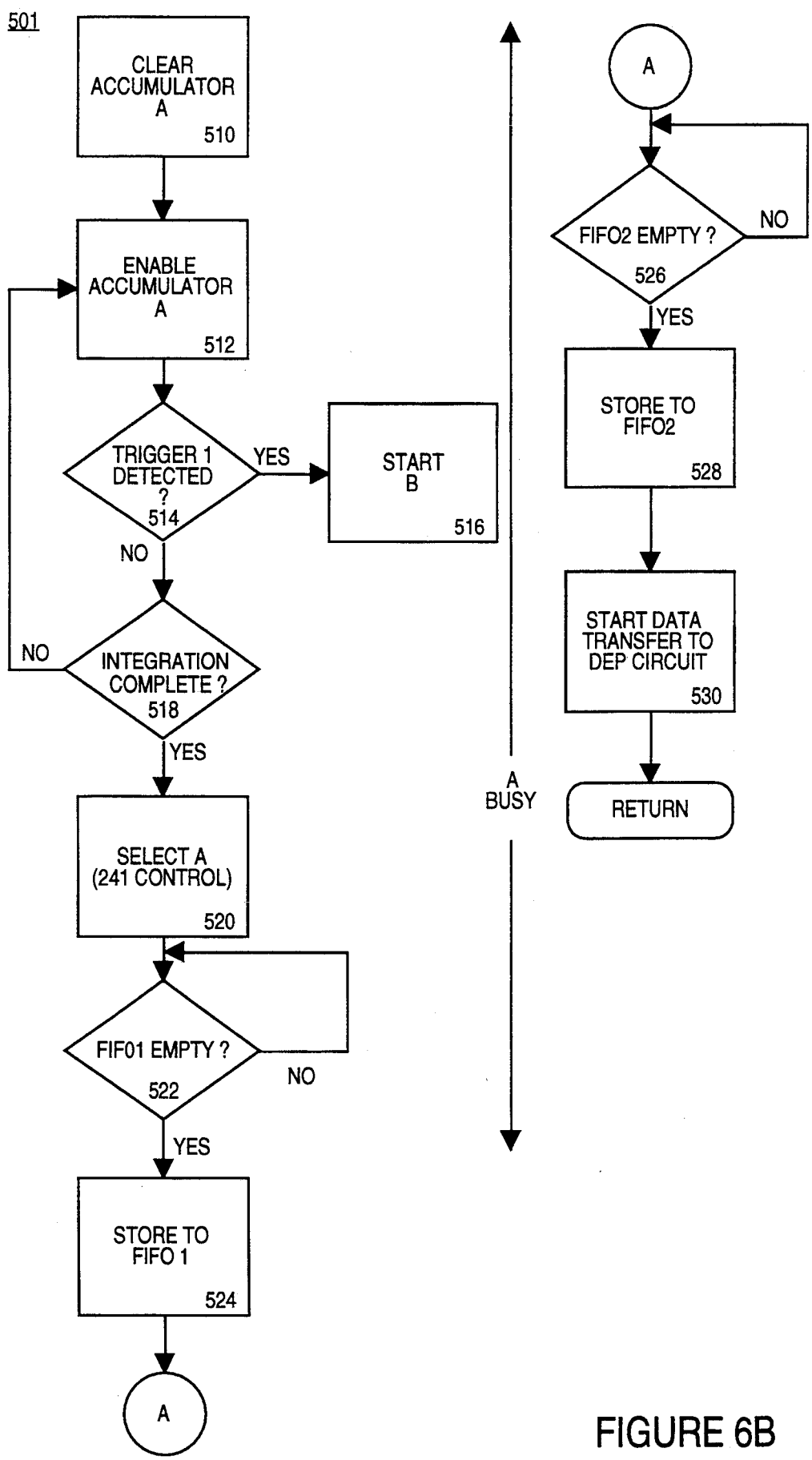
FIG. 6B illustrates a flow chart of the timing performed for dual integration on a particular channel.

FIG. 6B illustrates in more detail the process performed by the present invention to perform dual integration per channel. The process shown 501 represents the process for integrator A but it is appreciated that the process for B (block 516) is identical except that the "B" control signals are used. As shown, the process starts at 510 in response to a trigger signal, Start(t0). Then, the A accumulator is cleared (e.g., integrator 238) by assertion of a CLRACCA control signal and at 512 this accumulator is enabled to integrate by assertion of an ENACCA control signal. At block 514, if Start(t1) is detected then at block 516 the process for integrator B is started and operates concurrently with process 501. If not, then at block 518 it is checked if the integration for A is complete. If so, not then the process returns to 512 where integration continues.

When integration for A is complete, at block 520 a control signal for MUX 241 selects the data from integrator 238. At block 522 FIFO1 (242) is checked if empty and if empty, at block 524 the data is latched into FIFO1. At block 526 if FIFO2 (244) is empty then data from FIFO1 is latched into FIFO2 at block 528. At block 530 the data transfer from FIFO2 to the Digital Event Processor is started for all channels. During the period from block 510 to block 522 the A integrator is busy. It is appreciated that there is only one trigger signal and it is classified as Start(t0) or Start(t1) by its temporal relationship to the other trigger signal. During the A busy period, a trigger signal will cause the B process to start.

Variable PMT Cluster Constitution

As discussed above, the PMT address table circuit 335 of the present invention contains a lookup table that provides the addresses of the group of PMTs that constitute the PMT cluster for a given event based on the peak PMT for that event (supplied from circuit 320) and based on a count value supplied over bus 357 from the sequence counter 390. A centroid is computed (using a centroiding computation) based on the PMT cluster to arrive at a spatial coordinate value of the event. In this way, the PMT cluster constitution of the present invention varies for each peak PMT. According to the present invention, also associated with each PMT of the detector array is a type registration or classification that describes the type of PMT cluster that is formed.

Figure 7:
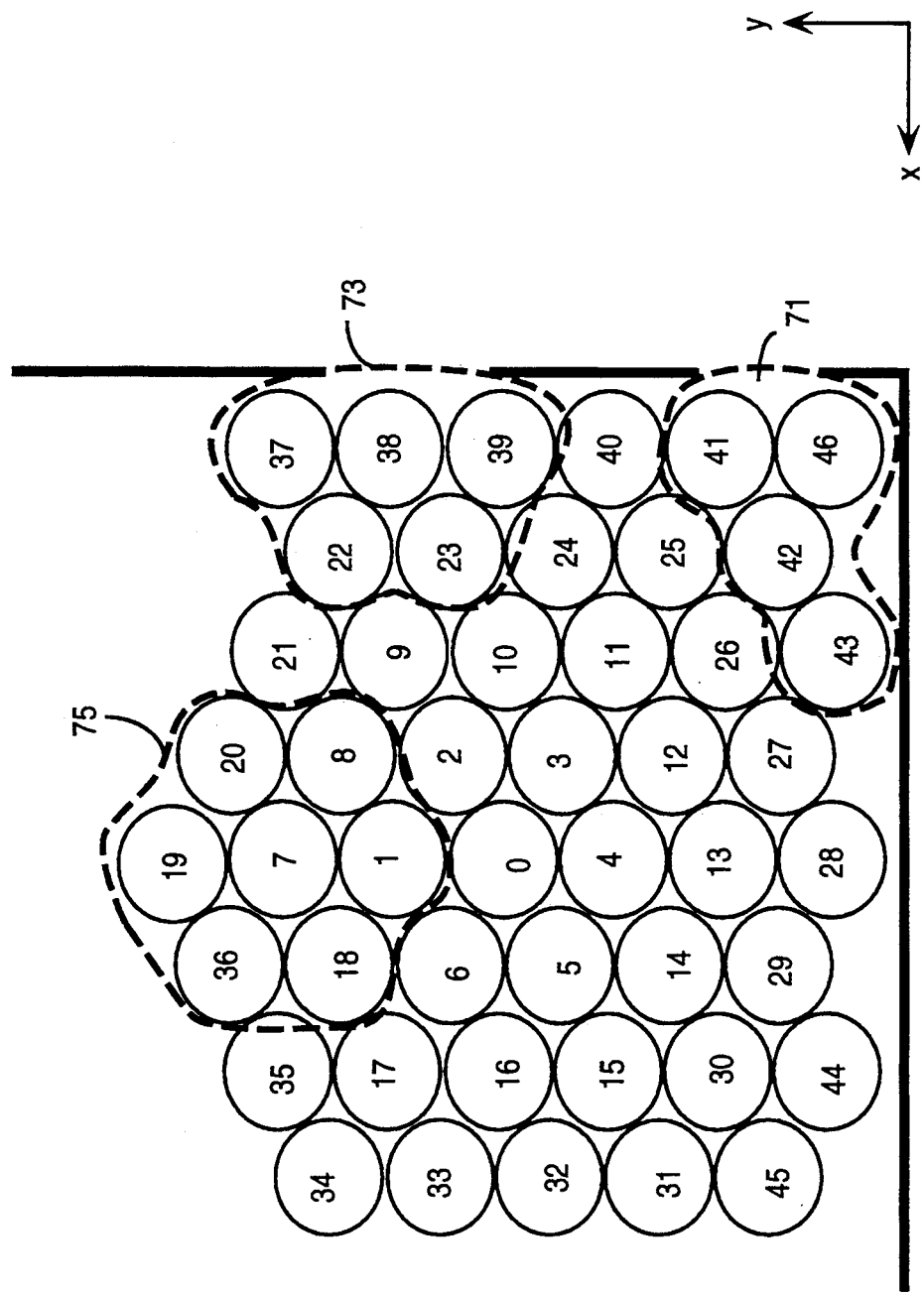
FIG. 7 illustrates an exemplary PMT array of a detector of the present invention and illustrates three different cluster types.

For instance, the present invention provides four different types of exemplary PMT clusters: 1) normal; 2) long edge; 3) short edge; and 4) corner. The normal PMT cluster anticipates the peak PMT to be located in an area of the PMT array that can be surrounded by other PMTs such that the PMT cluster is substantially symmetrical about both axis. Such a PMT cluster is shown in FIG. 7 as PMT cluster 75 with PMT 7 as the peak PMT which is surrounded by outer PMTs. The determination of the peak PMT gives a coarse spatial location for the event and the present invention PMT address table 335 is able to utilize this coarse location of the event in determining the PMT cluster constitution for that event so that the fine spatial location may be provided via the centroid computation of the DEP 300.

Two PMT cluster types (long edge and short edge) correspond to PMT clusters having peak PMTs located on the edge of the detector PMT array. Edge PMT clusters are not symmetrical about one axis. The PMT array of the present invention is rectangular and contains a long edge and a short edge and depending on the edge location of the peak PMT, the PMT cluster defined thereby can be a long edge PMT cluster or a short edge PMT cluster. The PMT clusters of these types are different because the light distribution at the long and short edges are different. An edge type PMT cluster is shown in FIG. 7 as PMT cluster 73 having PMT 38 as the peak PMT. The fourth type of PMT cluster of the present invention is a corner PMT cluster and the PMT of this type is located in a corner type of the PMT array, such as PMT cluster 71 of FIG. 7 having peak PMT 46. This PMT cluster type is not symmetrical about either axis. It is appreciated that the above PMT cluster types are exemplary and many other PMT cluster types may be utilized within scope of the present invention depending on the particular geometry of the PMT array utilized and the geometry of the detector head.

It is appreciated that for a given peak PMT address, the type value for the PMT cluster can change depending on the selected resolution of the spatial computation. For instance, a normal type PMT cluster at high resolution having the same peak PMT may be different from the PMT cluster generated at low resolution for the same peak PMT (which may be an edge type cluster). This is the case because at higher resolution, more PMTs are required (e.g., 17 or 19) to complete the PMT cluster rather than 7 for the low resolution cluster and these additional PMTs may overrun the edge of PMT array.

Type fields are important because the PMT cluster type will effect the x and y weights assigned to a particular PMT of a particular PMT cluster in the spatial computation. For instance, PMT cluster types that are symmetrical about only one axis (e.g., edge types) will have modified weight values assigned to those PMTs of the PMT cluster that are located along the axis that is not symmetrical. For instance, refer to FIG. 3 which illustrates a spatial computation based on a normal PMT cluster type. The spatial coordinate is computed from an average of a sum based on the weight of a PMT multiplied by the integrated channel signal of the PMT for each PMT of the PMT cluster. The weight values for the PMTs must be adjusted in the computation of a spatial coordinate along an axis for which a PMT cluster is not symmetrical. Referring to FIG. 3, assume that PMTs 2 and 3 were not available because PMT 0 was located along an edge. The resulting PMT cluster is composed of PMTs 0, 1, 6, 5, and 4 and is not symmetrical about the X axis. For the coordinate computation of the X axis coordinate, the average calculation would be-skewed or shifted to the left because the PMTs of the right (e.g., PMTs 2 and 3) are missing. Therefore, the weight values of the PMTs of the resulting PMT cluster must be reduced to compensate for the skew to the left. The same is true for corner PMT clusters, however the weight values must be adjusted for the computation of both coordinates because corner PMT clusters are not symmetrical to the X or Y axis.

The weight adjustment of the PMTs based on the PMT cluster type field is made by the weight circuit 345 and will be discussed further below.

Refer to FIG. 8 which illustrates the format of the PMT address table circuit 335 for low resolution selection. The PMT address table circuit 335 is addressed by the peak PMT address value and also addressed by the count value (here shown from zero to n). Circuit 335 contains an entry for each of the 55 PMTs of the detector array. For each peak PMT, the circuit 335 outputs a PMT cluster type value and the PMT addresses of the PMT cluster. The output of the circuit 335 is (1) a PMT cluster type value and (2) the PMT addresses (a "PMT list") of the PMTs of the PMT cluster defined by the peak PMT address. Since the PMT clusters are programmable and of variable size and PMT number, a "stop" indicator is placed at the end of the PMT list (or included as part of the last PMT address entry). Exemplary data is shown in FIG. 8 and corresponds to the PMT clusters shown in FIG. 7. The first entry shown of FIG. 8 relates to PMT cluster 74 of FIG. 7 and PMT 7 is the peak PMT and the PMT cluster is a normal type having PMTs 1, 8, 20, 19, 36, and 18. Entry 38 of FIG. 8 relates to PMT cluster 73 of FIG. 7 and is an edge type PMT cluster. Entry 46 of FIG. 8 relates to PMT cluster 71 of FIG. 7 and is a corner PMT cluster.

The data stored in the memory circuit 335 that is used to formulate the PMT clusters for each peak PMT can be programmable and may be downloaded from the computer system 1112. In such an embodiment, different datasets may be loaded into the memory circuit 335 for different configurations. Alternatively, the circuit 335 may be implemented using static ROM memory.

Based on a clock signal, the sequence counter 390 of the present invention will present the count field over bus 367 (one at a time) and this count value will address the circuit 335 along with the peak PMT address to output (1) the PMT cluster type and (2) the PMT address of the PMT cluster as shown in FIG. 8.

It is appreciated that depending on the desired resolution of the gamma camera, the PMT address table 335 of the present invention will output different sized PMT clusters for each PMT cluster type. For instance, if high resolution spatial determination is required, then the PMT clusters will be increased in size to include 17 to 19 PMTs for a normal PMT cluster (instead of seven for normal cluster types in low resolution). Edge and corner PMT clusters will be increased accordingly in number. Therefore, in an alternative embodiment of the present invention, the PMT address table 335 receives an additional signal indicating low or high resolution and this signal will address the table to supply the appropriate centroiding information based on the required resolution. Alternatively, the entire table 335 may be reloaded with a different data set to vary the resolution.

Given the design of the PMT address table of FIG. 8, the number of PMTs of a given PMT cluster may easily be increased since the stop indicator, which marks the completion of the PMT cluster, is readily adjusted. Further, as stated above, the PMT cluster type corresponding to a particular peak PMT address may vary from low to high resolution settings.

Variable PMT Weights Per PMT

According to the present invention, the weight table circuit 345 outputs x and y coordinate weights for each PMT of the PMT cluster based on the PMT address and the PMT cluster type information, both of which are generated by the PMT address table 335. FIG. 9 illustrates the weight table circuit 345 of the present invention. Depending on the type of PMT cluster (e.g., normal type, long edge type, short edge type, corner type, or other type) that the PMT is contained within, the x and y coordinate weights output from the circuit 345 for the PMT will vary. For each PMT address (e.g., from PMT0 to PMT54), the present invention provides a separate and programmable weight value for each coordinate computation (e.g., Wx and Wy) that varies by PMT cluster type. The values Wx are output over bus 362 and the values Wy are output over bus 357. As will be discussed below, the determination of the peak PMT gives a coarse spatial location for the event and the present invention weight table 345 is able to utilize this coarse location of the event in determining the proper weight values to assign the PMTs of the PMT cluster. The fine spatial location is computed via the centroid computation of the DEP. In such manner, the PMT address value signal over bus 372 and the type signal over bus 377 address the circuit 345.

Since some PMT clusters are not symmetrical about a given axis, for instance the X axis or Y axis for an edge type PMT cluster, the weight values associated with these axis are adjusted or varied in order to balance out the coordinate computation. This is accomplished by the present invention in order to compensate for the missing PMTs (of one axis) that are not available to provide a symmetric computation. For corner PMT clusters, the weight values associated with both axis are adjusted to compensate for the missing PMTs (of both axis) needed to provide a symmetric computation. Typically the weight values are decreased for certain PMTs in order to perform the above balancing. The values weight table 345 of the present invention may also be developed empirically based known events for certain locations.

Further, other factors such as the crystal boundaries, optical interfaces, and PMT photocathode properties can make the PMT contribution different depending on the location of the event. Since, the peak PMT address gives some indication of the coarse location of the event, the weight table 345 can compensate for the above factors by providing variable weights.

Therefore, the present invention provides the ability to adjust or alter the weight values for a given PMT depending on the PMT cluster type in which the PMT is located. Depending on the location of the peak PMT, the weight values for the PMTs used in the centroid computation may alter. These weight values are also dependent on the peak PMT address since the peak PMT address defines the PMT cluster type within the present invention. The ability to assign different weighting factors based on the peak PMT location permits higher accuracy in the centroid computations and reduces the demands on the correction processing steps. This contributes to allowing the detector 80 to have larger field of view without increasing the crystal dimensions.

The data stored in the memory circuit 345 of FIG. 9 that is used to provide the variable weights for each PMT can be programmable and may be downloaded from the computer system 1112. In such an embodiment, different datasets may be loaded into the memory circuit 345 for different configurations. Alternatively, the circuit 345 may be implemented using static ROM memory.

In operation, as the counter 390 counts sequentially, the PMT address table 335 outputs a sequential listing of PMT addresses within the PMT cluster. The type signal generated by bus 377 addresses the MSBs of the of the memory 345 and the PMT addresses are the LSBs. As each PMT is generated over bus 372, the memory circuit 345 generates an X and Y weight value (over buses 357 and 362) associated with the current PMT output over bus 372. This information is fed to the centroiding circuitry for computation of the spatial coordinate a the gamma event.

Autogain Correction

As will be discussed further below, the autogain calibration of the present invention contain two phases: (1) an initial calibration; and (2) a routine calibration. The routine calibration can be performed with the collimator installed or with the collimator removed.

The present invention provides a procedure for automatically calibrating the gain of each PMT channel without removing the collimator during the routine gain calibration phase. This is beneficial at least since the gain calibration may be performing during periods of quality control without removal of the collimator while imaging a sheet source (e.g., CO-57) and thus saving time and effort. Further, since collimator removal is a laborious and time consuming procedure, the automatic gain calibration of the present invention provides an efficient mechanism for gain correction. The computer system 1112 adjusts a preamplification gain (Gp) for each PMT by using coarse and fine gain values. The coarse gain adjustment is accomplished by generating a digital gain value that is converted to an analog signal by a DAC and applied at input 220 of the preamplification circuit (280(i)) for each channel(i). The fine gain adjustment is implemented in the calibration table 315 as a look-up table. The computer system 1112 stores the current value of both the coarse and fine gain (Gp) for each channel. The computer system 1112 also performs the automatic gain adjustment procedure as will be discussed in further detail below.

The effective gain associated with each PMT channel has two separate components. The first component is the physical gain associated with the individual PMT itself (Gt) and this gain is established by the physical characteristics of the PMT. The second component is the corresponding preamplifier gain (Gp). As is known, the PMT physical gain, Gt, may vary over time and change in the long term (e.g., over hours or days). These variations in the Gt create the problem that the present invention solves by adjusting the Gp gain associated with each PMT channel individually to compensate for the changes in Gt to obtain a stable (fixed effective gain) for each PMT channel.

The preamplification gain, Gp, contains two components. For each channel, the first component of the preamplification gain Gp is the gain applied to the output channel signal within the preamplification stages, 280(i), for each channel (e.g., coarse adjustment); this component is applied at gain circuit 222 via input 220. A second component (e.g., fine adjustment) of the preamplification gain Gp is supplied by the calibration table 315. If the gain of a particular channel does not vary by more than some small percentage (e.g., 5%) then the gain value found within the calibration table for that channel is altered, not the gain applied at the preamplification stage for that channel.

The effective gain, Gt*Gp, is to remain fixed over time to yield the same output signal of a particular radionuclide emitting photon with distinct energy. The fixed gain of each PMT channel will give stable x, y coordinates and total energy values which will increase the time between required recalibration of the camera's energy, linearity and uniformity correction factors. Another advantage of the autogain calibration of the present invention is that it brings back the camera to its state when it was initially calibrated and when uniformity correction factors were generated.

In view of this, since the gain Gt may vary due to the physical characteristics of the PMT, the present invention compensates for this variation by altering the computer controlled value of the Gp gain that is applied to data from each channel. In this way, the automatic gain correction procedure of the present invention will maintain the resultant gain (e.g., Gt * Gp) at a fixed value for each channel. The actual value of this fixed amount can be determined and/or measured during manufacturing or at the site of installation and operation of the scintillation detector. Since energy, linearity and uniformity corrections are based on a fixed gain of each of the calibrated photomultiplier channels of the array, it is advantageous to maintain this calibration throughout the operational cycles of the gamma camera system so that the gains of the PMT channels are closely calibrated to match the gain when the energy, linearity and uniformity correction factors were calibrated.

Figure 10:
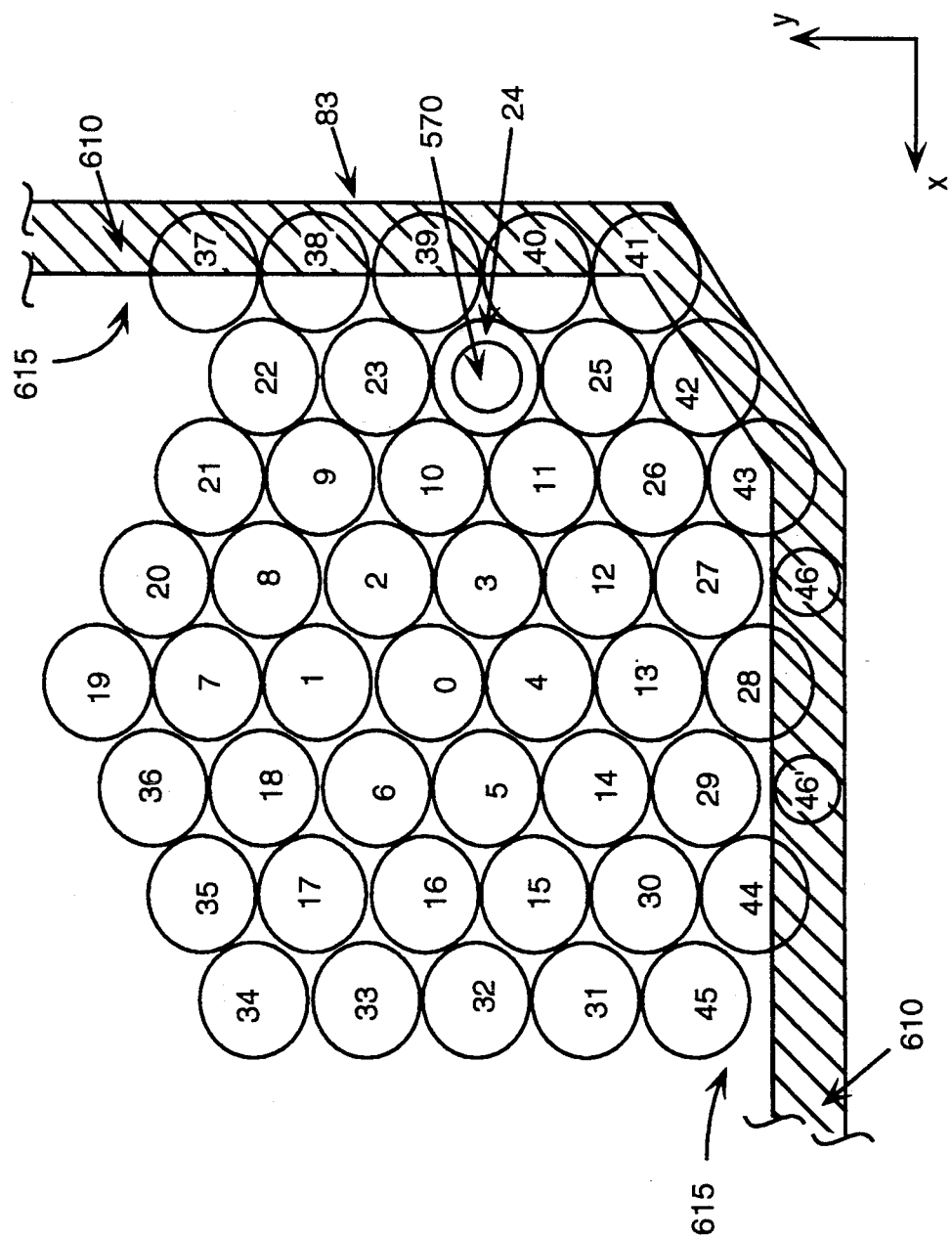
FIG. 10 illustrates a plane view of a collimator (with edges) as positioned over a PMT array of the present invention.

Central and Obscured PMTs. FIG. 10 illustrates an exemplary PMT array of the present invention as well as a collimator 83 that is positioned in front of the PMT array. The collimator 83 contains an inner region 615 composed of a honeycomb of holes with lead septas allowing radiation of a particular incident angle to pass there through. The collimator 83 also contains a second region (edge region) 83 that is solid lead and partially and fully covers some edge and corner PMTs. PMTs having their surfaces located totally under region 615 are the central PMTs (centrally located) and PMTs having a portion of their surfaces located under region 610 are called obscured PMTs. The present invention provides an automatic procedure and apparatus for calibrating the gain factors of each PMT of the array (including those PMTs that are obscured) while leaving the collimator installed during the routine calibration procedure.

Each PMT has an area 570 associated with it directly over the PMT surface, see region 570 of PMT 24 for instance(in FIG. 10). Although only one area 570 is shown, it is appreciated that each PMT of FIG. 10 has an associated region 570 located above its individual surface. The actual shape and size of the region 570 can be varied (e.g., it may circular, square, hexagonal, etc.). In the preferred embodiment of the present invention, this area 570 is circular and covers substantially all of the area above a given PMT. This central region 570 will be used for calibration of the preamplification gains (including adjustment of the calibration table) of each PMT when the collimator is removed and each centrally located PMT when the collimator is installed. (Some PMTs can be located only partially over the NaI crystal layer and therefore will receive less light.)

Strip Regions 910.

Figure 11:
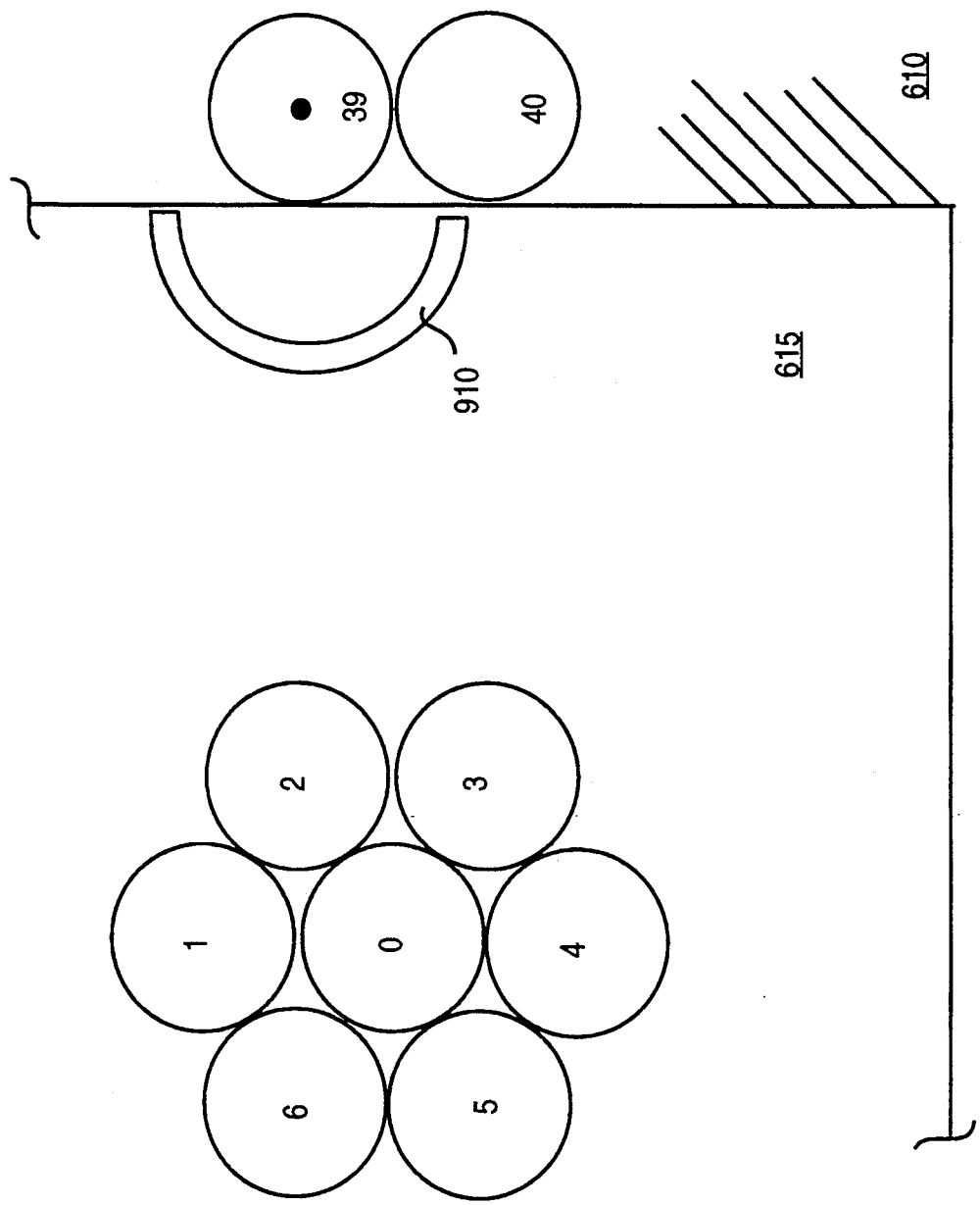
FIG. 11 illustrates placement of centrally located PMTs and obscured PMTs and an exemplary strip area associated with an obscured PMT.

FIG. 11 illustrates specialized regions 910 (one associated with each obscured PMT) utilized by the present invention for performing gain calibration for the obscured PMTs of the scintillation detector. FIG. 11 illustrates two obscured PMTs 39 and 40 that are obscured by the collimator's solid lead region 610 (when installed) as well as a group of centrally located PMTs (0–6) that are situated inside region 615 where the collimator consists of holes permitting radiation to pass through. The region 910, or "strip" area is associated the obscured PMT 39 but a separate strip area 910 is also associated with each obscured PMT of the scintillation detector. FIG. 11 illustrates only one such strip region 910 associated with obscured PMT 39. This region 910 may be of a variety of different geometries and in the preferred embodiment is semi-annular and extends in an arc fashion surrounding a region that is located substantially equidistant from the center of its corresponding obscured PMT 39.

It is appreciated that this strip region 910 may vary in size and shape consistent with the present invention. However, in a preferred embodiment of the present invention, this region 910 is located such that it extends substantially equidistant from the center of its associated PMT and generally adopts a thin shape as shown in FIG. 11. A further requirement of strip 910 is that it extend substantially (if not fully) within the region 615 of the collimator that allows gamma rays to pass through.

When the collimator is installed onto the scintillation detector, the present invention is not capable of performing gain calibration on the obscured PMTs utilizing an area located directly over their surfaces, such as region 570, because no gamma events are detected under region 610 due to the presence of the collimator's edge. Therefore, the present invention performs gain calibration for obscured PMTs by recording information associated with gamma events that are detected within the exposed strip area 910 associated with each obscured PMT. In general, the present invention measures the integrated channel response of an associated PMT, e.g., PMT 39, in response to all gamma events that occur within the strip area 910 over a sample interval during the initial calibration. This information will be used to adjust the gain of obscured PMT 39.

Figure 12:
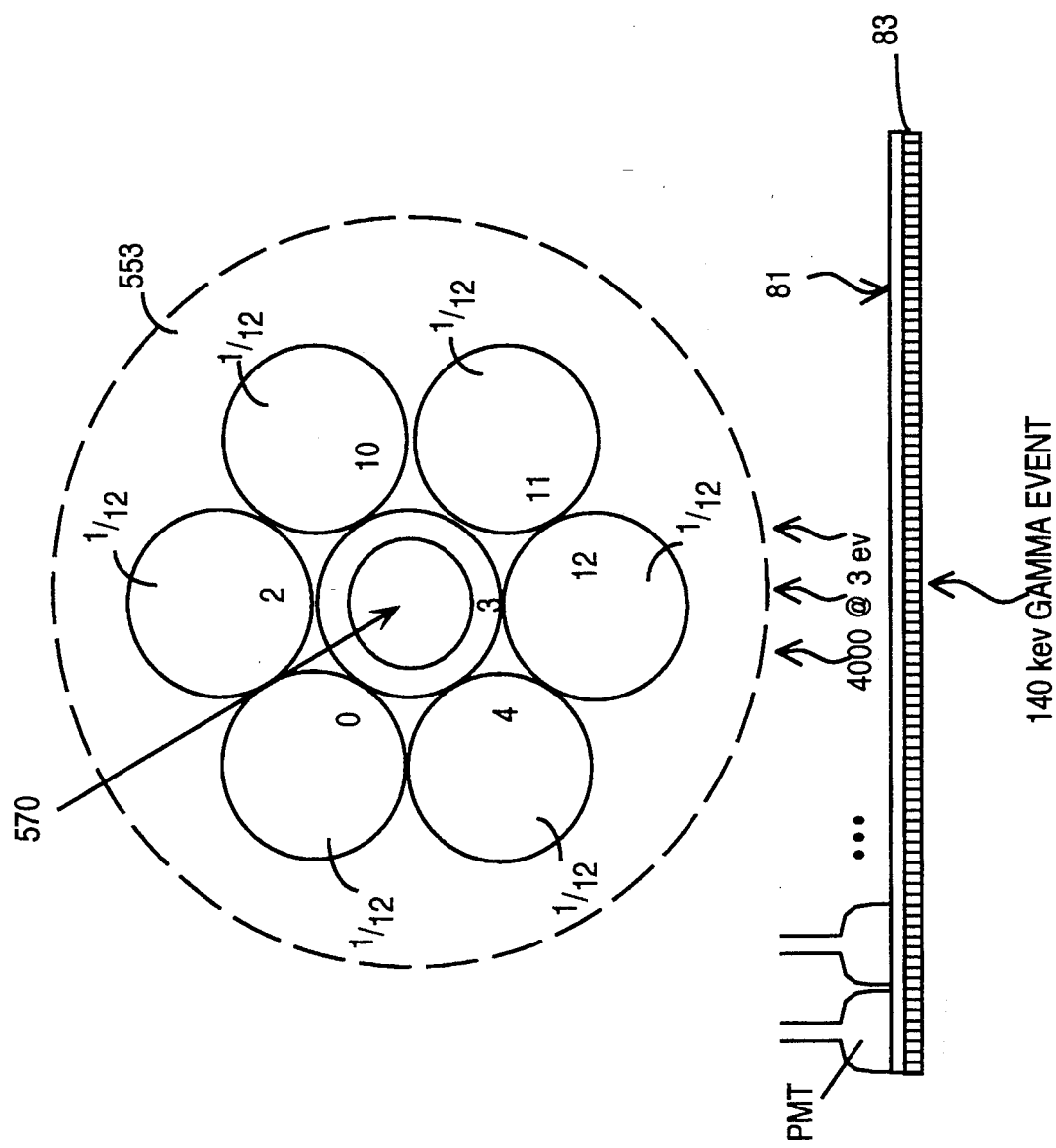
FIG. 12 illustrates energy absorption percentages for a typical PMT centroid arrangement for a gamma event.

PMTs of a PMT cluster detect different amounts of energy responsive to a gamma interaction depending on their spatial relationship to the interaction. Refer to FIG. 12 which illustrates an exemplary and typical PMT cluster 553. For a given gamma interaction (e.g., 140 keV), approximately 4000 separate 3 eV visible scintillation photons are emitted from the crystal 81 and of which only 50% are detected. Depending upon the size of the PMTs, if the gamma interaction occurs within the center of region 570, the center PMT will collect and report approximately 45 percent of the detected light energy. The surrounding adjacent six PMTs each collect approximately 8% of the detected energy. For a number of detected gamma events located near the center of region 570 of the center PMT, the center PMT should produce an integrated output voltage proportional to approximately 1000 3 eV light photons. Each of the adjacently surrounding PMTs should output a integrated mean voltage proportional to 160 3 eV light photons for the gamma events occurring within 570.

Figure 13A:
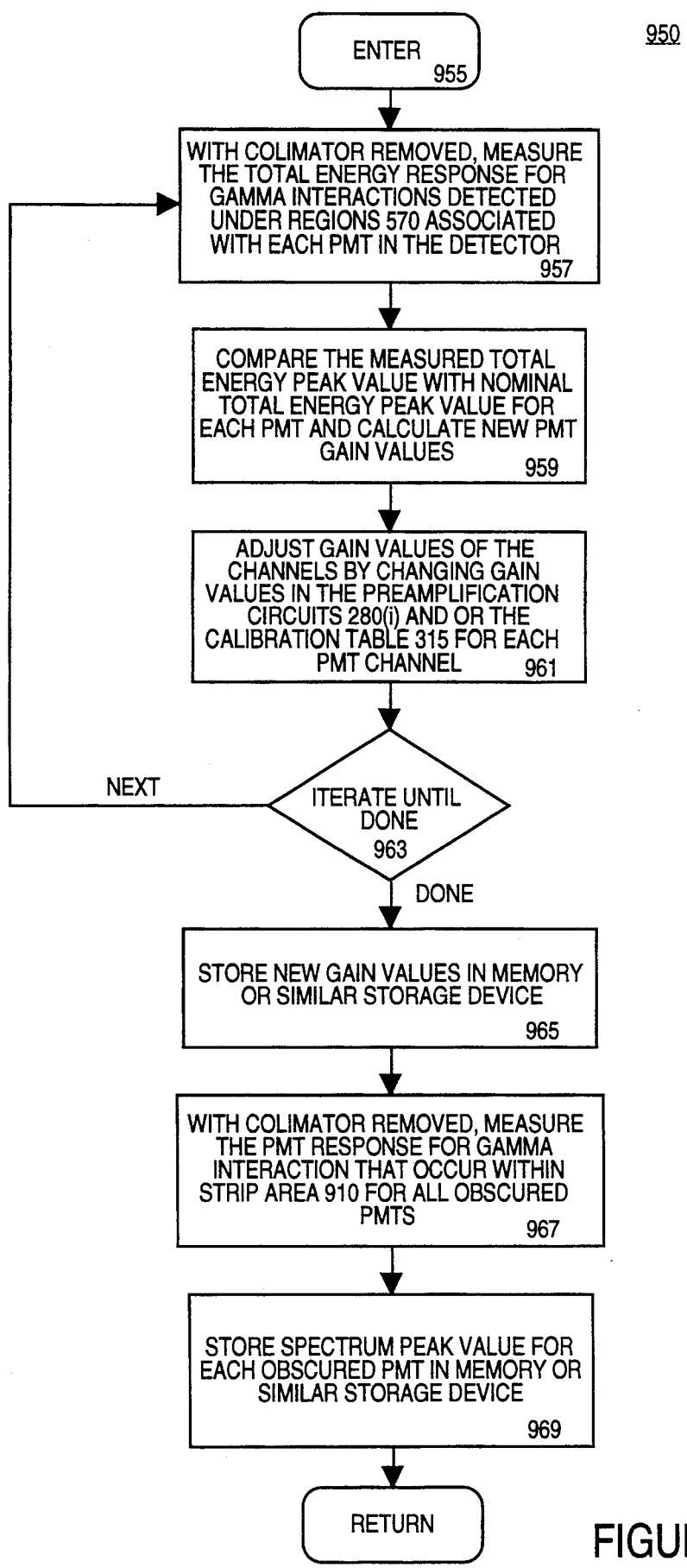
FIG. 13A is a flow chart illustrating initial calibration tasks executed by the autogain procedure of the present invention as typically executed at the factory during calibration or in the field without a collimator.
Figure 13B:
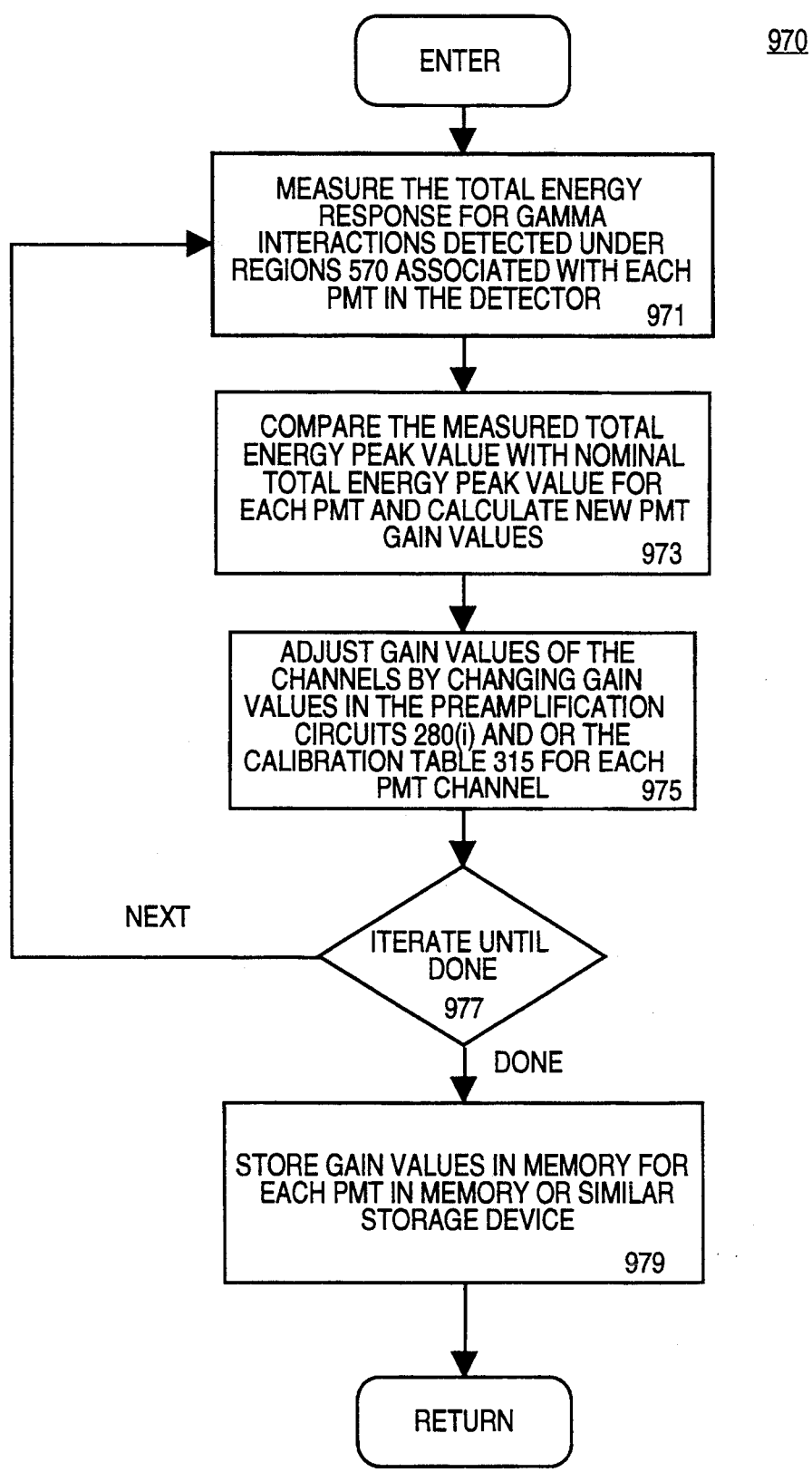
FIG. 13B is a flow chart illustrating routine calibration tasks executed by the autogain procedure of the present invention as typically executed at the site during routine calibration with the collimator removed.
Figure 13C:
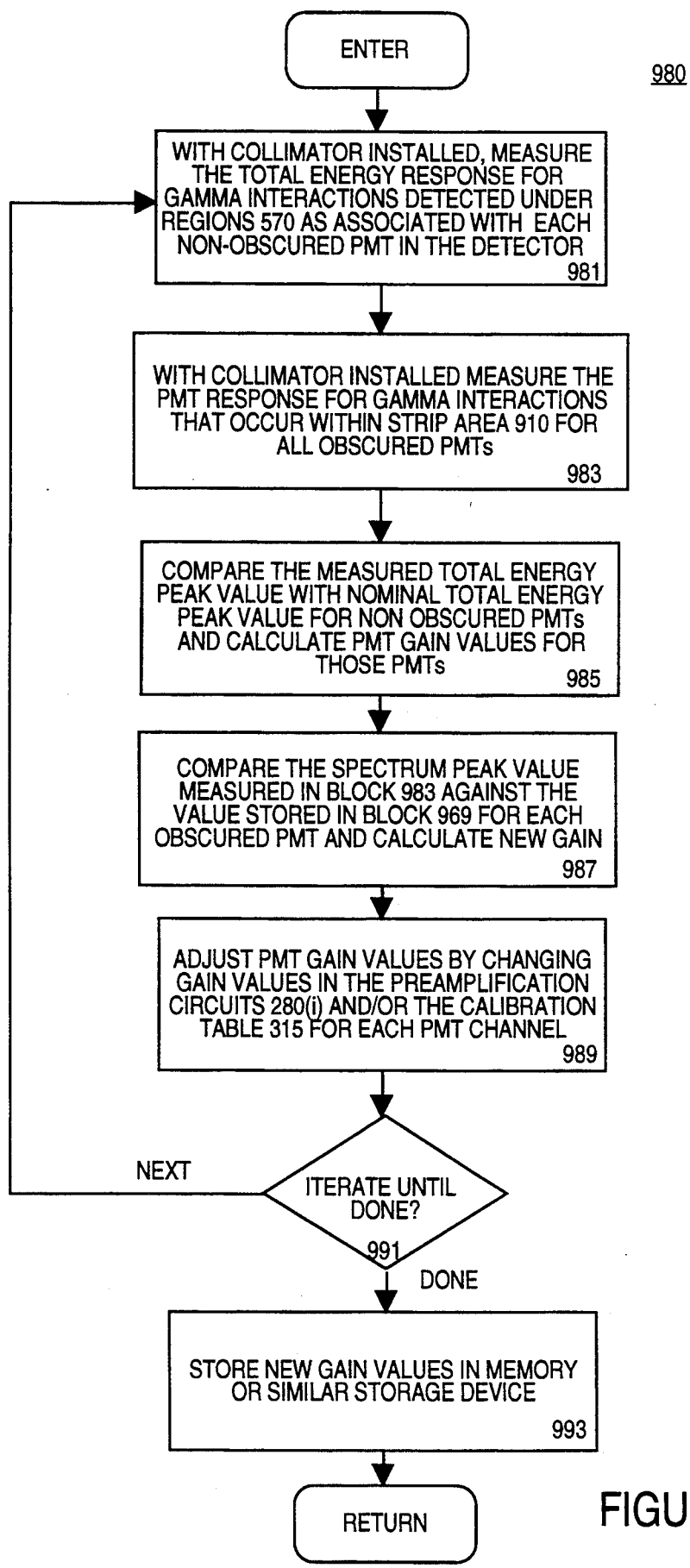
FIG. 13C is a flow chart illustrating routine calibration tasks executed by the autogain procedure of the present invention as typically executed at the site during routine calibration with the collimator installed.

Refer to FIG. 13A, FIG. 13B, and FIG. 13C which illustrate processing steps executed by the computer system 1112 of the present invention for performing automatic gain calibration/adjustment of the preamplification gains Gp (e.g., associated with circuits 280(i) and the adjustment within the calibration table 315) for each channel of the scintillation detector.

FIG. 13A illustrates the process flow 950 of the present invention that is used to perform initial or original calibration of the scintillation detector and is typically performed prior to the energy, linearity, and uniformity calibration. The energy, linearity, and uniformity calibration can be performed at the manufacturing site or can be performed at the operational site of the camera system. This is done prior to operational imaging of a patient. As shown, at step 957, the collimator is removed (if present) from the scintillation detector and the array of photomultipliers is irradiated with a uniform flood field of known energy gamma radiation (e.g., a known isotope is utilized). For all events that are detected within the regions 570 of FIG. 12 (for each PMT), the total energy of the events are recorded, individually, into memory 1102 and associated with the appropriate PMT such that a distribution is formed for each PMT of only those events that were detected above the PMT. The memory 1102 stores the information in a matrix form that associates a given PMT with a distribution of the total energy of gamma events detected within region 570 for that given PMT. At block 957, a measured peak total energy value of the distribution is determined by the computer system for each PMT.

Since a known isotope is utilized, its total energy is known (e.g., nominal total energy peak). At block 959 for each PMT, the measured total energy peak value, as reported by the scintillation detector at block 957, is compared by the present invention against the known ("nominal") total energy peak value associated with the isotope. Within block 961 of FIG. 13A, the gain of each PMT channel is then adjusted such that the measured total energy peak value matches the known or nominal total energy peak value.

For instance, since the energy detected by the scintillation detector responsive to each gamma event of the flood field is known (e.g., X), the peak energy calculated and associated with all PMTs is compared against the known value (X), and the gain (Gp) of the PMT is adjusted up or down accordingly such that the measured value and the nominal value are equal. It is appreciated that both the gain values associated with the preamplification circuits 280(i) and also associated with the calibration table 315 are adjusted at block 961. The gain values associated with the preamplification circuits are a coarse gain and the gain values of the calibration table 315 are fine adjustment values. At block 961, the gain values are also applied to the preamplification channels and the calibration table 315 for each PMT channel.

Refer to FIG. 12 which illustrates a PMT cluster of PMTs 0, 2, 10, 11, 12, 4, and 3 (center). The total energy of events occurring within region 570 of PMT 3 is recorded and stored over a number of events and a measured peak energy value is determined from the energy distribution (at block 957). For events occurring within region 570 for PMT 3, PMT 3 is inherently the central PMT (of the PMT cluster). Therefore, it is expected that the central PMT detects approximately 45% of the light energy (X) detected by the detector. If the total energy of the detected event (at region 570) is 5% higher than the expected value of X, then the gain Gp of the center PMT 3 is adjusted downward by 10% (at block 961) because approximately 45% of 10% adjustment will equally compensate for the detected 5% deviation. This is performed for each of the 55 PMTs of the PMT array.

However, the above gain (Gp) correction ignores the contribution of the peripheral PMTs. It is true that one or more of the peripheral PMTs (e.g., 0, 2, 10, 11, 12, or 4) may have a deviant gain which, for example, may cause a 5% energy deviation for events detected within 570 of PMT 3. If this is the case, then the above correction to the gain (Gp) of PMT 3 may have been made in error. Therefore, the present invention, at block 963, performs the above gain calibration/adjustment for each of the 55 PMTs a number of different times in an iterative procedure (e.g., 10 to 20 times but the number is programmable) to account for the possibility of inaccurate adjustments. Based on this iterative procedure, the effects of inaccurate gain adjustments become significantly reduced as each PMT is eventually adjusted as a center PMT for each iteration. At the end of the processing of the last iteration, the final preamplification gain (Gp) assigned to each PMT is recorded in memory 1102 (or other storage unit) at step 965. Each gain value is stored associated with its PMT.

Referring to FIG. 13A, block 967 is then entered. The collimator remains removed from the detector and the PMT array is again illuminated with the same flood field radiation. For each "obscured" PMT (e.g., not obscured during block 960, but obscured when the collimator is subsequently installed), a region 910 is defined that extends into the field of view of the detector that will encompass the open region 615 of the collimator (when installed). For each "obscured" PMT, each gamma interaction that occurs within its region 910 is recorded by the computer system 1112 at block 967. The integrated channel output for that "obscured" PMT is then recorded to memory 1102 and an energy distribution is formed wherein the peak energy value is then determined at block 969. In the preferred embodiment, the "obscured" PMT is a peripheral PMT by definition for all gamma events that occur within its associated region 910, therefore, the "obscured" PMT is expected to receive a fraction, C, of the total event energy (wherein C is less than 10 percent). For the example of FIG. 11, this would represent a fraction, C, of the value X (2000 photons of 3 eV each) as reported by the detector. The measured peak integrated channel signal detected at block 960 for the "obscured" PMT should register roughly a fraction of X, or C*X.

For instance, (see FIG. 11) for all events occurring within the region 910 associated with PMT 39, the integrated channel signal output associated with PMT 39 is recorded until a distribution is formed in memory 1102. This is performed for each obscured PMT (with respect to its associated strip area 910) over a number of gamma interactions (e.g., 500, but the number is programmable). The peak PMT signal of the distribution of integrated channel signals for each obscured PMT is then recorded into memory 1102 or other storage unit associated with its PMT. Processing of block 950 then returns.

At the completion of the process 950, the present invention calibrates each PMT tube of the array according to events that occur over each PMT and records this gain value in memory. Process 950 also records the peak integrated channel signal for each obscured PMT in response to events that are detected with the obscured PMT's individual strip region 910.

Refer to FIG. 13B which illustrates the routine calibration process 970 of the automatic gain correction of the present invention when the collimator is removed. Routine calibration 970 can be performed at the operational site for calibration of the scintillation detector while the collimator is removed. The processing of blocks 971–979 are analogous to the processing tasks 957–965 of FIG. 13A. Therefore, at block 979 of FIG. 13B, the corrected gain values are stored in memory 1102 and implemented within the preamplification stages 280(i) and the calibration table 315 for each channel. Since the collimator is removed, there are not any actual obscured PMTs.

Refer to FIG. 13C which illustrates the routine calibration process 980 of the automatic gain correction of the present invention when the collimator is installed. Routine calibration 980 can be performed at the operational site for calibration of the scintillation detector while the collimator installed. At block 981, a uniform flood field source is placed in front of the collimator. Interactions occur over the PMT array and the total energy of events detected over the center region (570) of each central PMT (e.g., non-obscured PMT) are recorded in memory 1102 and associated with that PMT. A distribution is recorded for each central PMT and a measured total energy peak value is determined for each central PMT. Block 981 is analogous to block 957 except the processing for block 981 is applicable only to central PMTs. The presence of the collimator does not interfere with this process because the centrally located PMTs are under the open section 615 of the collimator.

At block 983, for each obscured PMT, the present invention records the integrated channel signals from the obscured PMT only for gamma events that occur within that obscured PMT's associated strip region 910. A separate distribution of integrated channel signals is recorded for each obscured PMT and stored in memory 1102 (or other storage device). As stated above, the strip regions 910 associated with the obscured PMTs are aligned with the central portion of the collimator. The processing of block 983 is analogous to block 967, except at block 983 the collimator remains installed. It is appreciated that blocks 981 and 983, of process 980, can occur coincidentally.

At block 985 of FIG. 13C, the measured total energy peak values of the central (e.g., non-obscured) PMTs as reported from block 981 are compared against the known (nominal) total energy peak values for each central PMT channel. The gain value for each central PMT is then adjusted accordingly. The processing of block 985 is analogous to the processing of block 959 except only central PMTs are processed in block 985. The new computed gain values for the central PMTs are stored in memory 1102 (or similar storage device).

At block 987 the present invention, for each obscured PMT channel, compares the measured spectrum peak value (that was measured within block 983) against the stored peak value associated with that obscured PMT channel (that was stored by block 969). At block 987, the present invention computes a new gain (by increasing or decreasing the current gain) for each obscured PMT such that the measured value matches the stored value for each obscured PMT. This can be performed by a straight ratio computation (e.g., if the measured spectrum peak value reported from block 983 is 10% larger than the stored value from block 969, then the current gain for that obscured PMT is reduced by 10%, etc.). At block 987, the newly computed gain for each obscured PMT is then recorded in memory 1102 (or similar storage device).

At block 989 of FIG. 13C, the present invention then applies the newly computed gains of: (1) the central PMTs as computed in block 985; and (2) the obscured PMTs as computed in block 987, to the appropriate preamplification circuits 280(i) and the appropriate locations within the calibration table 315 for each channel. The preamplification circuit contains the coarse gain control while the calibration table 315 provide fine gain control. At block 991, the present invention performs the processing in an iterative manner over a number of times (a programmable number) to refine the calibration and adjustment. When done, processing flows to block 993 where the newly adjusted gain values for each channel (central and obscured) are stored in memory 1102 (or other storage unit).

It is appreciated that processes 970 and 980 can be performed by the camera system at any time. By performing the process 980 before imaging sessions of the gamma camera system, the preamplification gains of the PMT array are calibrated automatically such that the responses of the PMTs remain essentially the same as when they were calibrated at the factory. This will cause the scintillation detector to be calibrated to match the response it had when the energy, linearity, and uniformity correction values were created. This match between the energy, linearity, and uniformity correction factors and the detector response improves image quality.

In an alternative embodiment of the present invention, in lieu of using a peak energy determination of the distributions of processes 959, 969, 973, 985, and 987, an average or mean computation can be utilized. A "representative" data value of an energy or signal distribution can therefore be the peak, average, mean, or similar function, of such distribution.

In another alternative embodiment of the present invention, the integrated channel signals for each obscured PMT are not measured to perform the gain correction for these PMTs. In lieu of the integrated channel signals being recorded, the total energy of the events occurring within the strip regions 910 are recorded and an representative energy value is computed for this distribution for each obscured PMT. The above is performed for both blocks 967 and 983 such that the total energy of each gamma event is recorded and compared.

It is appreciated that the data related to the integrated channel signals that is needed by the above procedure is gained via the computer system 1112 from the DEP 300 from bus 397 (see FIG. 2D). The total energy for a given event is supplied over bus 322 of DEP 300. In each case where channel information is gathered for gamma events detected within specific XY regions, the present invention provides a coincidence circuit for comparing the XY coordinate of the event as output from bus 327 and 332 and the circuit compares this coordinate value against the known region (e.g., area 570 or strip region 910). If a match occurs, then the desired data is sampled either via bus 322 for the total energy signal or via bus 397 for the specific channel data. Alternatively, this specific channel data can also be supplied directly from buffer 325 of the DEP 300.

Variable Dynamic Compression

The present invention DEP 300 circuit provides a programmable, variable dynamic compression table 355 (FIG. 2D) so that the energy response of a PMT can be adjusted using a programmable digital function stored in memory rather than using dedicated analog hardware, as in the prior art. In effect, the dynamic compression table 355 of the present invention is utilized in place of the well known analog breakpoint driver circuits of the prior art. The breakpoint driver circuits of the prior art are composed of analog circuits (including diode networks) for adjusting the PMT output. However, opposite to the present invention, the prior art circuits are not programmable or readily modifiable.

The dynamic compression table 355 may be composed of programmable memory or static memory (ROM or PROM). If programmable memory is utilized, it may be composed of a number of well known memory types, such as RAM or EEPROM.

Figure 14A:
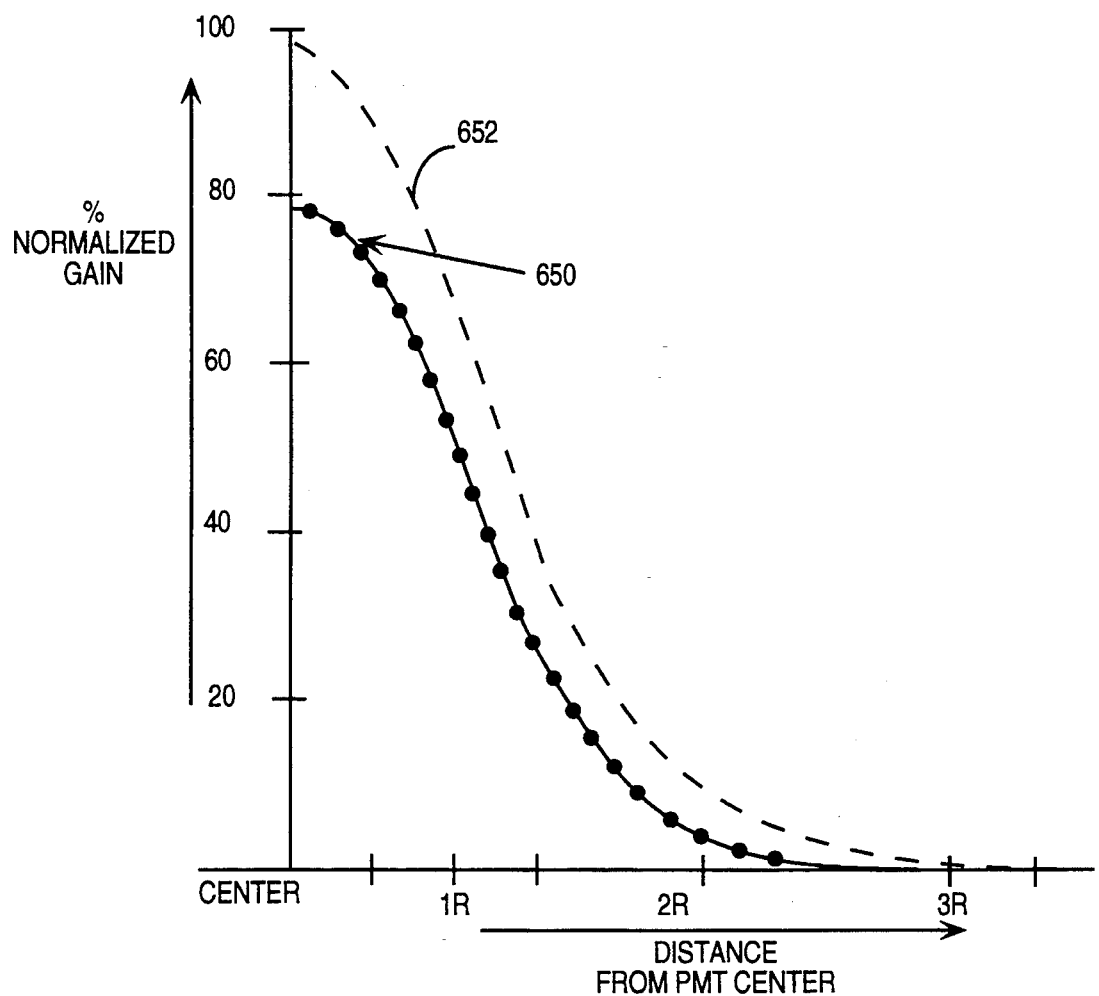
FIG. 14A illustrates an uncompressed response of a PMT for an event verses the distance from the center of the event and also shows compressed response.

The dynamic compression table 355 of the present invention performs two tasks: (1) it reduces or eliminates noisy signals from PMTs far from the point of the gamma interaction; and (2) its shapes the remaining signals in order to obtain a more uniform spatial response across the detector. Digital implementation of this procedure allows the use of relatively simple linear preamplifiers thus reducing the complexity and cost of the analog electronics, and improving the long term stability of the system. The Dynamic compression table 355 is utilized to alter the signal output from each PMT channel to remove nonlinearity so that when the signal summed with other altered signals, the resultant summation signal is more linear. Refer to FIG. 14A which illustrates the normalized energy response of a PMT based on the distance from the PMT center at which a gamma interaction occurs. The response 652 is the signal before correction by the dynamic compression table and response 650 illustrates the corrected or compressed response as output from the compression logic of the DEP 300. Due to the characteristics and physics of the PMT, the response is overly elevated for events that occur near the center of the PMT, therefore the compression logic reduces this response accordingly.

Figure 14B:
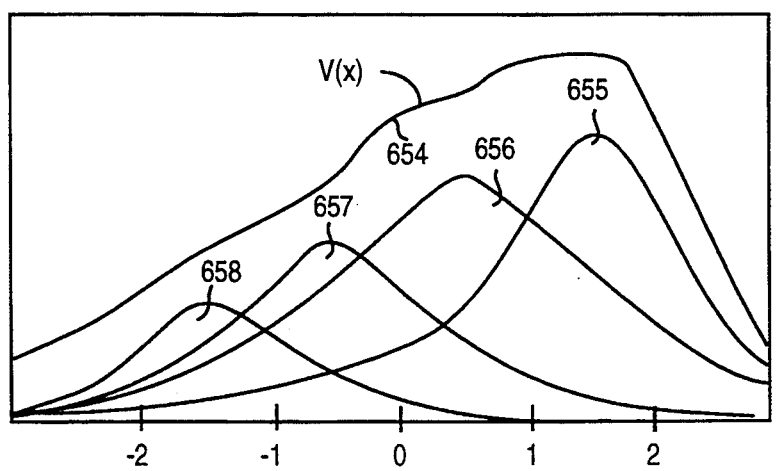
FIG. 14B illustrates a summation of PMT responses (of a PMT cluster) over a one dimensional PMT configuration.

Refer to FIG. 14B. The overly elevated response of the PMT tube near the tube's center poses a problem because when summed with other neighboring PMT's responses, the summation signal is not linear. The accuracy of the centroid computation depends, in part, on the linearity of the summation signal as evidenced from the centroid computations as previously described herein. FIG. 14B is a plot of PMT response over PMT position for 5 PMTs in a particular single axis. Response 654 is the summation of each of the 5 PMT signals. FIG. 14B illustrates that the summation signal 654 (sum of the PMT responses 655-658) can be slightly nonlinear, and this nonlinearity tends to reduce the spatial accuracy of the centroid computation. The dynamic compression table 355 and subtractor circuit 391 provides an adjustment to the input PMT integrated channel signal over bus 352 to allow a more linear summation signal. In affect, after compensation by the dynamic compression table 355, the summation signal 654 has a more linear slope.

Figure 15B:
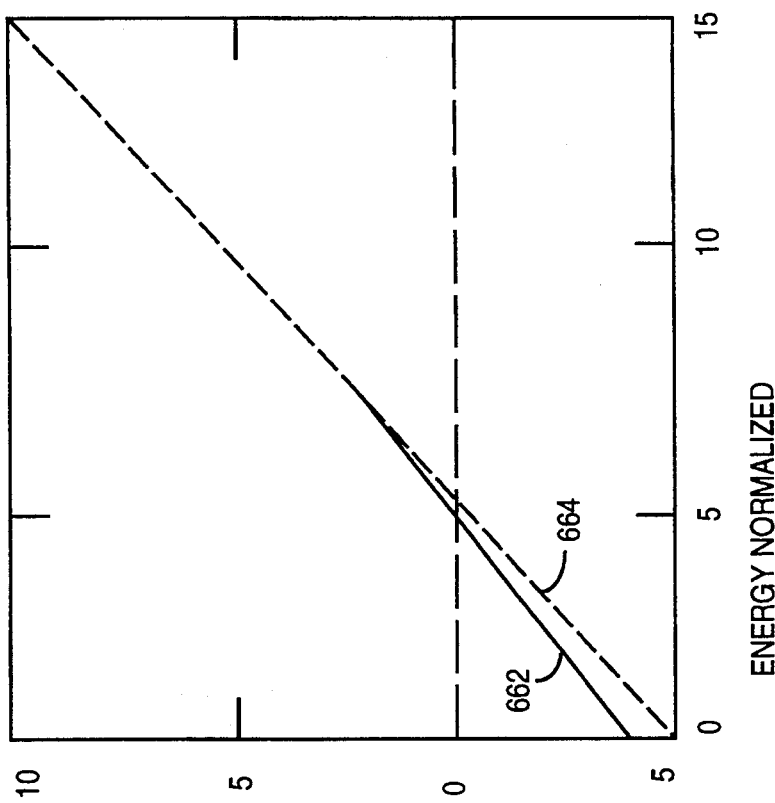
FIG. 15A and FIG. 15B and FIG. 15C illustrate exemplary compression procedures realized by the dynamic compression table and circuitry of the present invention.
Figure 15A:
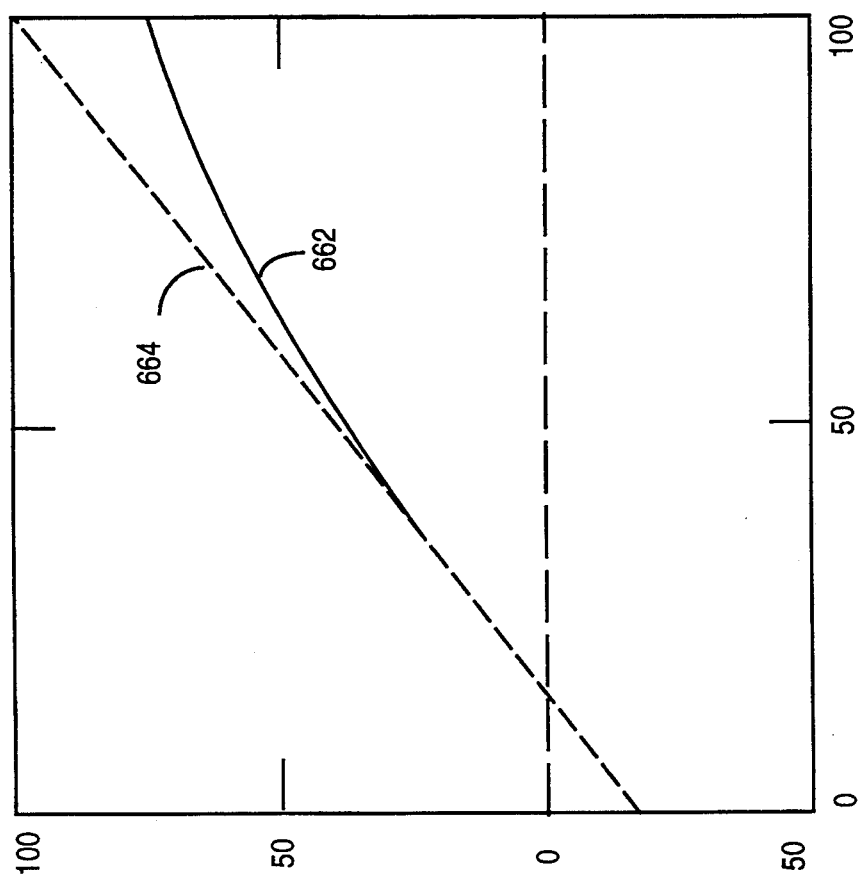

FIG. 15A illustrates a graph of the input energy response (normalized to global energy) 664 of a PMT channel and the desired normalized altered response 662 as a result of the dynamic compression procedure of the present invention. As shown, for moderate energy levels the higher the energy the more the attenuation. Since the dynamic compression procedure operates on normalized values, the dynamic compression table 355 receives, as an input, the global energy over bus 322. The dynamic compression table 355 outputs, over bus 392, the value of the offset or difference between signal 664 and 662 (for a given input signal over bus 352) multiplied by the global energy (GE). Therefore, the output of the energy table 355 of the present invention is not normalized. The subtractor 391 then subtracts this output of table 355 from the uncorrected PMT channel signal supplied over bus 352. The result is a corrected or compressed integrated channel signal over bus 397. FIG. 15B illustrates the response of the conversion utilized by the present invention for normalized input signals less than 15 percent of the max signal value. As shown, the corrected energy curve 662 is slightly higher in value than the input or uncorrected curve 664.

In a particular embodiment, the compression table 355 is $6 \times 8 \times 14$ (32 k) in size and is addressed by the 6 MSBs of the global energy signals (322) and the 8 MSBs of the calibrated channel signal (352). Each 2 byte cell contains a 14 bit offset value which is subtracted from the 10 bit value of the channel signal 352. The dynamic compression table 355 is calculated to 14 bits of precision: 8 significant bits plus 6 fractional bits. The finer sampling allows the X and Y weighted sums to take on a greater number of values, reducing the quantization effects of the integer position calculation. The output of the offset value from table 355 is 16 bits and the input to the subtractor from bus 352 are the MSB 12 bits. The output from the compression table 355 of the present invention is at a higher resolution than the signal over line 352.

An exemplary and general compression procedure utilized by an embodiment of the present invention is illustrated as the response shown in FIG. 15A and FIG. 15B. Since the dynamic compression is a non-linear function, the PMT integrated channel signals are scaled by the global energy prior to dynamic compression. The scaling allows the dynamic compression function to be independent of energy, which is an improvement over the non-linear amplifiers of the prior art.

Within this exemplary procedure, the integrated channel signal supplied over line 352 ($E_{pmt}$) is scaled, normalized, by the global energy (GE) relative to the nominal peak global energy (ge) by:

$$E_{in} = E_{pmt} * (ge/GE)$$

The value ge is constant and an exemplary value is supplied below. The scaled signal, $E_{in}$, is passed to the dynamic compression (rolloff) procedure, D, as shown further below.

$$E_{fn} = D(E_{in})$$

Finally, the compressed signal is scaled back, denormalized, to its original level:

$$S = E_{fn} * (GE/ge)$$

where S is the signal that is output over line 387 from the subtractor circuit. The exemplary general roll off procedure of the present invention is shown below as:

$$D(E_{in}) = [SHi * e^{-(SHi*RHi)/SP}] + [SLo * [e^{-(SLo*RLo)/SP} - 1]] - bais*SP$$

Where:
  $SLo = LoThresh * SP - E_{in}$ (for $E_{in} <$ LoThresh * SP)
  $SLo = 0$ (for $E_{in} > =$ LoThresh * SP)
  $SHi = E_{in} -$ HiTresh * SP (for $E_{in} >$ HiTresh * SP)
  $SHi = 0$ (for $E_{in} < =$ HiTresh * SP)

According to the general procedure, SP is the nominal peak calibrated PMT signal and the each of the other parameters is expressed as a fraction of SP. LoThresh is the starting point of the low-end rolloff and HiTresh is the starting point of the high-end rolloff. RLo is the degrees of low-end rolloff. RHi is the degrees of high-end rolloff. Bias is the DC bias to be subtracted from the rolled off function. Preferred results have been achieved with the following parameters (however each is programmable and adjustable within the present invention):

ge = 180
  SP = 200
  LoTresh = 0.08
  HiTresh = 0.25
  RLo = 2.5
  RHi = 0.35
  Bias = 0.05

In the computation of the preferred embodiment of the present invention, the compression table 355 contains only the offset value that is subtracted from the channel signal, e.g., the difference between lines 662 and 664 of FIG. 15B. Therefore, the actual value stored in the lookup table 355 is computed based on the difference between the above procedure and the channel input signal, times the global energy GE. This is shown below:

Data output over bus $392 = [E_{in} - E_{fn}] * [GE/ge]$

The output over bus 392 is then subtracted from the uncorrected energy of the particular PMT channel. Therefore, the procedure below illustrates the corrected or compressed signal:

Data output over bus $387 = E_{pmt} -$ Data output over bus 392

The dynamic compression circuit 355 of the present invention ensures that the above subtraction does not yield a negative number. Any negative number output is zeroed.

The above procedure an be reduced and given below assuming a normalized input signal from the range 0 to 100:

$$E_{fn} = [E_{in} * e^{-(0.35*TH)/100} + TL * (e^{-(2.5*TL)/100} - 1)] - 0.05$$

where:

$E_{in} = E_{pmt}/GE$ $TH = E_{in} - 25$, if $E_{in} < 25$; and $TH = 0$, if $E_{in} <= 25$ $TL = 8 - E_{in}$, if $E_{in} < 8$; and $TL = 0$, if $E_{in} >= 8$ $0.05$ = small baseline offset The input to the compression table 355 is GE (over bus 322) and $E_{pmt}$ (over bus 352) for a particular PMT channel. The output of the table 355 is shown below. The actual value stored in the lookup table is computed based on the difference between the above procedure and the normalized input, times the global energy GE. This is shown below:

Data output over bus 392 = $[E_{in} - E_{fn}]$ * GE

The output over bus 392 is then subtracted from the uncorrected energy of the particular PMT channel. Therefore, the procedure below illustrates the corrected or compressed signal:

Data output over bus 387 = $E_{pmt}$ − Data output over bus 392

The dynamic compression circuit 355 of the present invention ensures that the above subtraction does not yield a negative number. Any negative number output is zeroed.

It is appreciated that given sufficient memory size within circuit 355 of the DEP 300, the data can be configured such that the global energy value GE is input, along with the channel data of bus 352 and the compression table 355 can then output the corrected value of the PMT channel data directly over bus 387. In this embodiment, the subtractor 380 is not utilized. Also, the data of the dynamic compression table 355 of the present invention can be further optimized by modifying the procedures illustrated above. These modifications or optimizations may involve empirical data that is particular to a camera system or operating environment.

Figure 15C:
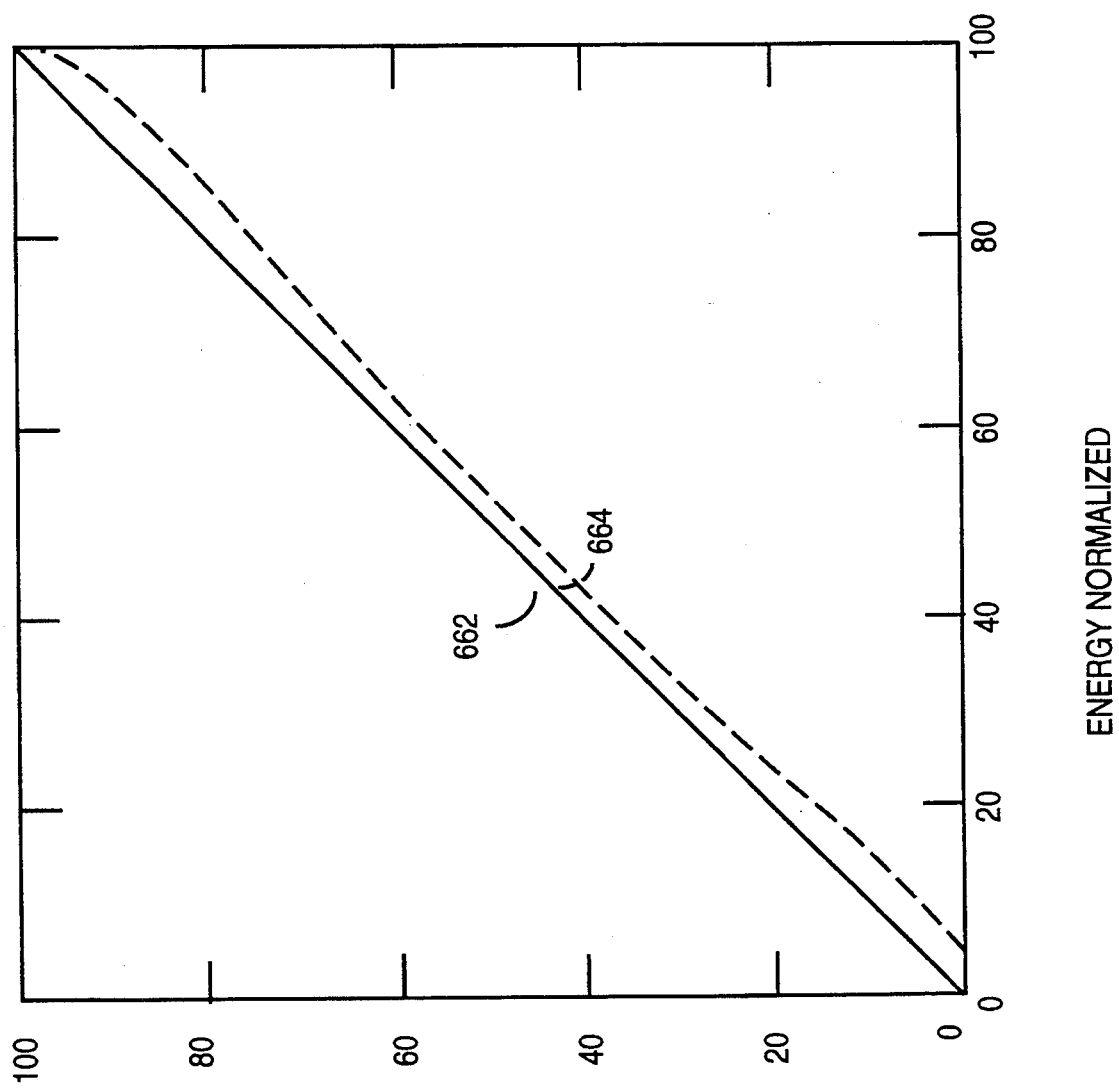

As shown in FIG. 15C, another dynamic compression procedure is illustrated that is stored in the dynamic compression table 355 and used in a similar manner with similar mechanisms as shown and discussed above.

Given the above procedures, the actual data tables (addressed by GE and $E_{pmt}$) may readily be determined by one of ordinary skill in the art and are exemplary only. Because the table 355 is programmable, the level of resolution desired by any one embodiment is variable depending on the available size of memory for circuit 355. According to the present invention, the data of the dynamic compression table 355 is generated by data processor 1112 according to a programmable set of parameters and the compression procedure shown above and this information is then downloaded into the memory 355. If RAM is utilized, then the actual correction data can be stored in a disk storage 1104 or ROM 1103 and then down loaded into the memory 355 before the gamma camera system is used. Therefore, the data processor 1112 may store a variety of different procedures and/or correction data tables and a user can select among them for generating tables of correction data and for loading them into memory 355 for use in the DEP 300 as system calibration. In this alternative, the dynamic compression table 355 is extremely flexible and programmable. Alternatively, when the memory 355 is EEPROM, the data is programmed into the memory 355 before use and can be reprogrammed by a technician.

Automatic Baseline Compensation

Figure 16:
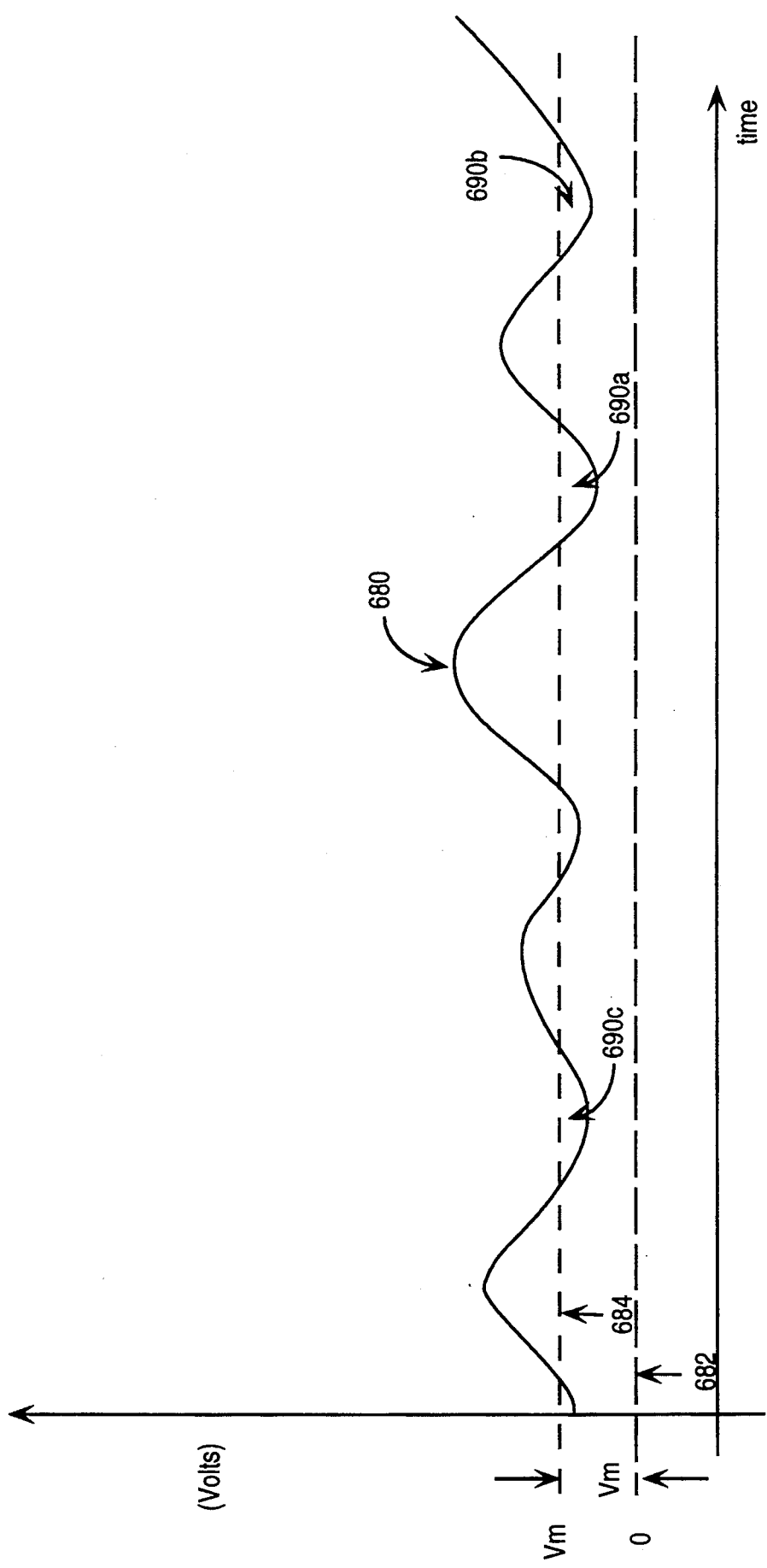
FIG. 16 illustrates an analog voltage wave form (with baseline offset) of a preamplification channel of the present invention.

Within the present invention, a slight DC offset (baseline offset) is maintained within each preamplification stage for each PMT channel via a digital input to a DAC which controls inputs 212 and 214 of FIG. 2C. Shown in FIG. 16 is an exemplary PMT analog channel output voltage signal 680 as sampled by ADC 236 (of FIG. 2C). Due to the integration processes performed for an event, negative voltages of signal 680 are unwanted, become clipped, and lead to inaccurate integration results. Due to circuit drift of the amplifiers of circuits 280(0) to 280(54) (e.g., due to temperature, current flow, etc.) the baseline of the voltage signal 680 as sampled by the ADC 236 may vary and, if left uncorrected, may dip below zero. The baseline shift of an individual PMT is typically a fraction of a channel signal, but the sum of the shifts over an entire detector can move the global energy peak by several channels. Baseline shifts also result in image registration variations. Drift may be compensated for by the use of expensive amplifier circuits, but since a separate set of amplifiers is required for each channel, such a solution is not economically practical. The present invention provides an automatic procedure and circuitry for baseline compensation in order to adjust for this variable drift by measuring and adjusting the baseline voltage in real-time.

In effect, the present invention inserts (via inputs 212 and 214) a base line compensation voltage amount called Vm in order to adjust the analog signal per channel. Each channel has an independent Vm. This is shown in FIG. 16. Line 682 shows true zero voltage and the signal 680 is adjusted by an amount Vm. After digitization and integration, this offset value Vm must be subtracted from the total, resulting in the net channel signal. Baseline subtraction is performed in the calibration lookup table circuit 315 of the DEP 300 for each channel, and is based on the particular Vm inserted for that channel.

The amount of voltage offset applied at 212 and 214 provided by the present invention varies, as discussed below. However, there is an ideal number Vm, that is computed based on the level of expected noise within the dynamic range of the ADC 236. Since this dynamic range is within 1024 units, in one embodiment, and since the expected noise percentage is roughly 8 percent, the digital value of Vm is approximately 78 units within the dynamic range of the ADC 236. Of course this value will vary depending on the specific implementation of hardware utilized. This value is initially used as an offset to control inputs 212 and 214 (a separate input is used for each channel) to offset signal 680. The value of Vm is determined such that signal 680 does not vary below zero. Vm is also adjusted such that a large portion of the dynamic range of the ADC 236 is not consumed by the offset voltage.

The actual value of the voltage offset as measured by the ADC 236 (when no event is present) may drift. In the present invention, the digital processor 1112 measures the signal output value for a particular channel that is not substantially receiving energy from a gamma event. This value should be near the ideal voltage Vm. The sampled voltage is compared against the ideal voltage and is modified up or down (in a real-time feedback arrangement) to closely match the ideal voltage Vm. In this manner, the present invention compensates for the drift associated with the electronics of the preamplification stage for each channel by modifying the value of the offset voltage. This sample and adjust procedure is performed separately for each channel.

The present invention procedure for monitoring the analog signal of each channel and for modifying the baseline of this signal based on the ideal baseline value of Vm is described below. Generally, the present invention provides two alternate methods for baseline compensation: (1) a method used during periods of low count rate; and (2) a method used during periods of high count rate. The computer system 1112 contains a baseline offset matrix of data values in memory 1102, one for each channel, that records the current baseline offset voltage applied at inputs 212 and 214. The values within this baseline offset matrix are updated by the present invention to compensate for voltage drift of the amplifier stages of the circuits 280(0) to 280(54).

Figure 17A:
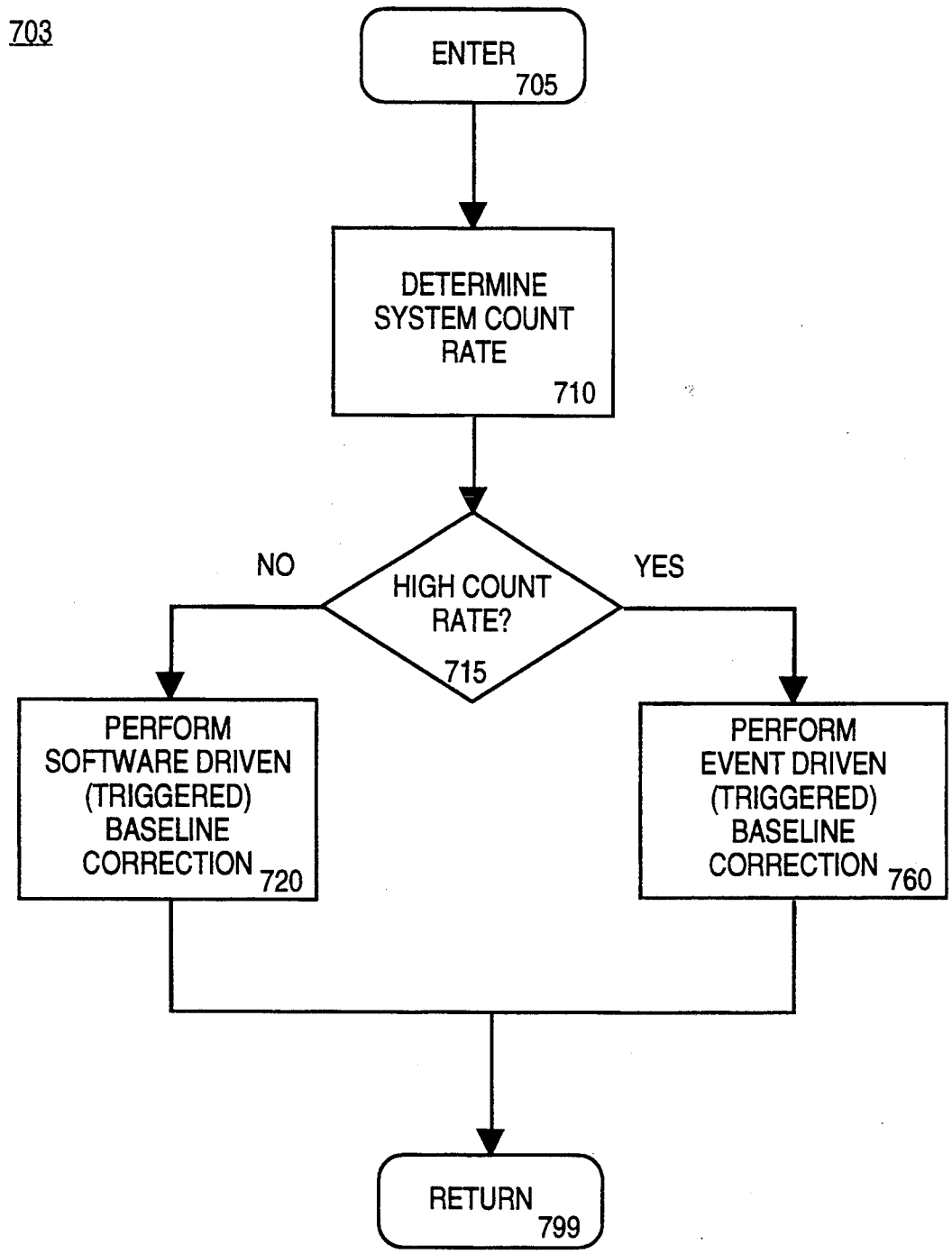
FIG. 17A illustrates a flow chart of the automatic baseline offset calibration, of the present invention.

Refer to FIG. 17A which illustrates the channel baseline compensation procedure 703 utilized by the present invention and performed by digital processor 1112. At 710, the present invention initially determines if the count rate detected by the camera system is high or low. High count rate is determined as a count rate that exceeds 75,000 counts per second, but this count rate is exemplary and is programmable within the present invention. Different procedures will be implemented by the present invention depending on the camera's count rate. At 715, the digital processor determines if the count rate is above the threshold (e.g., 75,000 counts/sec) and, if true, block 760 is performed for event triggered baseline correction. If the overall count rate detected by the gamma detector is lower than or equal to the threshold amount, then at block 720, the processor 1112 performs software triggered baseline correction. At the completion of a correction procedure, the processing is exited via 799. It is appreciated that the flow 703 of the present invention is repeated throughout the operational duty cycle of the gamma camera including periods in which the camera is idle and also during periods in which the camera is actively engaged in an imaging session.

Software Triggered.

Figure 17B:
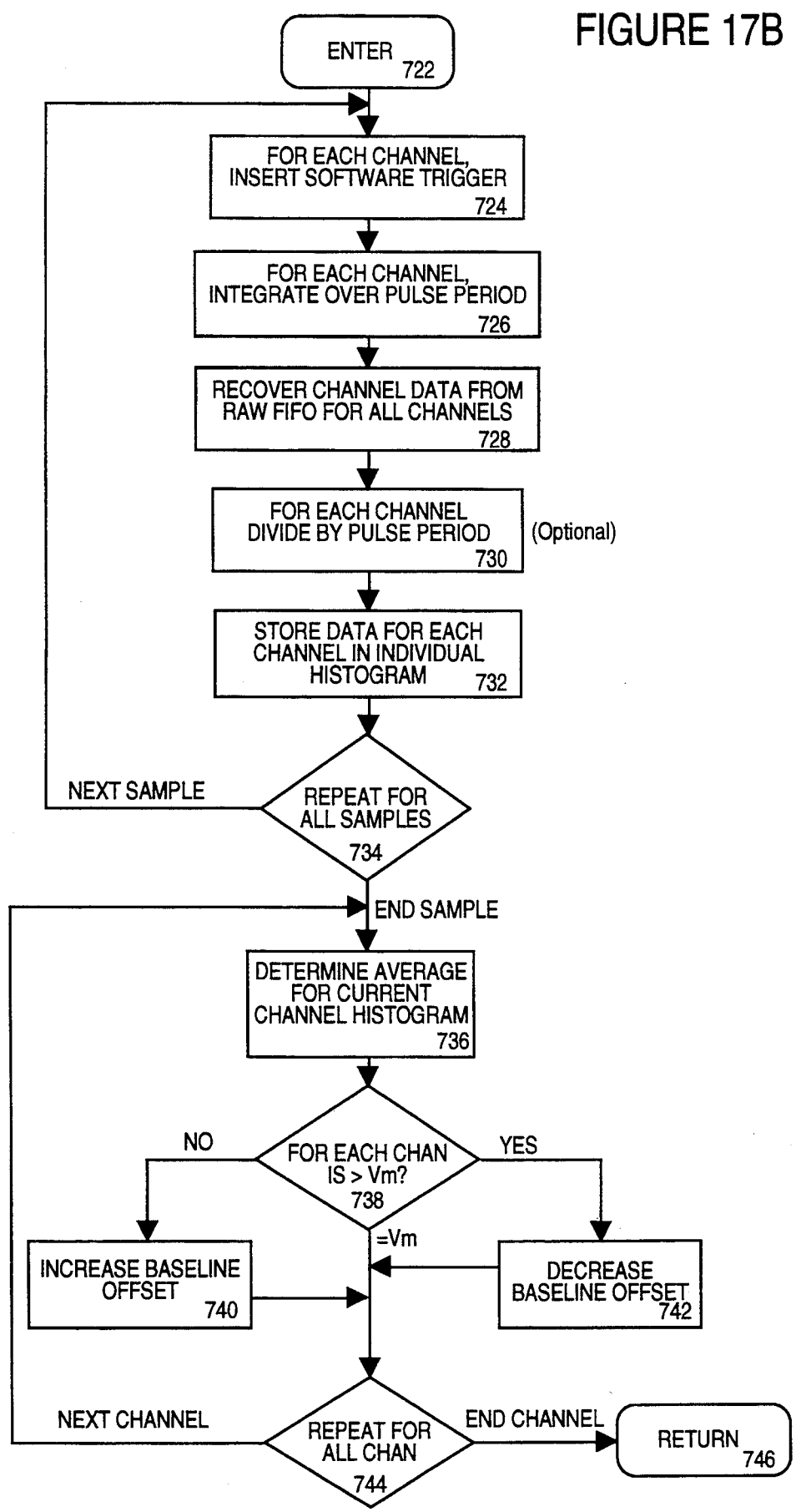
FIG. 17B illustrates a flow chart of the software triggered baseline offset correction procedure of the present invention.

Refer to FIG. 17B which illustrates the software triggered baseline correction procedure that is performed during periods of low count rate. FIG. 17B illustrates the steps performed by the present invention by block 720. At block 724, for each of the channels of the detector 80, the present invention inserts a software generated trigger that emulates an actual event trigger that would be detected over line 130 of circuit 100 of FIG. 2A. For each channel, the digital processor 1112 in effect triggers an integrator (e.g., 238 or 240) to begin integrating over a pulse period. The integration is performed simultaneously for each channel at block 726 (or alternatively in stages) and each channel should, ideally, integrate over the baseline voltage since statistically no event is expected to coincide with the software triggered pulse period. The software trigger is also called a false trigger since it is not initiated based on detection of a true gamma interaction. Since the software triggered integration does not usually coincide with an event, for the most part, the integration performed by the channels will be over a pulse period wherein the baseline voltage should, ideally, be very close to Vm. This is the case because the channel should not be generating an output signal due to the expected (e.g., statistically) absence of an event.

At block 728, the data generated from the integration of block 726 is recovered from the raw FIFO memory 310 (of DEP 300) by computer system 1112. This memory contains the integrated result of each channel without subtraction of the Vm offset (which is performed by the calibration table 315). Optionally, at block 730, the data for each channel is divided by the pulse period to normalize the integration in time. This step is optional because if the time period of each integration is known, then this time period multiplied by the ideal Vm value can be used as a reference by which the base line offset value can be compensated. Either implementation is within the present invention. At block 732, the data for each channel is stored into a separate histogram that is maintained by computer system 1112 in memory 1102 for each channel. The histogram records the sampled baseline voltage (for a given channel) over the number of samples taken. At block 734, the above process is repeated for a next sample until a predetermined and programmable number of samples is taken. For each sample, the data associated with each histograms are increased. An exemplary number of samples used by the present invention is 250 samples per channel. Therefore, a particular histogram constructed for each channel by block 732 is composed of roughly 250 data points. These histograms are maintained by the present invention in RAM memory 1102 of the data processor 1112. Assuming 55 channels per detector, there needs to be 13,750 false counts per calibration process of the present invention for process flow 720.

At block 736 of FIG. 17B, the present invention utilizes the histogram created for a particular channel to determine the average value of the sampled baseline offset amount. This determination may be made using a number of well known averaging, mean or weighted averaging procedures. Any number of different procedures may be utilized consistent within the scope of the present invention at block 736. At block 738, for the particular channel, the average is compared against Vm (which is stored in memory by processor 1112 and is constant for each channel). If the average for the particular channel is greater than Vm, then at block 742 the baseline offset of the particular channel which is stored in a baseline offset matrix within memory 1102 (as applied via signals 212 and 214) is decreased by one unit and the matrix is updated and block 744 is entered. If the average for the particular channel is less than Vm, then at block 740, the baseline offset of the particular channel (as applied via signals 212 and 214) is increased by one unit and the baseline offset matrix is updated and block 744 is entered. Otherwise, if the average value of the baseline is equal to Vm, then no baseline correction is required and block 744 is entered directly. It is appreciated that there is a separate computer controlled pair of inputs, 212 and 214, for each amplification circuit 280(0) to 280(54).

At block 744, the above procedure (to block 736) is repeated for each channel, so that the baseline corrections for each channel are adjusted (in a feedback arrangement) separately. At block 746 the procedure is exited and the histograms maintained in memory 1102 for the above compensation procedure are reset. Therefore, as can be seen above, the present invention measures the channel voltage for each channel during periods of no expected events and records and adjusts the baseline voltage for the channels. Due to drift, these voltages may vary, but should be constricted to the value Vm to prevent clipping (due to negative voltage). The present invention provides a measurement and compensation procedure to effectively maintain the baseline voltages for each channel to the ideal value, Vm. This is performed using a feedback arrangement as shown in FIG. 17B thus avoiding the use of expensive circuitry within the preamplification stages 280(0) to 280(54).

It is appreciated that the present invention, for block 720, does not determine in advance if there is a real event occurring in coincidence with the software trigger generated at block 724. Statistically, it is rare (but possible) to have an event occur in coincidence with (and therefore interfere with) the software triggered integration period during periods of low count rate. Should an event occur during block 726 of the present invention, that data point will be much larger than the expected value (due to the PMT responses) and will be effectively excluded statistically from the average (or median) computed for the channel at block 736. In an alternative embodiment, the present invention may perform an additional step of excluding all data points from the histograms generated in block 732 that exceed a predetermined threshold in order to exclude data points corrupted by an event. However, given 250 samples (for instance), the number of data points corrupted by an event is very low and is negligible.

Figure 17C:
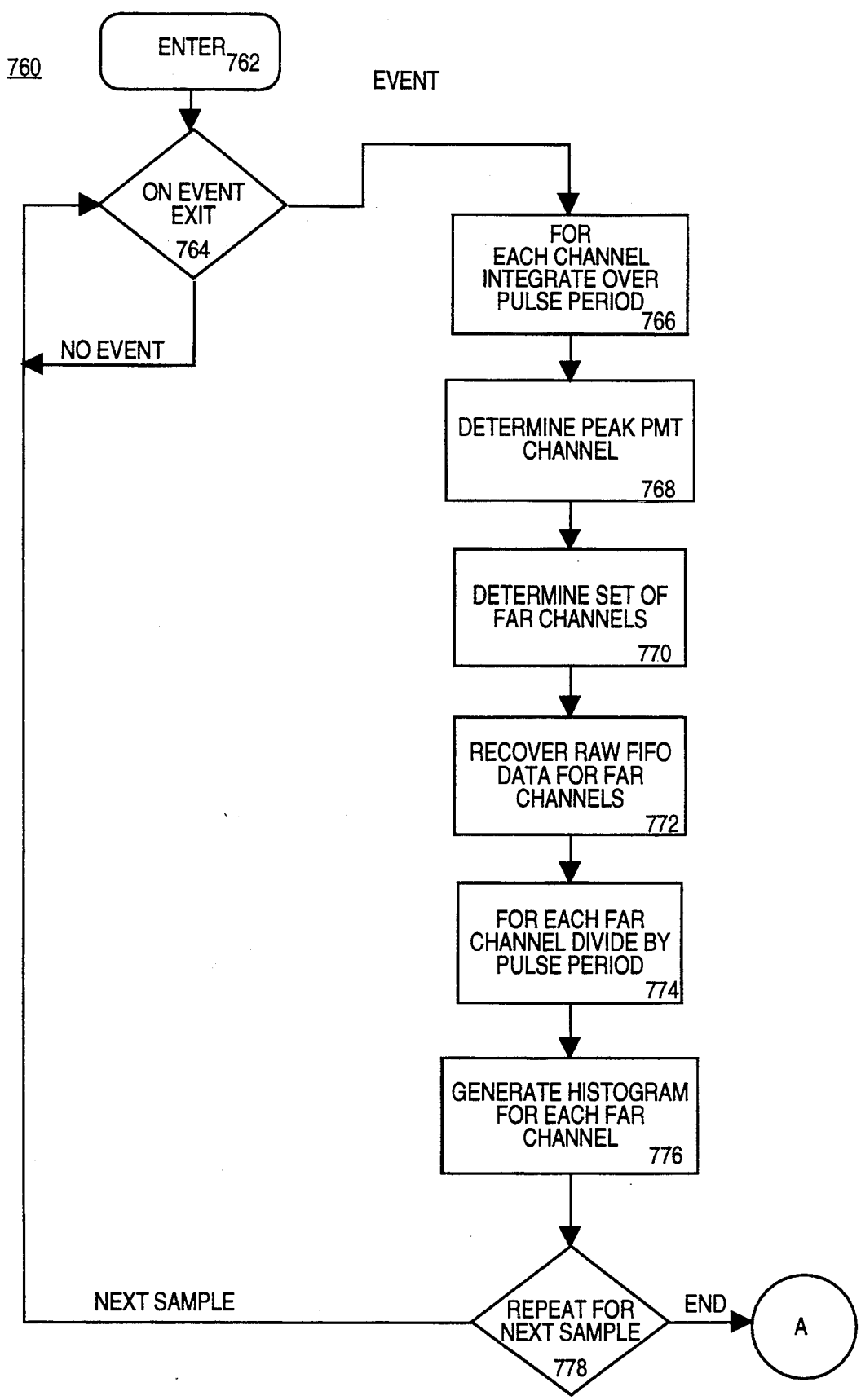
FIG. 17C and FIG. 17D illustrate flow charts of the scintillation triggered baseline offset correction procedure of the present invention.
Figure 17D:
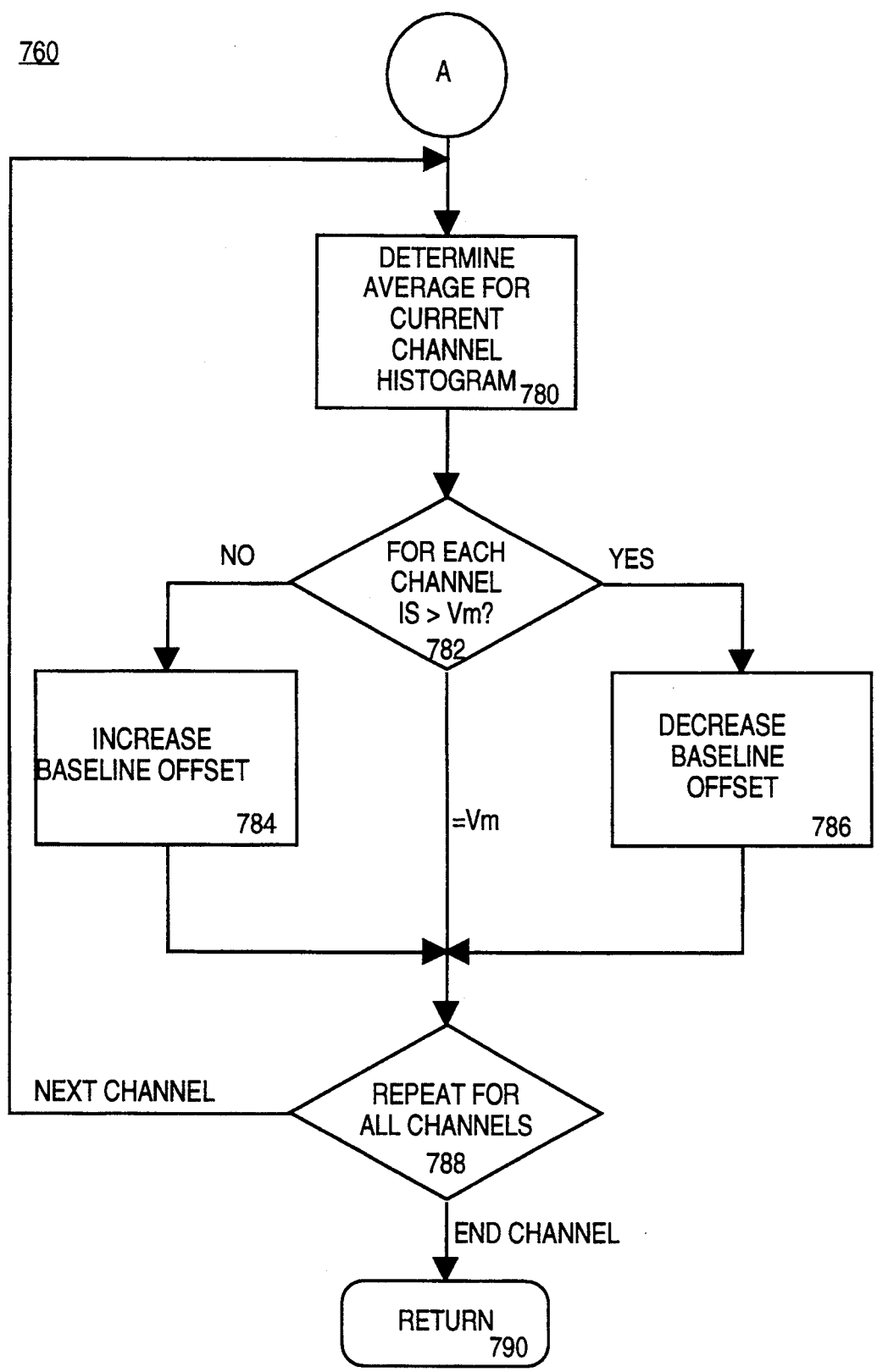

Scintillation Triggered. Refer to FIG. 17C and FIG. 17D which illustrate the procedure 760 utilized by the present invention to provide baseline compensation during periods of high count rates. Procedure 760 utilizes actual events to trigger the measurement processes and therefore is called event or scintillation driven baseline correction. The process begins at the detection of a gamma event at 764 and flows to 766. An event is detected via a trigger signal over line 130. For each channel, the trigger pulse causes each integrator to integrate over the pulse period as described previously herein. Also at block 766, the data from the integration is forwarded to the DEP 300. At block 768, the DEP 300 determines which channel was the peak channel (e.g., the peak PMT) for the event by using circuit 320 (FIG. 2D) described above.

Figure 18:
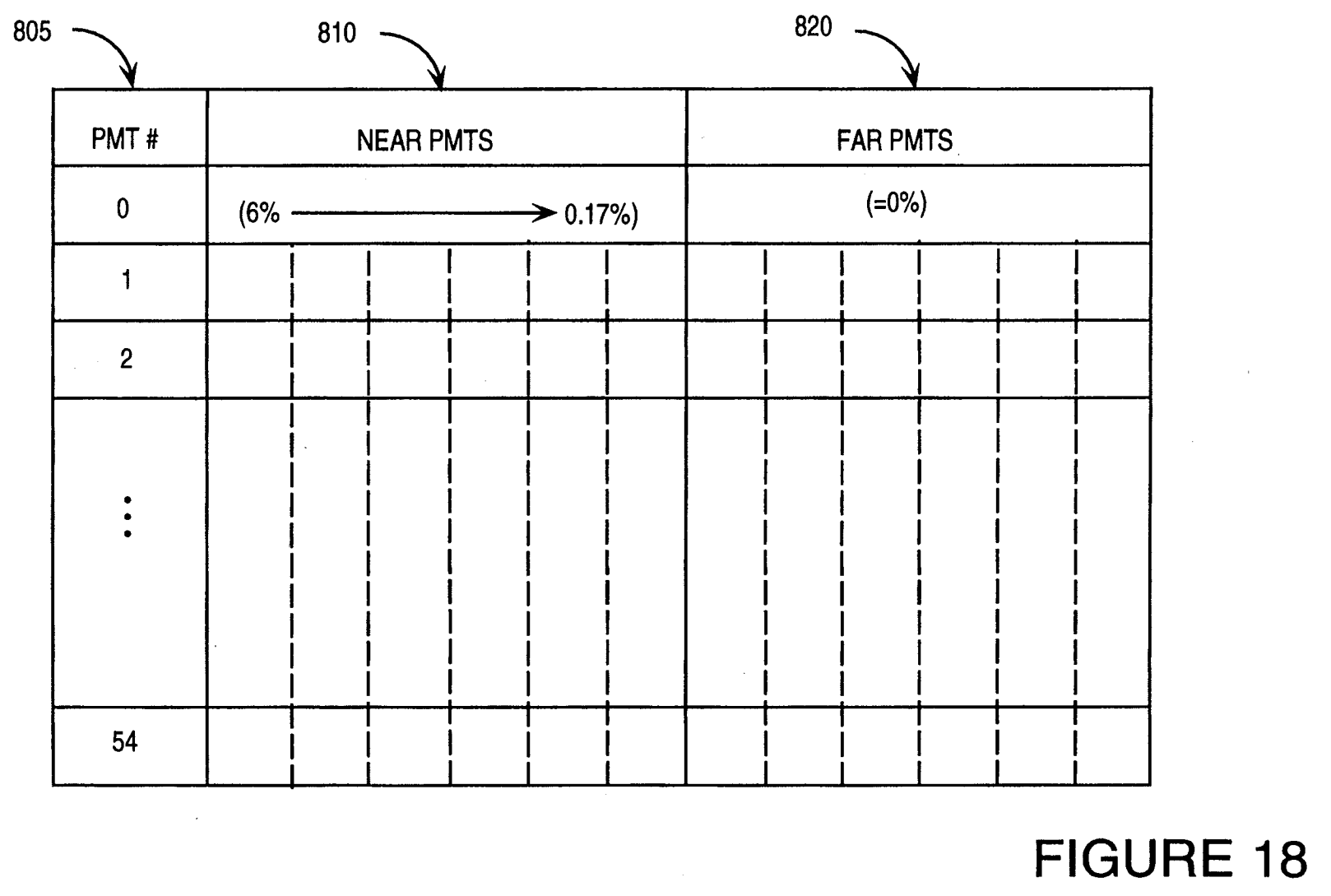

Based on the peak PMT value (which is reported back to the digital processor 1112), the present invention utilizes a memory circuit 800, as shown in FIG. 18, to determine which PMTs are spatially near to the peak PMT and which PMTs are spatially far from the peak PMT. Far PMTs are determined to be those PMTs that receive substantially no (or negligibly little) energy from the event and near PMTs are those PMTs that receive some energy (e.g., less than 0.17%, etc.) from the event. As shown in FIG. 18, there is an entry for each PMT in column 805 and column 810 lists those PMTs that are near and column 820 contains a list of those PMTs that are far. For each peak PMT there is a group of far PMTs that should receive substantially no energy from the event. For any given event detected at block 764 it is the far PMTs that are sampled by the present invention for baseline correction. The set of far PMTs for a given peak PMT address may be determined experimentally by measuring PMT responses for a known peak PMT address within a given PMT array.

At block 770 of FIG. 17C, the present invention addresses circuit 800 with the peak PMT address (number) to determine the set of far PMTs as reported by column 820. At block 772, for the given event the present invention directs computer system 1112 to recover the data associated with each of the far channels as stored in the RAW FIFO memory 310 of DEP 300. These far channels should report essentially an integration of the baseline voltage because they received an insubstantial amount of energy from the detected event. Optionally, at block 774 the integration data of the circuit 310 is divided by the pulse period to normalize the data in time for each far channel. At block 776, the present invention adds the value of the sampled voltage to the histogram for each far PMT channel sampled. At block 778, the above procedure is repeated for the next sample. This procedure continues until each channel obtains at least a predetermined and programmable number of data points in its histogram. An exemplary number of data points is 250 samples per channel.

It is appreciated that for each gamma event at 764, a different number and group of far channels will be sampled. Therefore, the number of histograms updated for each event will vary. The present invention therefore maintains a record of the channel having the least number of data points in its histogram and when this channel reaches the predetermined number (e.g., 250), block 778 will exit to "A" as shown.

Refer to FIG. 17D illustrating the remainder of process 760 of the present invention. From "A," the flow continues to block 780 where the present invention determines the average (e.g., weighted average, median, mean, etc.) baseline voltage for each histogram for all the channels. This process is analogous to the process of block 736 of the software triggered procedure 720 except each histogram of block 780 may contain a different number of data points depending on the spatial distribution of the detected gamma events. At block 782, the present invention determines for a particular channel if its average baseline voltage amount is larger than Vm. If so, then at block 786 the offset voltage stored in the baseline voltage matrix (and as asserted by signals 212 and 214) is decreased for that channel and block 788 is entered. If the average voltage is less than Vm for a particular channel, then at block 784 the baseline voltage as stored in the baseline voltage matrix is increased for that channel and block 788 is entered. If the average baseline offset voltage for the channel is equal to Vm, then no correction is required and block 788 is entered directly.

At block 788, the present invention repeats from block 780 for the next channel until all baseline voltages of channels of the detector head are compensated. At block 790, the process 760 exists. It is appreciated that in the event that two gamma events are detected within a small window of time, one event may trigger the calibration sample (e.g., block 764) and the other event may interfere with the integration of the far PMTs and therefore increase or interfere with the sample data. In these statistically rare cases, as with the software triggered procedure, these corrupted data points are effectively excluded (or minimized) statistically via the averaging functions of the present invention.

Therefore, as shown above, this embodiment of the present invention provides a mechanism and process that maintains the baseline offset voltage, per channel, to the ideal value Vm. Drift associated with the transistors of the preamplification stage of each channel is detected and corrected by using a feedback arrangement. By using the approach of the present invention, the preamplification stages of the detector circuitry may be implemented using less expensive (e.g., less drift tolerant) circuitry.

It is appreciated that during periods of high count rate, the software triggered sampling procedure 720 of the present invention becomes less accurate as more events occur during the calibration samples. Therefore, the event driven procedure 760 is more accurate for high count rates. At low count rates, the event driven calibration procedure 760 is not operational because the count rate becomes too low, e.g., background radiation on the order of 40 counts/per is too low to perform event driven calibration. Procedure 760 requires that each channel be exposed to at least 250 counts per baseline adjustment. Therefore, the use of both software driven 720 and event driven 760 baseline compensation of the present invention is advantageous for high and low count environments.

The preferred embodiment of the present invention, an automatic gain calibration system applicable for all PMTs of a detector array that is operable while a collimator is installed, is thus described. While the present invention has been described in particular embodiments, it should be appreciated that the present invention should not be construed as limited by such embodiments, but rather construed according to the below claims.

What is claimed is:

1. In a gamma camera system having a scintillation detector with a photomultiplier array and a collimator, wherein each photomultiplier generates a channel signal, an apparatus for automatically calibrating gains associated with individual channel signals while said collimator is installed, said apparatus comprising:

a processor for defining a strip area associated with an obscured photomultiplier of said photomultiplier array wherein said installed collimator covers a section of said obscured photomultiplier;

said processor for recording a set of responses of said obscured photomultiplier for a sample of gamma events detected within said strip area;

said processor for determining a representative response of said set of responses; and said processor for automatically adjusting a preamplification gain associated with said obscured photomultiplier based on (1) a predetermined and stored reference response of said obscured photomultiplier and (2) said representative response of said obscured photomultiplier.

2. A gain calibration apparatus as described in claim 1 wherein said stored reference response of said obscured photomultiplier is responsive to gamma events detected within said strip area.

3. A gain calibration apparatus as described in claim 2 wherein said installed collimator comprises a first region obscuring gamma ray passage and a second region allowing passage of collimated gamma rays and wherein said obscured photomultiplier is aligned with said first region.

4. A gain calibration apparatus as described in claim 3 wherein said strip region is aligned with said second region of said collimator.

5. A gain calibration apparatus as described in claim 4 wherein said strip area is an arc shaped narrow two dimensional area centered about the center of said obscured photomultiplier.

6. A gain calibration apparatus as described in claim 4 further comprising controlled gain circuitry coupled to a channel signal generated by said obscured photomultiplier, said controlled gain circuitry for applying said preamplification gain to said channel signal, wherein said controlled gain circuitry is responsive to said processor.

7. A gain calibration apparatus as described in claim 3 wherein said processor is further for determining a first response of said obscured photomultiplier at initial calibration of said scintillation detector based on gamma events occurring within said strip area when said collimator is removed, wherein said first response is said stored reference response.

8. A gain calibration apparatus as described in claim 7 wherein said processor defines a central area associated with a central photomultiplier of said photomultiplier array wherein said central area is located above the surface of said central photomultiplier;

said processor for recording a set of responses of said central photomultiplier for a sample of gamma events detected within said central area;

said processor for determining a representative response of said set of responses of said central photomultiplier; and said processor for automatically adjusting a preamplification gain associated with said central photomultiplier based on (1) a predetermined and stored reference response of said central photomultiplier and (2) said representative response of said central photomultiplier.

9. A gain calibration apparatus as described in claim 8 wherein said central photomultiplier is aligned with said second region of said collimator.

10. In a gamma camera system having a scintillation detector with a photomultiplier array and a collimator, wherein each photomultiplier generates a channel signal, an apparatus for automatically calibrating gains associated with individual channel signals while said collimator is installed, said apparatus comprising:

a processor for defining a strip area associated with an obscured photomultiplier of said photomultiplier array wherein said installed collimator covers a section of said obscured photomultiplier;

said processor for recording a set of total energy signals of said photomultiplier array for a sample of gamma events detected within said strip area of said obscured photomultiplier;

said processor for determining a representative total energy signal of said set of total energy signals; and said processor for automatically adjusting a preamplification gain associated with said obscured photomultiplier based on (1) a stored reference total energy signal for gamma events occurring within said strip area and (2) said representative total energy signal.

11. A gain calibration apparatus as described in claim 10 wherein said installed collimator comprises a first region obscuring gamma ray passage and a second region allowing passage of collimated gamma rays and wherein said obscured photomultiplier is aligned with said first region.

12. A gain calibration apparatus as described in claim 11 wherein said strip region is aligned with said second region of said collimator.

13. A gain calibration apparatus as described in claim 12 wherein said strip area is an arc shaped narrow two dimensional area centered about the center of said obscured photomultiplier.

14. A gain calibration apparatus as described in claim 11 further comprising controlled gain circuitry coupled to a channel signal generated by said obscured photomultiplier, said controlled gain circuitry for applying said preamplification gain to said channel signal, wherein said controlled gain circuitry is responsive to said processor.

15. A gamma camera system comprising:
(a) a scintillation detector comprising:
a photomultiplier array wherein each photomultiplier generates a channel signal; and
an installed collimator having a first region obscuring gamma ray passage and a second region allowing passage of collimated gamma rays; and
(b) gain correction circuitry coupled to receive channel signals from said scintillation detector, said gain correction circuitry for automatically calibrating gains associated with individual channel signals while said collimator is installed, said gain correction circuitry comprising:
a processor for defining a strip area associated with an obscured photomultiplier of said photomultiplier array wherein said installed collimator covers a section of said obscured photomultiplier;
said processor for recording a set of responses of said obscured photomultiplier for a sample of gamma events detected within said strip area;
said processor for determining a representative response of said set of responses; and
said processor for automatically adjusting a preamplification gain associated with said obscured photomultiplier based on (1) a predetermined and stored reference response of said obscured photomultiplier to gamma events detected within said strip area and (2) said representative response of said obscured photomultiplier.

16. A gamma camera system as described in claim 15 wherein said obscured photomultiplier is aligned with said first region of said collimator.

17. A gamma camera system as described in claim 16 wherein said strip region is aligned with said second region of said collimator.

18. A gamma camera system as described in claim 17 wherein said strip area is an are shaped narrow area centered about the center of said obscured photomultiplier.

19. A gamma camera system as described in claim 16 further comprising controlled gain circuitry coupled to a channel signal generated by said obscured photomultiplier, said controlled gain circuitry for applying said preamplification gain to said channel signal, wherein said gain circuitry is responsive to said processor.

20. A gamma camera system as described in claim 16 wherein said processor determines a first response of said obscured photomultiplier at initial calibration of said scintillation detector based on gamma events occurring within said strip area when said collimator is removed, wherein said first response is said stored reference response.

21. A gamma camera system as described in claim 20 wherein said processor defines a central area associated with a central photomultiplier of said photomultiplier array wherein said central area is located above the surface of said central photomultiplier;
said processor for recording a set of responses of said central photomultiplier for a sample of gamma events detected within said central area;
said processor for determining a representative response of said set of responses of said central photomultiplier; and
said processor for automatically adjusting a preamplification gain associated with said central photomultiplier based on (1) a predetermined and stored reference response of said central photomultiplier and (2) said representative response of said central photomultiplier.

22. A gamma camera system as described in claim 21 wherein said central photomultiplier is aligned with said second region of said collimator.

23. In a gamma camera system having a scintillation detector with a photomultiplier array, wherein each photomultiplier generates a channel signal, a method of automatically calibrating gains associated with individual channel signals, said method comprising the steps of:
installing a collimator onto said scintillation detector wherein said collimator is aligned to cover a section of an obscured photomultiplier;
defining a strip area associated with said obscured photomultiplier of said photomultiplier array;
recording a set of responses of said obscured photomultiplier for a sample of gamma events detected within said strip area;
determining a representative response of said set of responses; and
automatically adjusting a preamplification gain associated with said obscured photomultiplier based on (1) a predetermined and stored reference response of said obscured photomultiplier and (2) said representative response of said obscured photomultiplier.

24. An automatic gain calibration method as described in claim 23 wherein said collimator comprises a first region obscuring gamma ray passage and a second region allowing passage of collimated gamma rays and wherein said step of installing said collimator comprises the step of aligning said obscured photomultiplier with said first region of said collimator.

25. An automatic gain calibration method as described in claim 23 further comprising the step of aligning said strip region associated with said obscured photomultiplier with said second region of said collimator.

26. An automatic gain calibration method as described in claim 25 wherein said strip area is an arc shaped narrow area centered about the center of said obscured photomultiplier.

27. An automatic gain calibration method as described in claim 25 further comprising the step of applying said preamplification gain to said channel signal generated by said obscured photomultiplier with said preamplification gain.

28. An automatic gain calibration method as described in claim 25 further comprising the step of determining, when said gamma camera system is initially calibrated, a first reference response by recording responses of said obscured photomultiplier to gamma events detected within said strip area when said collimator is not installed, wherein said first reference response is said stored reference response.

29. An automatic gain calibration method as described in claim 28 further comprising the steps of:
defining a central area associated with a central photomultiplier of said photomultiplier array wherein said central area is located above the surface of said central photomultiplier;
recording a set of responses of said central photomultiplier for a sample of gamma events detected within said central area;

determining a representative response of said set of responses of said central photomultiplier; and automatically adjusting a preamplification gain associated with said central photomultiplier based on (1) a predetermined and stored reference response of said central photomultiplier and (2) said representative response of said central photomultiplier.

30. An automatic gain calibration method as described in claim 29 further comprising the step of aligning said central photomultiplier with said second region of said collimator.

31. An automatic gain calibration method as described in claim 30 wherein step of automatically adjusting a preamplification gain associated with said obscured photomultiplier comprises the steps of:

increasing said preamplification gain of said obscured photomultiplier if said representative response is lower than stored reference response; and decreasing said preamplification gain of said obscured photomultiplier if said representative response is higher than stored reference response.

32. In a gamma camera system having a scintillation detector with a photomultiplier array, wherein each photomultiplier generates a channel signal, a method of automatically calibrating gains associated with individual channel signals, said method comprising the steps of:

installing a collimator onto said scintillation detector wherein said collimator is aligned to cover a section of an obscured photomultiplier;

defining a strip area associated with said obscured photomultiplier of said photomultiplier array wherein said installed collimator covers a section of said obscured photomultiplier;

recording a set of total energy signals of said photomultiplier array for a sample of gamma events detected within said strip area of said obscured photomultiplier;

determining a representative total energy signal of said set of total energy signals; and adjusting a preamplification gain associated with said obscured photomultiplier based on (1) a stored reference total energy signal for gamma events occurring within said strip area and (2) said representative total energy signal.

33. An automatic gain method as described in claim 32 wherein said collimator comprises a first region obscuring gamma ray passage and a second region allowing passage of collimated gamma rays and wherein said step of installing said collimator comprises the step of aligning said obscured photomultiplier with said first region of said collimator and further comprising the step of aligning said strip region associated with said obscured photomultiplier with said second region of said collimator.

34. An automatic gain method as described in claim 33 further comprising the step of determining said stored reference total energy signal at initial calibration of said scintillation detector.

* * * * *